US012626829B2

(12) United States Patent
Fisher et al.

(10) Patent No.: US 12,626,829 B2
(45) Date of Patent: May 12, 2026

(54) FUEL BUNDLE WITH TWISTED RIBBON FUEL RODLETS FOR NUCLEAR THERMAL PROPULSION APPLICATIONS, STRUCTURES FOR MANUFACTURE, AND METHODS OF MANUFACTURE

(71) Applicant: BWXT Advanced Technologies LLC, Lynchburg, VA (US)

(72) Inventors: Benjamin D. Fisher, Lynchburg, VA (US); John R. Salasin, Lynchburg, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 473 days.

(21) Appl. No.: 18/118,193

(22) Filed: Mar. 7, 2023

(65) Prior Publication Data

US 2023/0282373 A1 Sep. 7, 2023

Related U.S. Application Data

(60) Provisional application No. 63/317,477, filed on Mar. 7, 2022.

(51) Int. Cl.
G21C 3/324 (2006.01)
G21C 3/322 (2006.01)
(Continued)

(52) U.S. Cl.
CPC ............ G21C 3/324 (2013.01); G21C 3/322 (2013.01); G21C 3/33 (2013.01); G21C 3/334 (2013.01);
(Continued)

(58) Field of Classification Search
CPC ... G21C 3/00; G21C 3/02; G21C 3/04; G21C 3/22; G21C 3/30; G21C 3/32; G21C 3/324; G21C 3/3245; G21C 3/326
See application file for complete search history.

(56) References Cited

U.S. PATENT DOCUMENTS 2,987,458 A * 6/1961 Breden .................... G21C 3/30
376/439
3,230,146 A 1/1966 Astley et al.
(Continued)

FOREIGN PATENT DOCUMENTS

CN 202816398 U 3/2013
GB 1106256 A 3/1968

OTHER PUBLICATIONS

International Search Report and Written Opinion issued on Nov. 7, 2023 in PCT/US2023/014723.
(Continued)

*Primary Examiner* — Sharon M Davis
(74) *Attorney, Agent, or Firm* — Morgan, Lewis & Bockius LLP

(57) ABSTRACT

Fuel bundle has plurality of twisted ribbon fuel rodlets arranged in hexagonal packing or circle packing arrangement in a reactor core encased in a multilayer casing. Arrangement of twisted ribbon fuel rodlets is facilitated by rodlet seating fixture with seating surface having a plurality of protrusions that form a receiving space for ends of the twisted ribbon fuel rodlets. Manufacture of the fuel bundle incorporates fiber manufacturing technologies and, optionally, infiltration of spaces in the reactor core by infiltrant. Twisted ribbon fuel rodlet manufacturing system has subsystems that impart twist periodicity to extruded ribbons, inspect twisted extruded ribbons, and cut twisted extruded ribbons to length. Inspection sorts twisted ribbon fuel rodlets as well as provides feedback to adjust operation of subsystems. The fuel bundle (and optional fuel bundle support) can be incorporated into a fuel assembly of nuclear propulsion fission reactor structure of, for example, a nuclear thermal propulsion engine.

17 Claims, 60 Drawing Sheets

(51) Int. Cl.

| | |
|---|---|
| *G21C 3/33* | (2006.01) |
| *G21C 3/334* | (2006.01) |
| *G21C 5/02* | (2006.01) |
| *G21C 21/10* | (2006.01) |
| *B64G 1/40* | (2006.01) |
| *G21C 3/62* | (2006.01) |
| *G21D 5/02* | (2006.01) |

(52) U.S. Cl.
CPC .............. *G21C 5/02* (2013.01); *G21C 21/10* (2013.01); *B64G 1/408* (2013.01); *G21C 3/62* (2013.01); *G21D 5/02* (2013.01)

(56) References Cited

U.S. PATENT DOCUMENTS

| | | | |
|---|---|---|---|
| 3,817,029 A | 6/1974 | Frisch | |
| 5,068,082 A | 11/1991 | Ueda et al. | |
| 6,353,652 B1 | 3/2002 | Helmersson | |
| 11,990,248 B2 | 5/2024 | Gramlich et al. | |
| 2006/0210009 A1 | 9/2006 | Takeda et al. | |
| 2006/0222140 A1 | 10/2006 | Aleshin et al. | |
| 2015/0228363 A1 | 8/2015 | Dewan et al. | |
| 2016/0035441 A1* | 2/2016 | Totemeier | G21C 3/322 |
| | | | 376/409 |
| 2020/0203028 A1 | 6/2020 | Pegna et al. | |
| 2021/0012912 A1 | 1/2021 | Chernetsov et al. | |
| 2021/0335510 A1 | 10/2021 | Loginov et al. | |
| 2022/0068512 A1 | 3/2022 | Russell, II et al. | |
| 2022/0115149 A1 | 4/2022 | Barringer et al. | |
| 2023/0282374 A1 | 9/2023 | Fisher et al. | |
| 2023/0282380 A1 | 9/2023 | Fisher et al. | |
| 2025/0029740 A1 | 1/2025 | Fisher et al. | |
| 2025/0218611 A1 | 7/2025 | Fisher et al. | |

OTHER PUBLICATIONS

Burns et al., "Nuclear Thermal Propulsion Reactor Materials", in Nuclear Materials, edited by P. Tsvetkov, London: IntechOpen, 2020. [Online]. Available: https://www.intechopen.com/chapters/71396. doi: 10.5772/intechopen.91016.

A. G. Lanin, "Nuclear Rocket Engine Reactor", Springer Series in Materials Science, vol. 170, ISBN 978-3-642-32430-7, 2013.

A. Kraus, P. Garner, and N. Hanan, "ANL/RTR/TM-15/2: Thermal-Hydraulic Simulations of Single Pin and Assembly Sector for IVG-1M Reactor," Argonne National Laboratory, 2015.

I. Deryavko and A. Lanin, "Influences of Residual Stressses on the Thermal Strength of NRE Fuel Elements" Norwegian Journal of Development of the International Science, vol. 24, pp. 38-41, 2018.

I. Deryavko, "Radiation Hardening of Carbide Fuel Elements," Norwegian Journal of Development of the International Science, vol. 24, pp. 42-46, 2018.

A. G. Lanin and I. I. Fedik, "Selecting and using materials for a nuclear rocket engine reactor," Physics-Uspekhi, vol. 54, No. 3, pp. 305-318, 2011, doi: 10.3367/UFNe.0181.201103f.0319.

V. V. Baklanov et al., "Identification of Zirconium-Uranium Fuel Elements of IVG-1M Research Reactor," NNC RK Bulletin, vol. 2, No. 46, pp. 91-97, 2011 (with English Abstract).

I. I. Deryavko, V. V. Chernyadev, N. V. Gorin, Y. S. Cherepnin, and S. T. Tukhvatulin, "Characteristics of Identifying the Fuel Rods of Nuclear Rocket Engine (NRER)," NNC RK Bulletin vol. 4, No. 44, pp. 95-105, 2010 (with English Abstract).

V. Zakirov and V. Pavshook, "Russian Nuclear Rocket Engine Design for Mars Exploration," Tsinghua Science and Technology, vol. 12, No. 3, pp. 256-260, 2007.

A. Y. Gagarinskii, "Russian Nuclear Criticality Experiments: Status and Prospects," Nuclear Energy for New Europe 2003, Portoroz, Slovenia, Sep. 8-11, 2003.

I. Deryavko, I. G. Perepelkin, O. S. Pivovarov, and A. N. Storozhenko, "Express Technqiues for Post-Irradiation Investigations of Shell- Free Carbide Rods," NNC RK Bulletin, vol. Nuclear Physics and Radiation Material Structure Study, No. 4, pp. 88-94, 2001 (with English Abstract).

Kardoulaki et al., "Synthesis, thermal conductivity, and hydrogen compatibility of a high melt point solid solution uranium carbide, (U0.2Zr0.8)C", Nuclear Materials and Energy 33 (2022) 101290.

Bykov et al., "Programs of Experiments with Critical Assemblies at the Russian Research Centre "Kurchatov Institute"," Nuclear Science and Engineering, vol. 145, No. 2, pp. 181-187, 2017, doi: 10.13182/nse03-a2374.

Lanin, "Effect of residual stresses on the strength of ceramic materials (Review)," Russian Metallurgy (Metally), vol. 2012, No. 4, pp. 307-322, 2012, doi: 10.1134/s0036029512040076.

Lanin et al., Thermal Stress Resistance of Materials. Berlin: Springer, 2008.

Dyakov et al., "Influence of Disturbances in the Geometry of the Elements of a Regularly Porous System on the Hydrodynamic Characteristics of the Clusters of Fuel Elements of a Nuclear Reactor", Journal of Engineering Physics and Thermophysics, vol. 81, No. 2, 2008.

Lanin et al., "Thermal Shock Resistance and Thermal-Mechanical Processing of Sapphire," Journal of the European Ceramic Society, vol. 23 (2003) 455-468.

Lanin et al., "Fracture Kinetics of Thermally Loaded Bodies in Elastic-Brittle State and Criterion of Thermal Stress Resistance," in Fracture Mechanics of Ceramics, vol. 13, Bradt et al. (Eds), Kluwer Academic/Plenum Publishers (2002) 395-411.

Lanin et al., "Numerical Method of Thermal Shock Resistance Estimation by Quenching of Samples in Water," Journal of Material Science, vol. 35 (2000) 2353-2359.

Lanin et al., "Influence of Residual Stresses of Thermal Stress Resistance of Refractory Ceramic," Journal of the European Ceramic Society, vol. 20 (2000) 209-213.

Ponomarev-Stepnoy et al., "Work on Domestically Produced Nuclear Rocket Motors," Atomic Energy, vol. 86, No. 4, 1999, 283-287.

Gagarinskii, "Critical Benchmark Experiments at the kurchatov Institute Russian Scientific Center," Atomic Energy, vol. 84, No. 6, 1998, 359-364.

Wetch et al., "Low-cost space fission power systems utilizing US and former Soviet Union experience and technology," AIP Conf. Proc. 387, 1309-1316 (1997).

Lanin et al., "Mechanical and Thermophysical Properties of Materials in HTGR Fuel Bundles," translated from Atomnaya Energiya, vol. 74, No. 1, pp. 40-44, 1993.

Schneider et al. (Eds.), Thermal Shock and Thermal Fatigue Behavior of Advanced Ceramics, Kluwer Academic Publishers (1993), pp. 37-223.

Wetch et al., Development of nuclear rocket engines in the USSR, presented at AIAA/NASA/OAI Conference on Advanced SEI Technologies, 1991 (8 pages).

Lanin, "Strength and Thermal Strength Resistance of Refractory Compounds," in Materials Science of Carbides, Nitrides, and Borides, Gogotsi et al. (Eds.), Kluwer Academic Publishers (1999) 305-322.

Fedik, "High temperature Carbide Structures in Nuclear Power," in Materials Science of Carbides, Nitrides, and Borides, Gogotsi et al. (Eds.), Kluwer Academic Publishers (1999) 337-342.

Popov et al., "Method of Testing the Heat Resistance of Specimens of Brittle, Electrically Conducting Materials Using Electron-beam Heating," translated from Problemy Prochnosti, No. 9, pp. 77-81 (1984).

Lanin et al., "Determination of Crack Resistance of Brittle Materials," translated from Problemy Prochnosti, No. 2, pp. 13-16 (1984).

Derevyako et al., "Macrostresses in Sintered Carbides," translated from Poroshkovaya Metallurgiya, No. 5 (257), pp. 60-64 (1984).

Gerasimov et al., "Strength of Zirconium Carbide Composites with Disperse Carbon Inclusions," translated from Poroshkovaya Metallurgiya, No. 1 (229), pp. 67-74 (1982).

Lanin et al., "Strength of Carbide-Graphite Composites With Force and Thermal Loadings," Translated from Problmey Prochnosti, No. 12, pp. 89-95 (1981).

(56) References Cited

OTHER PUBLICATIONS

Bulychev et al., "Theory and Technology of Sintering, Thermal, and Chmicothermal Treatment Processes—The Sintering of Zirconium Carbide," translated from Poroshkovaya Metallurgiya, No. 4 (172), pp. 38-42 (1977).
Lanin et al., "Failure of Ceramic Materials in Local Thermal Loading," Translated from Problemy Prochnosti, No. 9, pp. 35-38 (1986).

* cited by examiner

600

SU5000 0647 2.0kV 5.8mm SE(L) 05/04/2021     2.00 µm

610

△ ZrC
○ UO2

INTENSITY

°2θ

650

SU5000 0659 2.0kV 5.7mm SE(L) 05/04/2021 2.00 μm

660

△ ZrC

INTENSITY

°2θ

FUEL BUNDLE WITH TWISTED RIBBON FUEL RODLETS FOR NUCLEAR THERMAL PROPULSION APPLICATIONS, STRUCTURES FOR MANUFACTURE, AND METHODS OF MANUFACTURE

RELATED APPLICATION DATA

The application is based on and claims priority under 35 U.S.C. § 119 to U.S. Provisional Application No. 63/317, 477, filed Mar. 7, 2022, the entire contents of which are incorporated herein by reference.

TECHNICAL FIELD AND INDUSTRIAL APPLICABILITY

The present disclosure relates generally to nuclear fission reactors and structures related to nuclear fission reactors, in particular for propulsion. Such nuclear propulsion fission reactors may be used in various applications suitable for gas reactor designs, such as space, lunar and terrestrial environments. In particular, the disclosure relates to twisted ribbon fuel rodlets formed of a composition including a fissionable fuel component and assembled into a fuel bundle that will be incorporated into a fuel assembly for a thermal propulsion reactor, to structures for manufacture of the twisted ribbon fuel rodlets and for assembly of the fuel bundle, and methods for fabricating such twisted ribbon fuel rodlets and fuel bundles.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Development and testing of twisted ribbon fuels occurred in the USSR from approximately 1975 to 1990 and have been reported in Burns et al, "Nuclear Thermal Propulsion Reactor Materials", in Nuclear Materials, edited by P. Tsvetkov, London: IntechOpen, 2020. (U, Zr) C fuel was used for the low-temperature portion of the USSR reactor design (i.e., propellant exit gas temperature≤2500 K), and (U, Zr, Nb) C was used for the high-temperature portion of the reactor core. Fuel ribbons were extruded and twisted on their long axis, sintered and assembled into a tube. Dimensions of the ribbon and the twist rate were (1.5 mm×2.8 mm, S=30 mm).

The simple tube restraint system used in this prior work allowed for several failure modes. As reported in Lanin, "Nuclear Rocket Engine Reactor", Springer Series in Materials Science, Volume 170, Wang et al. (Eds.), Springer-Verlag Berlin Heidelberg (2013), high temperature, multiple-cycle operation damaged the twisted ribbon fuels. For example, fuel element plasticity at elevated temperatures and a twisting failure mode caused by increasing axial forces as reactor differential pressure increased were observed. Also, hot hydrogen ablation of the insulation and casing materials was observed.

SUMMARY

There is a need for improvements in twisted ribbon fuel rodlets, in structures for manufacture of the twisted ribbon fuel rodlets and for assembly of the fuel bundle, and in methods for fabricating such twisted ribbon fuel rodlets and fuel bundles. In particular, improvements related to the radial restraint of twisted ribbon fuel rodlets in the fuel bundle and in structures and materials of the fuel bundle and its casing. Thus, a method of radial restraint for the twisted ribbon fuel rodlets in the fuel bundle uses geometric-specific end fixtures, supports, and fiber architectures and also manufacturing methods to address failure modes, to improve internal distribution and restraint of the twisted ribbon fuel rodlets, to improve distribution forces, and to strengthen the twisted ribbon fuel rodlets (and materials of the fuel bundle casing) against fracture by keeping the entire fuel bundle in radial compression.

In addition, improvements related to the manufacture of twisted ribbon fuel rodlets are disclosed, which provide for improved manufacturability including preparation of materials for twisted ribbon fuel rodlets, methods of manufacture including extrusion of ribbon fuel rodlets and twisting of ribbon fuel rodlets to form twisted ribbon fuel rodlets that have uniform characteristics, and defect detection in manufactured twisted ribbon fuel rodlets. Improved twisted ribbon fuel rodlets contribute to improvements in overall fuel bundle performance and reduced failures.

In fuel assemblies, improvements to the distribution of forces are also disclosed, particularly distribution of forces in the high temperature, ductile regions of the fuel assembly such as the region of the outlet fuel bundle(s). The geometry of fuel bundle supports, such as tapered outer circumference surfaces, translate axial loading of the twisted ribbon fuel rodlets caused by reactor differential pressure from the fuel bundle and its components to the fuel assembly outer surface.

An embodiment of a fuel bundle comprises a multilayer casing having an inner volume defining a reactor core and a plurality of twisted ribbon fuel rodlets arranged in the reactor core. The plurality of twisted ribbon fuel rodlets have a composition including a fissionable fuel component. In a cross-section perpendicular to a longitudinal axis of the fuel bundle, cross-sections of the plurality of twisted ribbon fuel rodlets are arranged in a hexagonal packing arrangement or a circle packing arrangement.

An embodiment of a rodlet seating fixture for arranging a plurality of twisted ribbon fuel rodlets to form a reactor core of a fuel bundle comprises a seating surface including a plurality of protrusions. The plurality of protrusions are distributed on the seating surface and have a height from a base surface of the seating surface. The protrusions include a plurality of sides surfaces and a first portion of the plurality of side surfaces include angled regions that join a second portion of the plurality of side surfaces at angles other than 90 degrees. Side surfaces of a plurality of adjacent protrusions define a receiving space configured to seat an end of a twisted ribbon fuel rodlet. The receiving space is configured to seat the end of the twisted ribbon fuel rodlet, either with a line contact between the side surfaces of the plurality of adjacent protrusions that define the receiving space and corners of the end of the twisted ribbon fuel rodlet or with an area contact between at least one angled region of the plurality of adjacent protrusions that define the receiving space and a long side surface of the end of the twisted ribbon fuel rodlet.

An embodiment of a method of manufacturing a fuel bundle comprises forming a core region of the fuel bundle, wherein forming the core region includes seating first ends of each of a plurality of twisted ribbon fuel rodlets (having a composition including a fissionable fuel component) in a respective receiving space of a rodlet seating fixture, wherein the rodlet seating fixture includes a seating surface having a plurality of protrusions, the plurality of protrusions are distributed on the seating surface and have a height from a base surface of the seating surface, and side surfaces of a plurality of adjacent protrusions define the respective receiving; attaching an end cap to second ends of each of the plurality of twisted ribbon fuel rodlets to form a pre-bundle; optionally introducing an infiltrant into the pre-bundle to occupy void spaces in the assembled twisted ribbon fuel rodlets; encasing the pre-bundle in a multilayer casing including an inner layer, an inner intermediate layer, an outer intermediate layer, and an outer layer; removing the rodlet seating fixture and end cap; and optionally removing the infiltrant.

An embodiment of a twisted fuel rodlet manufacturing system comprises a ribbon initial cooling zone, a ribbon tensioning sub-system, a ribbon twisting sub-system, a ribbon cutting sub-system, a ribbon inspection zone, a length sensor sub-system, and a rodlet sorting and collection sub-system. The twisted fuel rodlet manufacturing system is enclosed in an inert atmosphere chamber. The ribbon tensioning sub-system includes tensioning rollers configured to contact surfaces of an extruded ribbon and is mounted on the ribbon twisting sub-system for rotation about an axis of the processing path of the extruded ribbon. The ribbon inspection zone includes one or more non-destructive inspection devices, and the rodlet sorting and collection sub-system includes structures and components to sort the rodlets based on the inspection performed by the one or more non-destructive inspection devices.

An embodiment of a method of manufacturing a twisted ribbon fuel rodlet comprises mixing a carbon source and a plurality of oxide powders to form a mixture, wherein at least one oxide powder has a composition including an oxide of a fissionable fuel component, forming the mixture into an intermediate powder, subjecting the intermediate powder to carbothermal reduction; mechanical processing the carbothermally reduced intermediate powder to form a feedstock of solid solution carbide powders containing the fissionable fuel component, forming the feedstock into a billet, wherein forming the feedstock includes the step of heated thermoplastic mixing, extruding the billet to form an extruded ribbon, and processing the extruded ribbon to form a twisted ribbon fuel rodlet. The carbon source can be a phenolic resin or carbon black and the feedstock has a composition including $(U_aZr_bNb_c)C_d$, where $0.05<a<0.4$, $0<b<0.95$, $0<c<0.4$, and $0.7<d<1$.

Processing the extruded ribbon to form the twisted ribbon fuel rodlet includes contacting surfaces of the extruded ribbon in a nip of tensioning rollers of the ribbon tensioning sub-system, wherein one or both tensioning rollers are spring mounted in a direction parallel to a processing path of the extruded ribbon, rotating a ribbon tensioning sub-system about an axis of the processing path of the extruded ribbon while maintaining tension on the extruded ribbon to impart a twist to the extruded ribbon, and conducting image analysis on the twisted extruded ribbon to identify defects, and sorting the twisted ribbon fuel rodlet based on a result of the image analysis. Processing the extruded ribbon to form the twisted ribbon fuel rodlet occurs under an inert atmosphere.

An embodiment of a method of controlling twist rate during manufacture of twisted ribbon fuel rodlets comprises receiving an image of a twisted ribbon, converting the received image to a binary ribbon profile by comparing each pixel in the received image to a predefined threshold, generating a theoretical ribbon profile according to a ribbon model that includes a target twist rate, generating a plot by convolving the ribbon profile with the theoretical ribbon profile for a range of twist rates, and determining a calculated twist rate for the twisted ribbon as an x-coordinate of a point in the plot having maximum value.

An embodiment of a fuel assembly comprises a fuel assembly outer structure; a plurality of fuel bundles including a multilayer casing having an inner volume defining a reactor core, and a plurality of twisted ribbon fuel rodlets arranged in the reactor core, wherein the plurality of twisted ribbon fuel rodlets have a composition including a fissionable fuel component; and a fuel bundle support structure including a body having a circumferential side surface and a plurality of openings in the body. The fuel assembly outer structure has an inner surface that includes a plurality of facets and a tapered section. The inner surface in the tapered section is, in a direction from an inlet end of the fuel bundle support structure to an outlet end of the fuel bundle support structure, oriented radially inward relative to a longitudinal axis of the fuel assembly outer structure and the outer surface of the multilayer casing of each of the plurality of fuel bundles is conformally mated with the plurality of facets of the inner surface of the fuel assembly outer structure. The circumferential side surface of the fuel bundle support structure is, in an axial direction from a top surface of the fuel bundle support structure to a bottom surface of the fuel bundle support structure, oriented radially inward relative to an axis of the fuel bundle support structure that is normal to the top surface, and the circumferential side surface of the fuel bundle support structure is conformally mated with the tapered section of the inner surface of the fuel assembly outer structure.

An embodiment of a fuel bundle support comprises a body including a top surface, a bottom, a circumferential side surface joining the top surface and the bottom surface, and a plurality of openings in the body from the top surface to the bottom surface. In an axial direction from the top surface to the bottom surface, the circumferential side surface of the fuel bundle support structure is oriented radially inward relative to an axis of the fuel bundle support structure that is normal to the top surface. The plurality of openings in the body of the fuel support structure are defined by a plurality of walls that extend from the top surface to the bottom surface and, for each of the plurality of openings, an area of the opening at the top surface is less than an area of the opening at the bottom surface.

Embodiments of the disclosed fuel bundles, fuel assemblies, fuel bundle supports, and structures and methods of fabrication have application in various fission reactor designs and application in a wide range of fields, including aerospace and industrial applications.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

Figure 1:
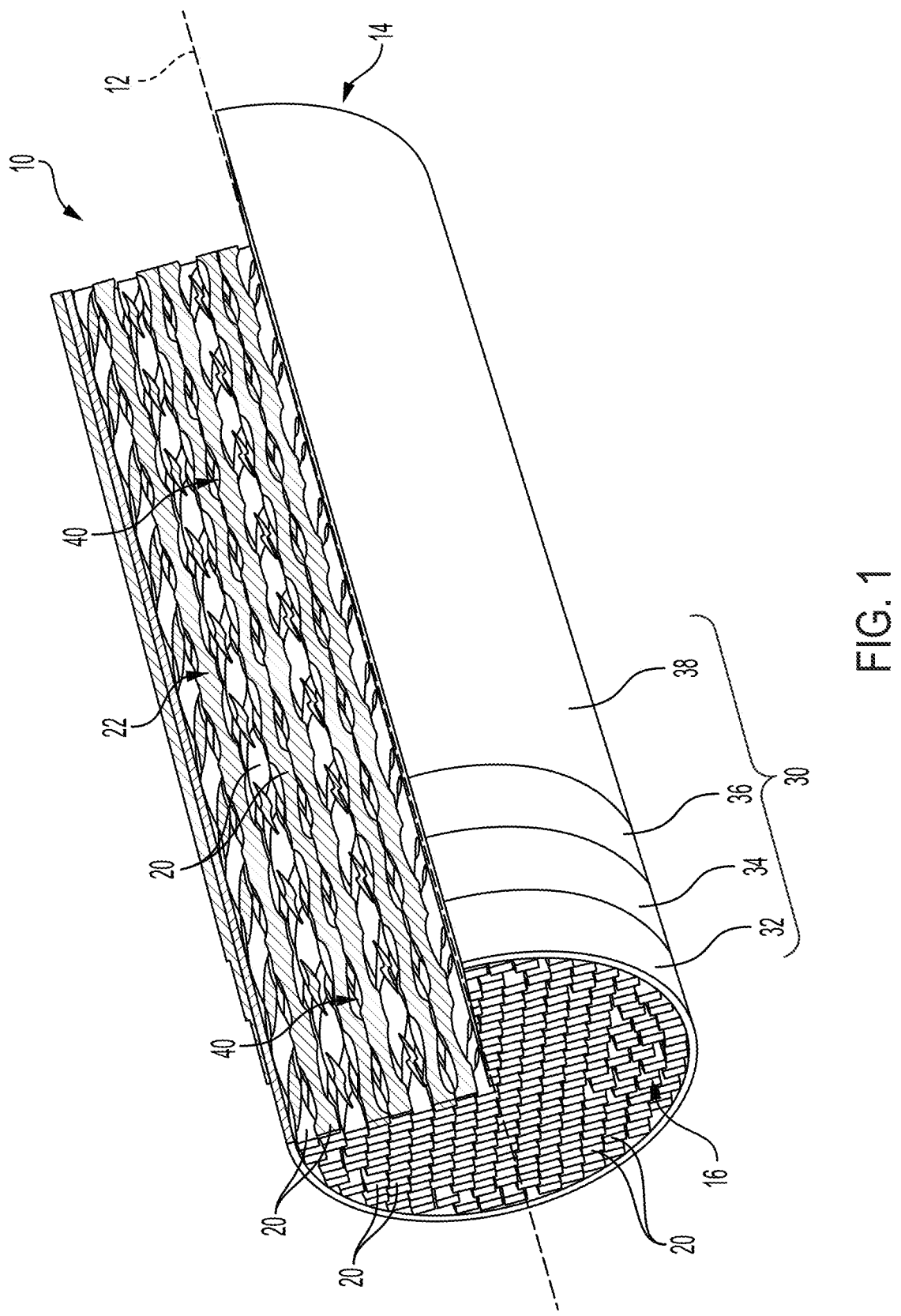
FIG. 1 is partial cut-away, schematic, perspective view of an embodiment of a fuel bundle with twisted ribbon fuel rodlets and a multilayer casing including compliant insulating layers and layers with multi-directional fibers.

In some instances, dimensions of respective constituent elements are appropriately adjusted for clarity. For ease of viewing, in some instances only some of the named features in the figures are labeled with reference numerals.

DETAILED DESCRIPTION

FIG. 1 is partial cut-away, schematic, perspective view of an embodiment of a fuel bundle 10. The fuel bundle 10 includes a plurality of twisted ribbon fuel rodlets 20 forming a core region 22 and a multilayer casing 30. Within the core region 22, the twisted ribbon fuel rodlets 20 are oriented in the same general direction and the longitudinal axis of each of the rodlets 20 extends substantially parallel to the direction of the longitudinal axis 12 of the fuel bundle 10 from a first end 14 of the fuel bundle 10 to a second end 16 of the fuel bundle 10, where substantially parallel includes up to a 5 degree deviation from parallel. The deviation from parallel can vary along the axial length (L) of the twisted ribbon fuel rodlets 20 due to twist periodicity accuracy over the length (L).

Figures 2A, 2B, 2C:
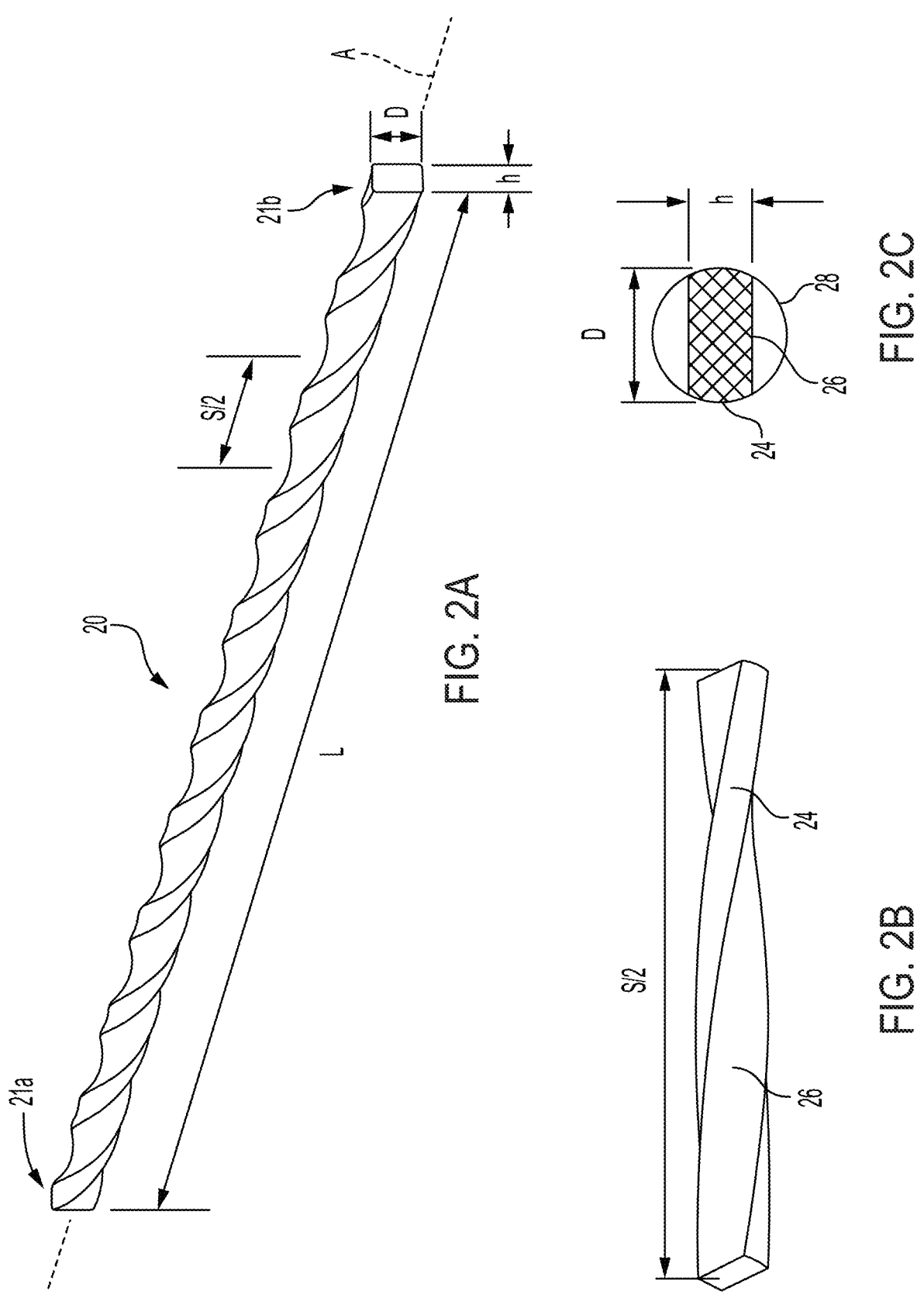
FIGS. 2A-C are schematic representations of a twisted ribbon fuel rodlet and shows certain dimensional aspects.

As shown in the schematic representations of twisted ribbon fuel rodlets 20 in FIGS. 2A-C, embodiments of a twisted ribbon fuel rodlet 20 extend from a first end 21a to a second end 21b and have a length dimension (L) along the longitudinal axis A of the rodlet 20 and twist with a periodicity of S/2. As shown in FIG. 2C, the shape of the cross-section of the twisted ribbon fuel rodlets 20 perpendicular to the longitudinal axis is a rectangle having a short side 24 with length (h) and a long side 26 with length (D) (where D>h). Also as seen in FIG. 26C, the envelop surface 28 of twisted ribbon fuel rodlet 20 is a circle. When arranged in the core region 22, the envelope surfaces 28 of adjacent twisted ribbon fuel rodlet 20 are in tangential contact. The geometry of the twisted ribbon fuel rodlets 20 and their organization and alignment within the core region 22 results in void spaces 40 between adjacent twisted ribbon fuel rodlets 20 that provides a path for coolant, such as a propellant gas in a gas-cooled nuclear thermal propulsion (NTP) reactor, to pass through the core region 22 from a first end 14 of the fuel bundle 10 to a second end 16 of the fuel bundle 10. In example embodiments, the twisted ribbon fuel rodlet 20 has the following dimensions: axial length (L)=150 mm and, in cross-section, short side length (h)=1.2 to 2.0 mm (nominal 1.5 mm); long side length (D)=2.5 to 3.2 mm (nominal 2.8 mm); and diameter of envelop surface=3 to 5 mm (nominal 3.6 mm).

As seen in FIG. 1, the multilayer casing 30 has a plurality of layers. In example embodiments, the multilayer casing 30 has four layers—an inner layer 32, inner intermediate layer 34, outer intermediate layer 36, and an outer layer 38. In alternative embodiments, the multilayer casing 30 can have more than four layers including, for example, three intermediate layers.

The inner layer 32 is compliant and compressive layer that is hydrogen resistive and has low thermal conductivity. An example material suitable for the inner layer 32 is a graphite compressive felt insulation layer, an example of which is commercially available as Activated Carbon Felt ACF1000 from Ceramaterials of Dingmans Ferry, PA Both 1 mm and 2 mm thickness can be utilized. In example embodiments, the graphite felt is surface converted to ZrC, which can be done commercially by, for example, Advanced Ceramic Fibers, LLC of Idaho Falls, ID. Surface conversion to ZrC provides improvements to survival in the H2 environment at the hot end of the NTP reactor (~2700 K) and provides improvements to fuel bundle performance. Thus, in some embodiments, surface conversion to ZrC may be implemented in the fuel bundles 10 located toward the outlet end of the fuel assembly, and may not be needed for the fuel bundles in the cooler, inlet end of the fuel assembly.

The inner intermediate layer 34 is a composite reinforcement and compressive layer. Example materials suitable for the inner intermediate layer 34 have a combination of unidirectional carbon fibers and elastic fibers in the weft direction. The elastic fibers in the weft direction provide a compressive force. Typically, these materials for the inner intermediate layer 34 are in the form of a tube which slips over the underlying structure. An example of a suitable inner intermediate layer 34 is commercially available as carbon fiber elastic UD 1012 from Eurocarbon B.V. of the Netherlands. Different nominal diameters are available and can be used based on required dimensions. For example, nominal diameters of 40 mm (1012/40), 60 mm (1012/60) and 80 (1012/80) can be utilized.

The outer intermediate layer 36 is a compressive prepeg or dry wound layer and provides a first compressive architecture to the multilayer casing 30. Example materials suitable for the outer intermediate layer 36 are prepeg fabrics of carbon fibers with a +45 degree/−45 degree biaxial fiber orientation. An example of a suitable outer intermediate layer 36 is commercially available as HexTow AS4C from Hexcel Corporation of Stamford, CT Filament count tows of at least 6,000 can be utilized for strength purposes. Graphitized yarn can also be used for the outer intermediate layer 36.

Additional intermediate layers can be included in the multilayer casing 30 and, when present, additional intermediate layers are positioned between the inner intermediate layer 34 and the outer intermediate layer 36.

The outer layer 38 is also a compressive prepeg layer and provides a second compressive architecture to the multilayer casing 30. Example materials suitable for the outer layer 38 are circumferentially-oriented, unidirectional prepreg fabric. Examples of a suitable outer layer 38 are commercially available as prepreg unidirectional carbon fabric, such as FibreGlast 2114 from Fibre Glast Developments Corp of Brookville, OH, and as spread tow fabric, such as TeXtreme™ 5021 from Oxeon AB of Boras, Sweden. Alternatively, a composite of carbon fiber with a carbon matrix (C/C) can be used. For certain applications, such as where operating temperatures of the core region are below 1600 K, a composite of SiC fibers with a SiC matrix (SiC/SiC) can be used.

In example embodiments, the material of the outer intermediate layer 36 is not the same as the material of the outer layer 38.

Table 1 sets forth details for example embodiments of the intermediate layers of the multilayer casing 30.

TABLE 1

| | Characteristics of Different Intermediate Layers in Multilayer Casing | | |
|---|---|---|---|
| Embodiment | Inner Intermediate Layer | Additional Intermediate Layers | Outer Intermediate Layer |
| Ex. A | Basket Weave Layer | N/A | Hoop Strength Layer |
| Ex. B | 45 Deg, ~2 mm space between each tow, Dry, 2 mm thick | Dry Hoop Layer 88 Deg, overlapping, Dry, 2 mm Thick | 88 Deg, overlapping, phenolic Towpreg, 2 mm Thick |
| Ex. C | | Textreme ™ Hoop Layer 88 Deg, overlapping, Dry, 2 mm Thick | |
| Ex. D | | Dry Hoop Layer 88 Deg, overlapping, Dry, 2 mm Thick | Dry Hoop Layer 88 Deg, overlapping, Dry, 2 mm Thick, Apply phenolic afterward |

The Basket Weave Layer on the inner intermediate layer 34 is intended to provide the best insulator possible with CF mandrel winding. The gaps between tows in this layer can be adjusted to 1 mm to 5 mm. Twisted tows and CF yarn can also be used. The additional intermediate layers are to prevent matrix material from the outer intermediate layer from seeping into the inner intermediate layer. CF tow or high density TeXtreme™ material from Oxeon AB of Boras, Sweden may be used for the one or more additional intermediate layers. The outer intermediate layer 36 provides hoop strength to the multilayer casing 30.

Figure 3:
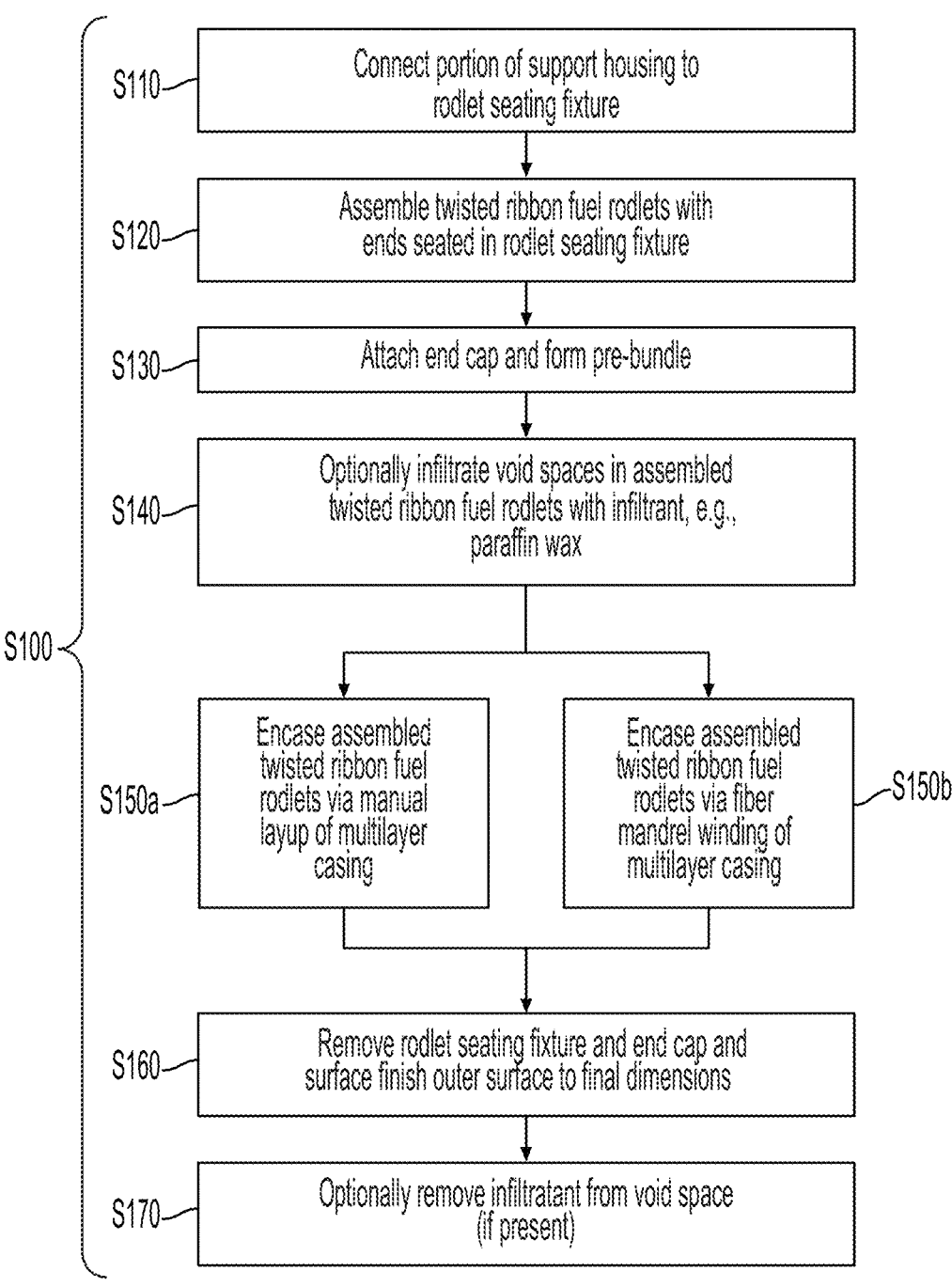
FIG. 3 is a flow diagram setting forth various steps in an embodiment of a method of manufacturing a fuel bundle with twisted ribbon fuel rodlets and a multilayer casing

FIG. 3 is a flow diagram setting forth various steps in an embodiment of a method of manufacturing a fuel bundle with twisted ribbon fuel rodlets and a multilayer casing. The method S100 includes steps to assemble the twisted ribbon fuel rodlets 20 in the core region 22, encase the assembled twisted ribbon fuel rodlets in the multilayer casing 30, and finish process to form the fuel bundle.

Figure 4A:
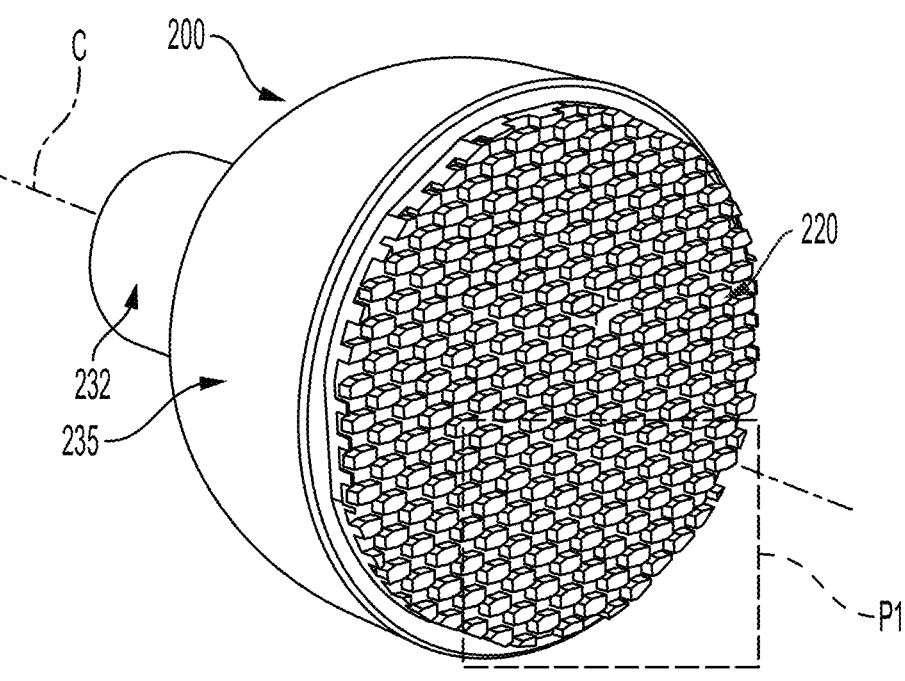
FIG. 4A is a schematic illustration of a rodlet seating fixture in perspective view and FIG. 4B is a magnified view of the area P1 in FIG. 4A.

Steps S110 and S120 assemble the twisted ribbon fuel rodlets 20 in the core region 22. In example embodiments, ends of the twisted ribbon fuel rodlets 20 are seated in a rodlet seating fixture 200 (step S120). A support housing 210 may be connected to the rodlet seating fixture 200 (step S110). The support housing is a temporary structure that facilitates assembling the twisted ribbon fuel rodlets 20 in the rodlet seating fixture 200 and is removed before encasing the assembled twisted ribbon fuel rodlets in the multilayer casing. An embodiment of a rodlet seating fixture 200 is shown in FIG. 4A and embodiments of the support housing 210 connected to the rodlet seating fixture 200 are shown in FIGS. 5A-E. FIGS. 5A-E also show the fuel bundle in various stages of assembly as the twisted ribbon fuel rodlets 20 are seated in the rodlet seating fixture 200 In the illustrated embodiments, the support housing 210 is attached to the rodlet seating fixture 200 (for example, at a peripheral edge of the rodlet seating fixture 200) and extends axially away from the rodlet seating fixture 200. The twisted ribbon fuel rodlets 20 are then supported along their longitudinally length by the support housing 210. The rodlet seating fixture 200 and/or the support housing 210 can be made of suitable materials, such as nylon.

Figure 4B:
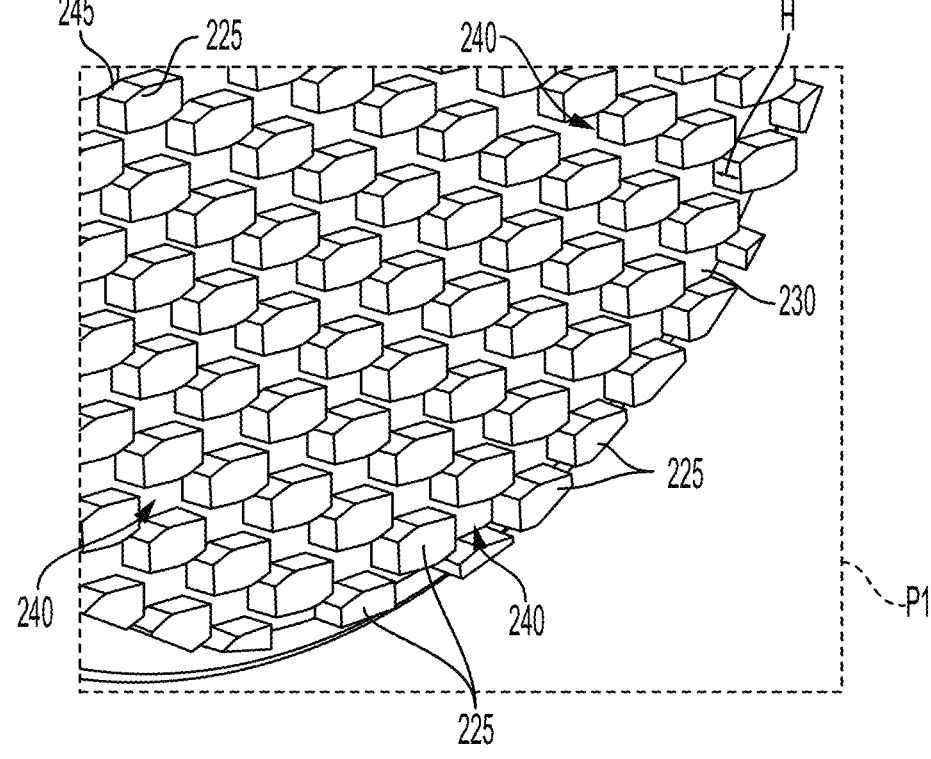

The rodlet seating fixture 200 has a seating surface 220 that includes a plurality of protrusions 225. FIG. 4B is a magnified view of the area P1 in FIG. 4A. The plurality of protrusions 225 are distributed on the seating surface 220 and have a height (H) from a base surface 230 of the seating surface 220. Opposite the seating surface 220 along longitudinal axis C, the rodlet seating fixture 200 has a mandrel mating feature 232. The mandrel mating feature 232 can include, for example, a male or female feature (see FIG. 8) that will engage with a cooperating mounting feature on a mandrel winder for rotation around the longitudinal axis C. The seating surface 220 and the mandrel mating feature 232 are connected by an end cap surface 235.

The plurality of twisted ribbon fuel rodlets 20 are seated in the seating surface 220 with an end of each of the twisted ribbon fuel rodlets 20 in a receiving space 240 between the protrusions 225. As seen in FIGS. 4B and 5C, the side surfaces of the protrusions 225 include angled regions 245. These angled regions 245 join the other side surfaces of the protrusions 225 at angles other than 90 degrees. The angled regions 245 are located and sized so that dimensions between side surfaces of adjacent protrusions 225 that define the receiving space 240 accommodate the end of the twisted ribbon fuel rodlet 20. Additionally, the angled regions allow for the twisted ribbon fuel rodlets 20 to rotate about its individual longitudinal axis (A) without interfering with the raised portions 225. For example, the end of each of the twisted ribbon fuel rodlets 20 in the receiving space 240 contacts the protrusions 225 defining that receiving space 240 at up to four locations—point a, point b, point c, and point d. Points a and c are on the angled regions 245 of the protrusions 225 and points b and d are on other regions of the side surfaces. Thus, each side of the twisted ribbon fuel rodlet 20 contacts one angled region 240 of one protrusion 225 and one other region on a second protrusion. The distance between points a and b ($L_1$) is sized to accommodate the short side 24 of the twisted ribbon fuel rodlet 20 with length (h) being equal to distance $L_1$ and the distance between points b and c ($L_2$) is sized to accommodate the long side 26 of the twisted ribbon fuel rodlet 20 with length (D) being equal to distance $L_2$. Contact between the twisted ribbon fuel rodlet 20 and the angled regions 245 of the protrusions 225 can be a line contact or an area contact.

Figure 5A:
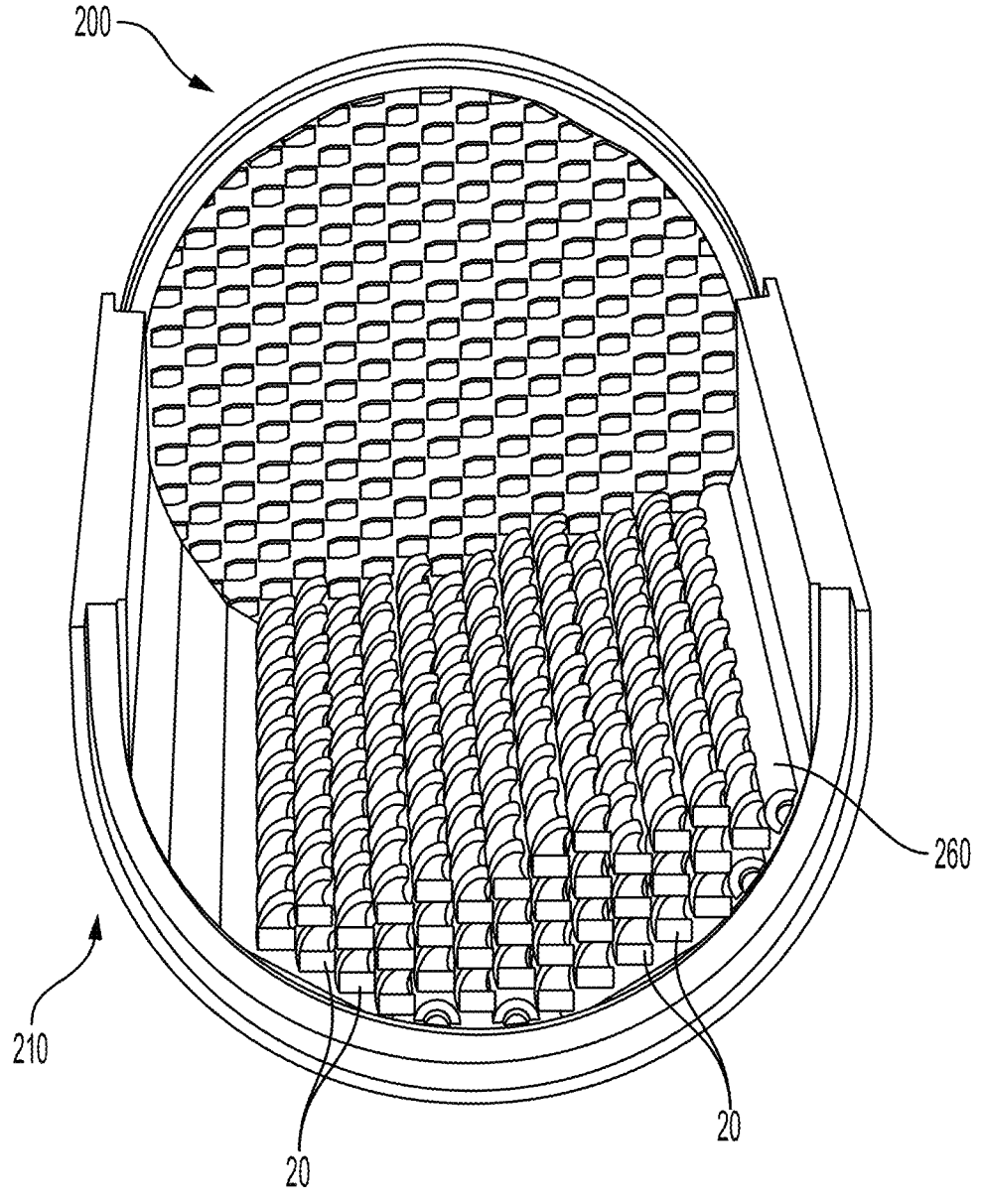
FIGS. 5A-E are schematic views showing the placement and arrangement of twisted ribbon fuel rodlets during the assembly of a fuel bundle, including details of the rodlet seating fixture in magnified view of the area P2 in FIG. 5B.
Figures 5B, 5C:
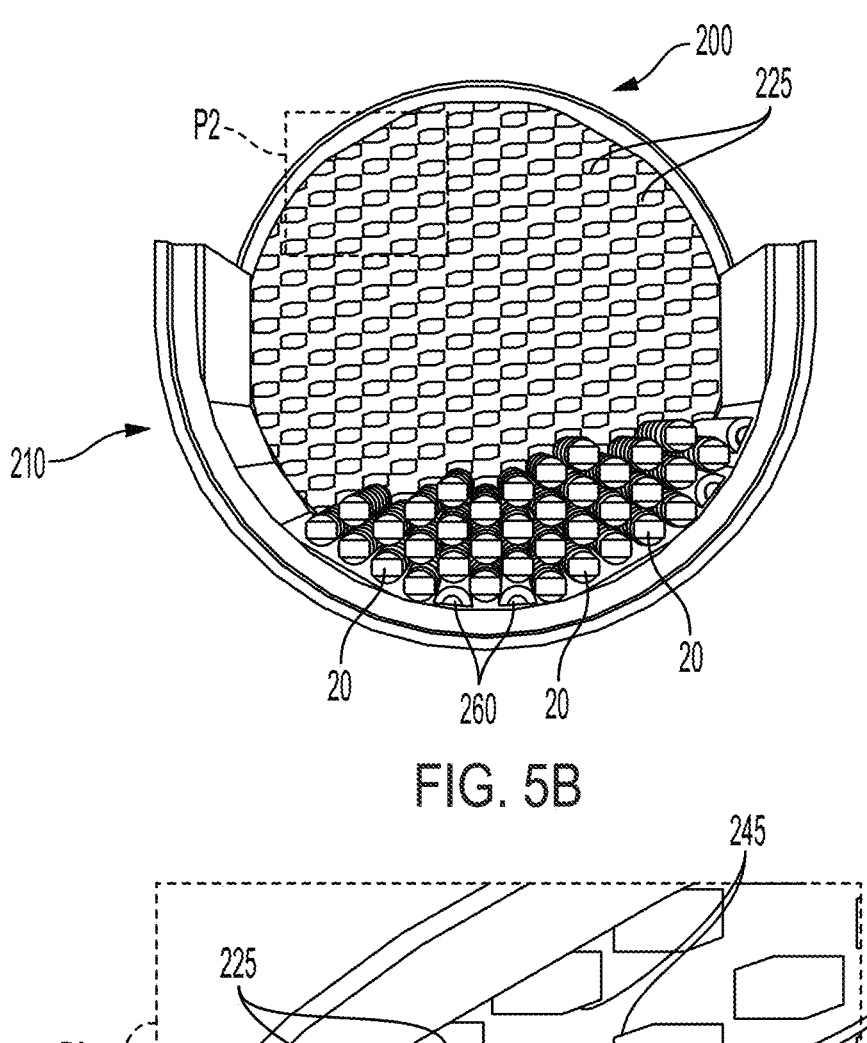

FIGS. 5A-B are schematic views showing the placement and arrangement of twisted ribbon fuel rodlets during the assembly of a fuel bundle (step S120). FIG. 5A is a perspective view and FIG. 5B is a plan view. Ends of the twisted ribbon fuel rodlets 20 have been seated in the receiving space 240 of the rodlet seating fixture 200 and the length of the twisted ribbon fuel rodlets 20 extends axially. The length of the twisted ribbon fuel rodlets 20 is supported by the support housing 210 (for twisted ribbon fuel rodlets 20 along the periphery) and by the tangential contact of envelope surfaces 28 of the twisted ribbon fuel rodlets 20 and the support housing 210 (for seated twisted ribbon fuel rodlets 20 interior from the periphery).

Figure 5D:
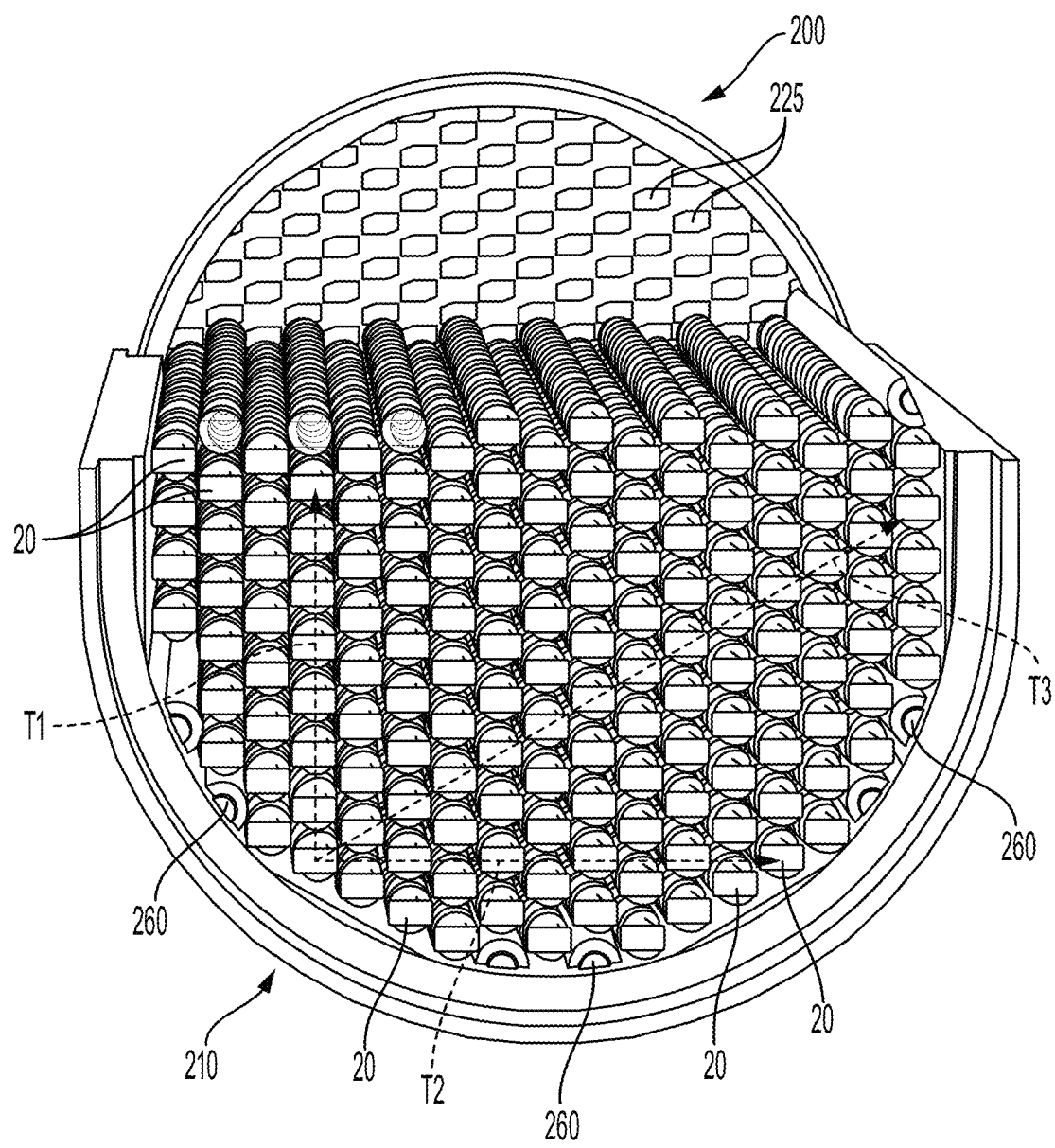

FIG. 5D is another schematic view showing the placement and arrangement of twisted ribbon fuel rodlets during the assembly of a fuel bundle (step S120). Relative to FIGS. 5A-B, in FIG. 5D more twisted ribbon fuel rodlets 20 have been seated in the receiving space 240 of the rodlet seating fixture 200.

The arrangement of twisted ribbon fuel rodlets 20 in the core region 22 has a translational symmetry, as exemplified by the dashed arrows T1, T2, and T3 in FIG. 5D. The translational symmetry aligns the twisted ribbon fuel rodlets 20 into rows, columns and diagonals. The translational symmetry improves the neutronics of the fuel bundle 10 and fuel assemblies formed with the fuel bundles 10. The translational symmetry of the twisted ribbon fuel rodlets 20 also improves thermal hydraulic performance of the fuel bundle 10 by preventing flow channeling through gaps in the ribbon packing array that might otherwise occur in, for example, circle packing arrays (compare hexagonal packing arrangement in FIG. 6A with no voids around the periphery to circular packing arrangement in FIG. 6B with voids around the periphery). Further, the translational symmetry ensures that each twisted ribbon fuel rodlets 20 is subjected to compression radially from the exterior fiber winding architecture of the multilayer casing 30.

Figure 5E:
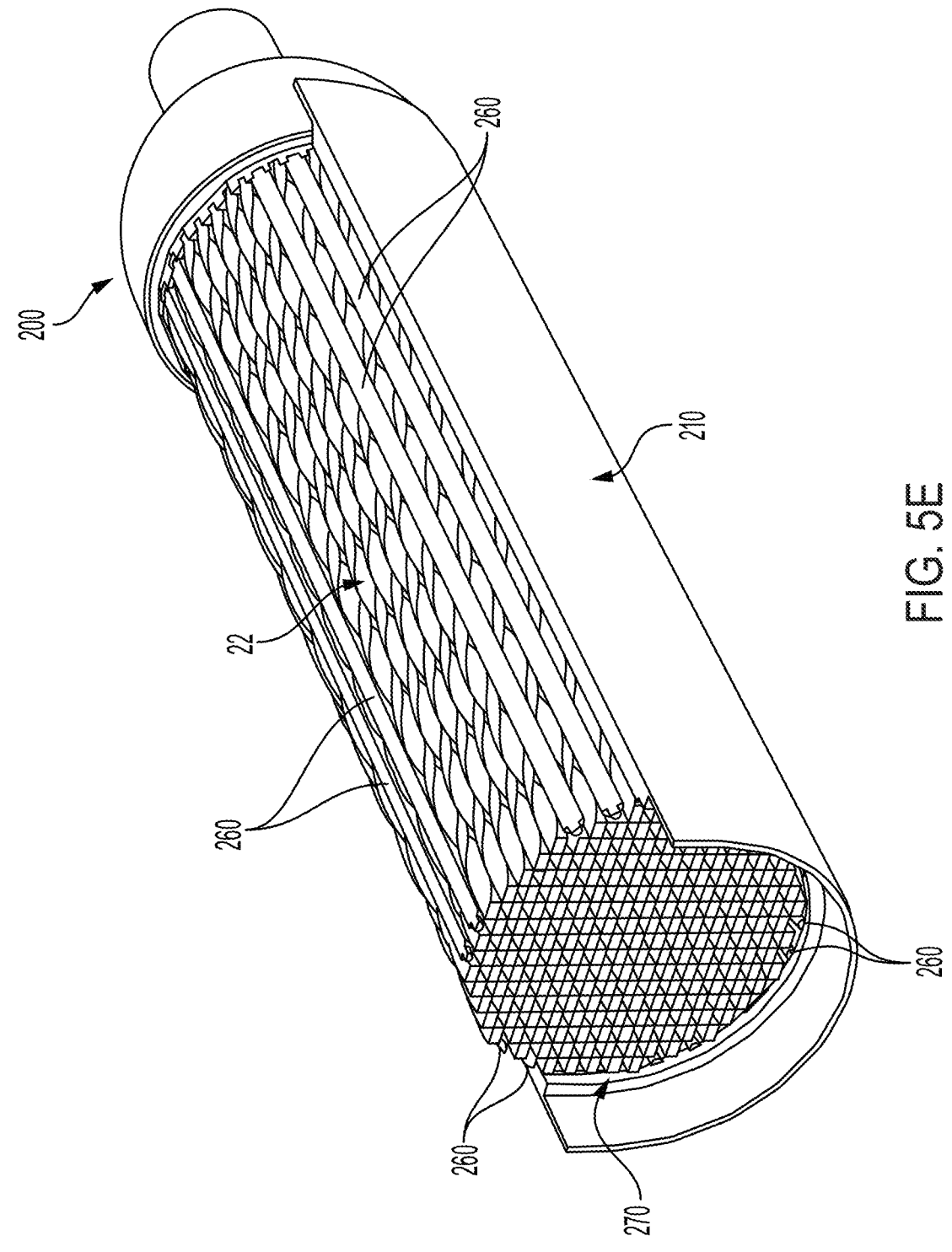

FIG. 5E is another schematic view showing the placement and arrangement of twisted ribbon fuel rodlets during the assembly of a fuel bundle (step S120). In FIG. 5E, seating of the twisted ribbon fuel rodlets 20 in the receiving space 240 of the rodlet seating fixture 200 is complete.

Figure 6A:
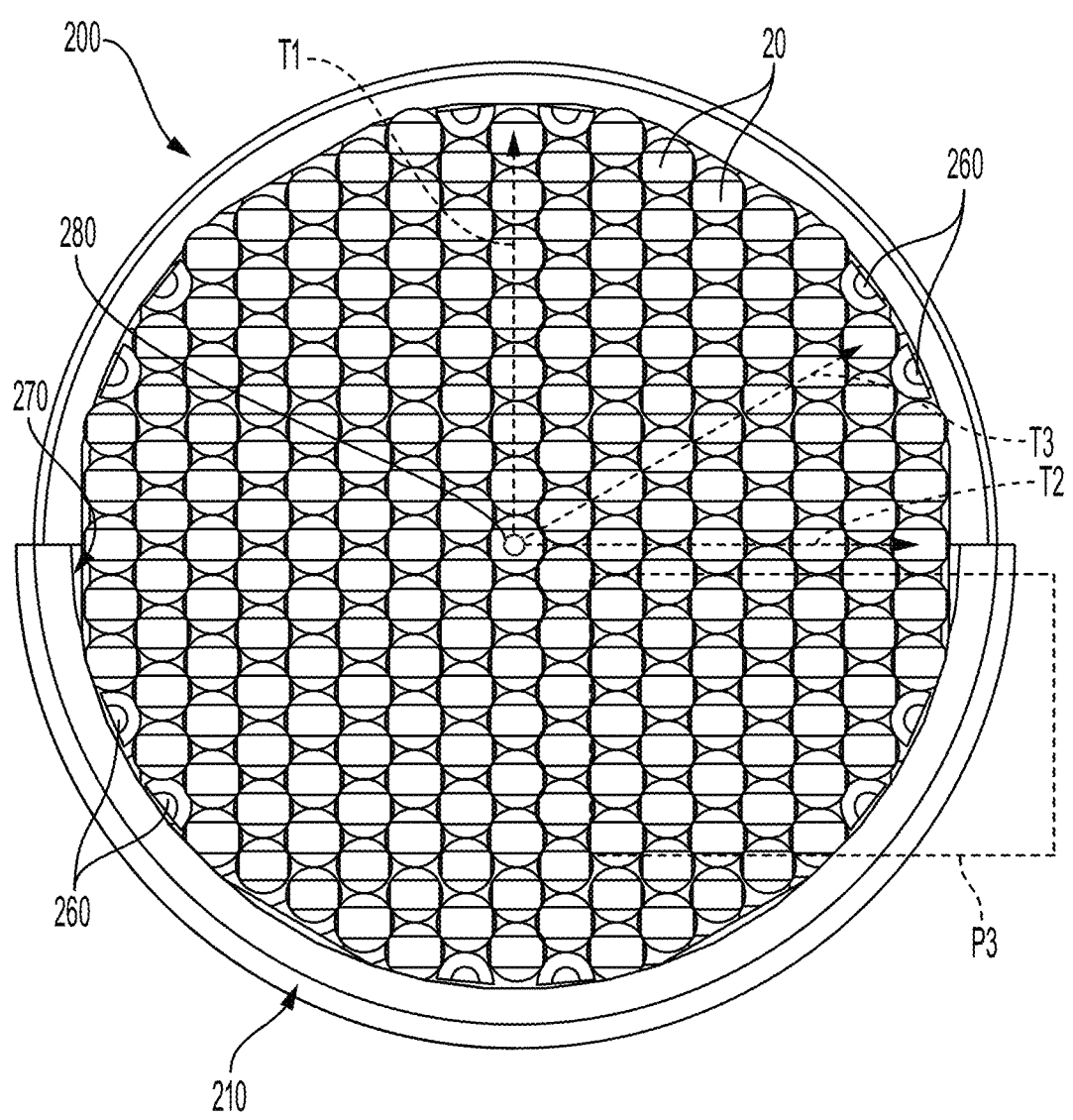
FIGS. 6A and 6B are schematic views illustrating the arrangement of twisted ribbon fuel rodlets in an assembled fuel bundle where the twisted ribbon fuel rodlets are arranged in a hexagonal packing arrangement (FIG. 6A) or arranged in a circle packing arrangement (FIG. 6B)
Figure 6B:
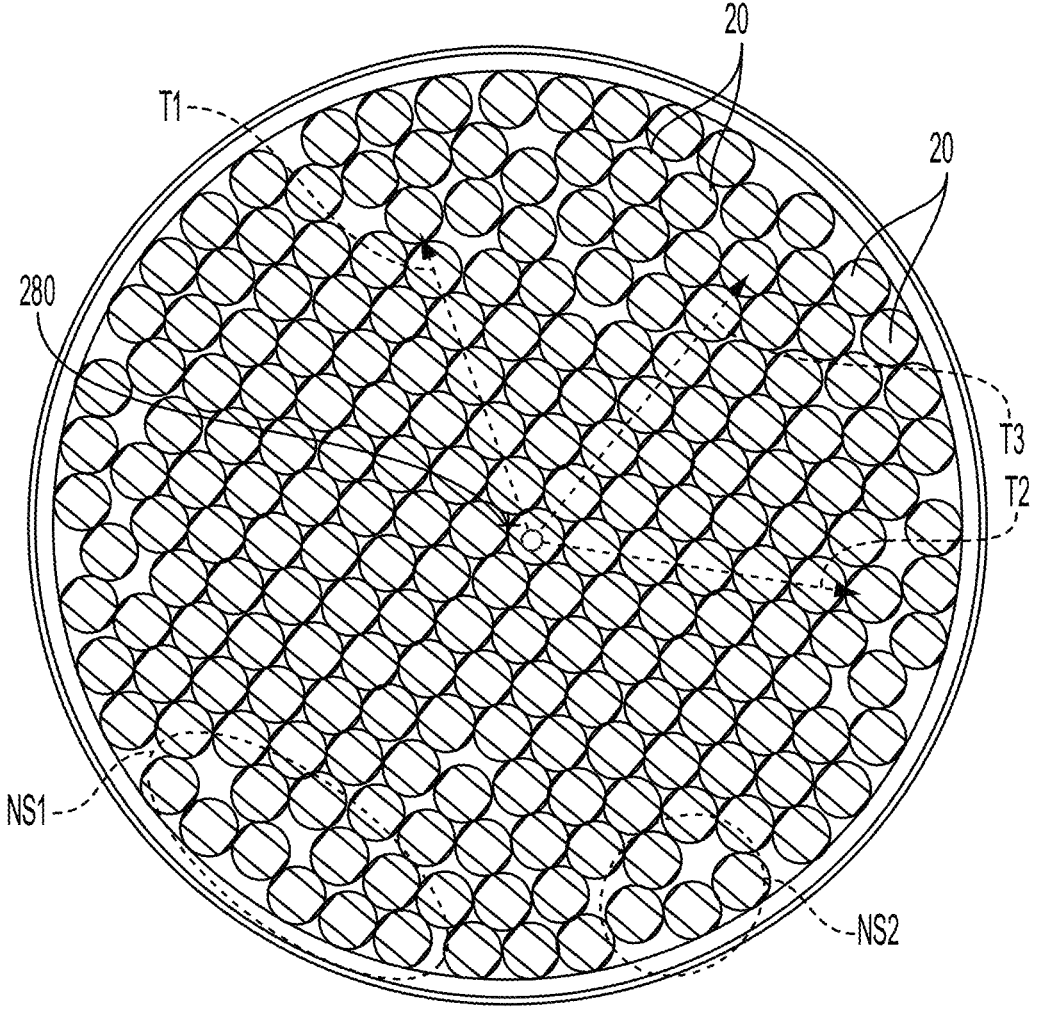

FIGS. 6A and 6B are schematic views illustrating the arrangement of twisted ribbon fuel rodlets in an assembled fuel bundle 20.

Figure 7:
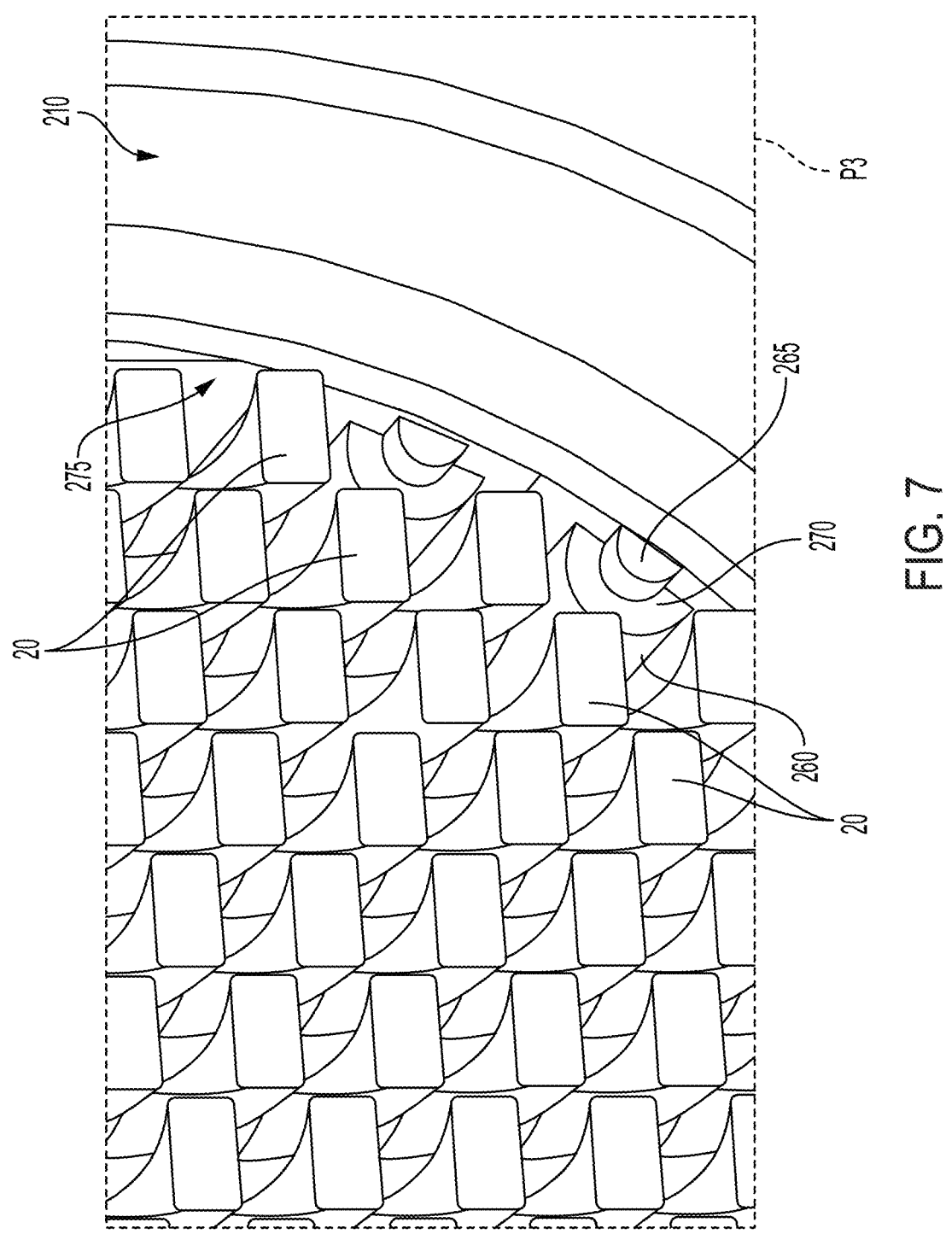
FIG. 7 is a magnified view of the area P3 in FIG. 6A.

In FIG. 6A, the twisted ribbon fuel rodlets 20 are arranged in a hexagonal packing arrangement. At the peripheral edge of the core region 22, the core region 22 has a nominal circular geometry. However, the radial distances of the peripheral circular geometry may not be consistent with integer multiples of the twisted ribbon fuel rodlets 20. If not an integer multiple, then there are some spaces at the edge of the assembled twisted ribbon fuel rodlets 20 that are not sufficiently large to accept the full size of the twisted ribbon fuel rodlets 20. This is particularly so for a hexagonal packing arrangement, where such spaces occur where the hexagonal packing arrangement meets the circular geometry. However, such spaces are sufficiently large (relative to the void spaces 40 between adjacent twisted ribbon fuel rodlets 20 that provides a path for coolant) that if left unfilled, the spaces would detrimentally impact the flow of coolant in the fuel bundle by providing a preferential flow path or by lowering the differential pressure drop between the first end 14 and the second end 16. To address these issues, filler rods 260 are located in the spaces. The filler rod 260 can have a composition including or not including a fissionable fuel component. For example, in some embodiments, the composition of the filler rod 260 is ZrUNbC; in other embodiments, the composition of the filler rod 260 is Zrc. Filler rods 260 can be a suitable geometry to occupy the space. For example, the filler rods can have a cross-section having the shape of a semi-circle or can have a convex outer surface joined by a chord. The filler rods 260 have a length in the longitudinal direction so that they extend from the rodlet seating fixture 200 the same length as the twisted ribbon fuel rodlets 20. One end of the filler rods 260 is seated in the rodlet seating fixture 200. As seen in FIG. 7, which is a magnified view of the area P3 in FIG. 6A, the end of the filler rod 260 has a peg end 265 that extends from the end surface 270 of the filler rod 260. The peg end 265 has a cross-sectional area that is less than the cross-sectional area of the filler rod 260 and has a height that is approximately the same as the height (H) of the protrusions 225 on the seating surface 220 of the rodlet seating fixture 200. The peg end 265 fits into the receiving space 240 (see FIG. 9) and is sufficiently rotatable in the receiving space 240 that the filler rod 260 can adapt an orientation to mate with the surfaces of the nearest twisted ribbon fuel rodlets 20 and at the same time mate with the inner surface 270 of the support housing 210.

Also, as previously shown in FIG. 5D, hexagonal packing arrangement of twisted ribbon fuel rodlets 20 in the core region 22 has a translational symmetry, as exemplified by the dashed arrows T1, T2, and T3. The translational symmetry aligns the twisted ribbon fuel rodlets 20 into rows (T2), columns (T1) and diagonals (T3). In example embodiments, the rows (T2) and columns (T1) are oriented at 90 degrees relative to each other and the diagonal (T3) is oriented at 45 degrees relative to both the rows (T2) and columns (T1). In FIG. 6A, the translation symmetry is centered on the axial centerline 280 of the core region 22 and extends to the outermost twisted ribbon fuel rodlets 20 at the periphery of the core region 22. Depending on diameter of the core region, the axial centerline 280 in the hexagonal packing arrangement can be centered on a twisted ribbon fuel rodlets 20. Alternatively, for a specific diameter of the core region, the size of the twisted ribbon fuel rodlets 20 can be altered to result in the axial centerline 280 in the hexagonal packing arrangement being centered on a twisted ribbon fuel rodlets 20. Preferably, patterns that have symmetry, such as N=199 are used as compared to patterns with no symmetry, such as N=210.

In FIG. 6B, the twisted ribbon fuel rodlets 20 are arranged in a circular packing arrangement. Filler rods 260 are not necessary when the twisted ribbon fuel rodlets 20 in the core region 22 are arranged in a circular packing arrangement. A circular packing arrangement of twisted ribbon fuel rodlets 20 in the core region 22 has a translational symmetry, as exemplified by the dashed arrows T1, T2, and T3 in FIG. 6B. The translational symmetry aligns the twisted ribbon fuel rodlets 20 into rows, columns and diagonals, but the angular separation between the rows (T2) and columns (T1) is greater than 90 degrees. The diagonal (T3) is oriented at the bisector of the angle between the rows (T2) and columns (T1). In FIG. 6B, the translation symmetry is not centered on the axial centerline 280 of the core region 22 and does not extend to the outermost twisted ribbon fuel rodlets 20 at the periphery of the core region 22. Rather, the translation symmetry is offset from the axial centerline 280 of the core region 22 and extends to twisted ribbon fuel rodlets 20 that are radially inward from the periphery of the core region 22. Depending on diameter of the core region, the axial centerline 280 in the circle packing arrangement can be centered on a twisted ribbon fuel rodlets 20. Furthermore, the circle packing arrangement results in areas of non-symmetry (see, e.g., areas NS1 and NS2).

Figure 8:
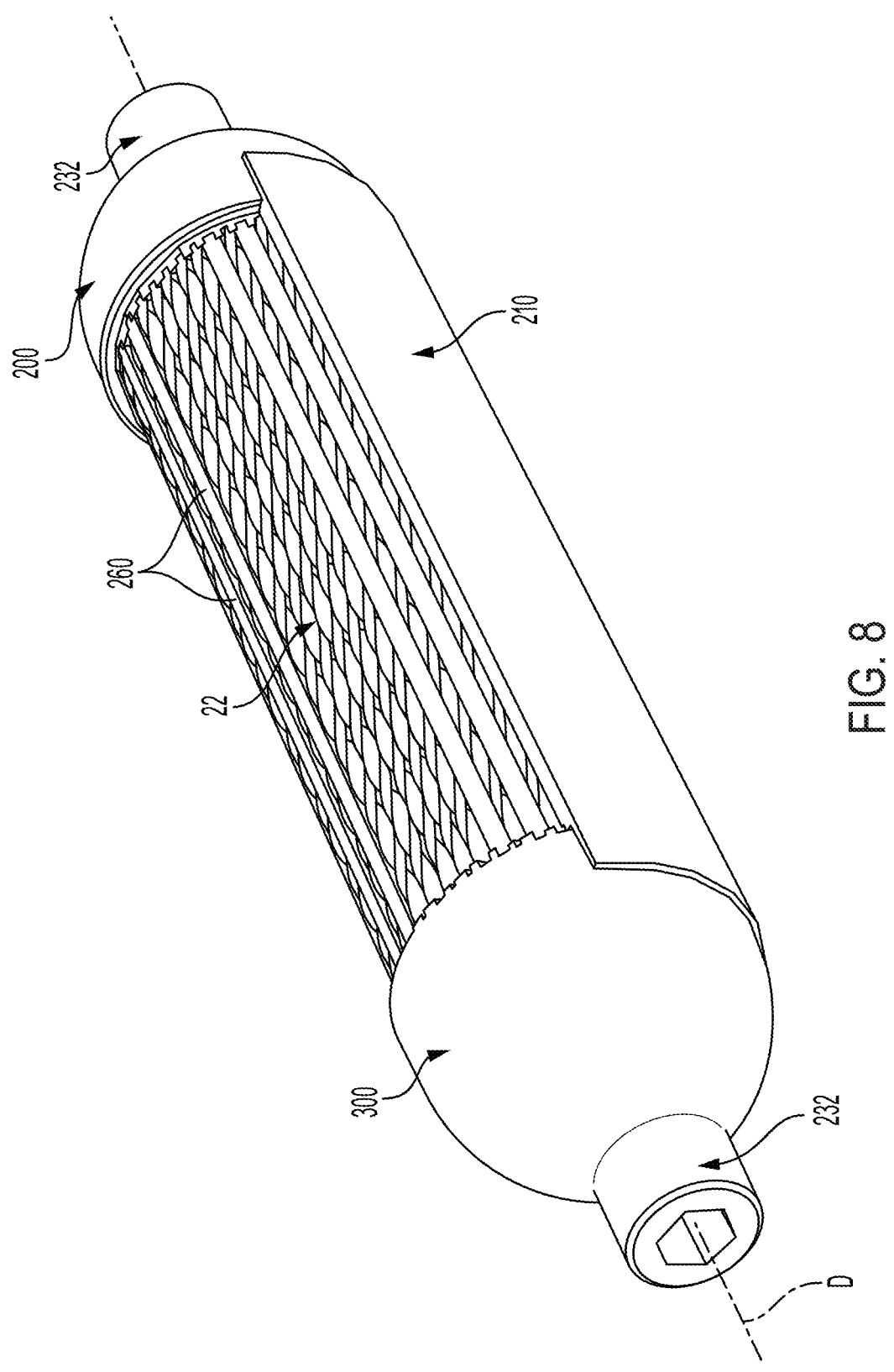
FIG. 8 is a schematic perspective view during assembly of a fuel bundle after attachment of an end cap.

After assembling the twisted ribbon fuel rodlets 20 with ends seated in the rodlet seating fixture 200 (step S120), an end cap 300 is attached (step S130). FIG. 8 is a schematic perspective view during assembly of a fuel bundle after attachment of an end cap 300. The surface of the end cap 300 oriented toward the twisted ribbon fuel rodlets 20 in the core region 22 has surface features that interface with the twisted ribbon fuel rodlets 20 to secure the arrangement of the twisted ribbon fuel rodlets 20. For example, in some embodiments the surface of the end cap 300 that interfaces with the twisted ribbon fuel rodlets 20 has an arrangement of protrusion 225 similar to that of seating surface 220 of the rodlet seating fixture 200. In other embodiments, the surface of the end cap 300 that interfaces with the twisted ribbon fuel rodlets 20 has a grid assembly or mesh that fits over the ends of twisted ribbon fuel rodlets 20. The grid assembly or mesh can interface with all the ends of twisted ribbon fuel rodlets 20 or can interface with a subset of ends of twisted ribbon fuel rodlets 20. For example, the ends of twisted ribbon fuel rodlets 20 in only some of the columns, rows, diagonals and combinations thereof can interface with the grid assembly or mesh and the tangential contact between twisted ribbon fuel rodlets 20 secured with the grid assembly or mesh provide additional support holding the entire arrangement of twisted ribbon fuel rodlets 20 in place.

The end cap 300 also connects to the support housing 210 and has a mandrel mating feature 232 that will engage with a cooperating mounting feature on a mandrel winder for rotation around the longitudinal axis D.

Figure 9:
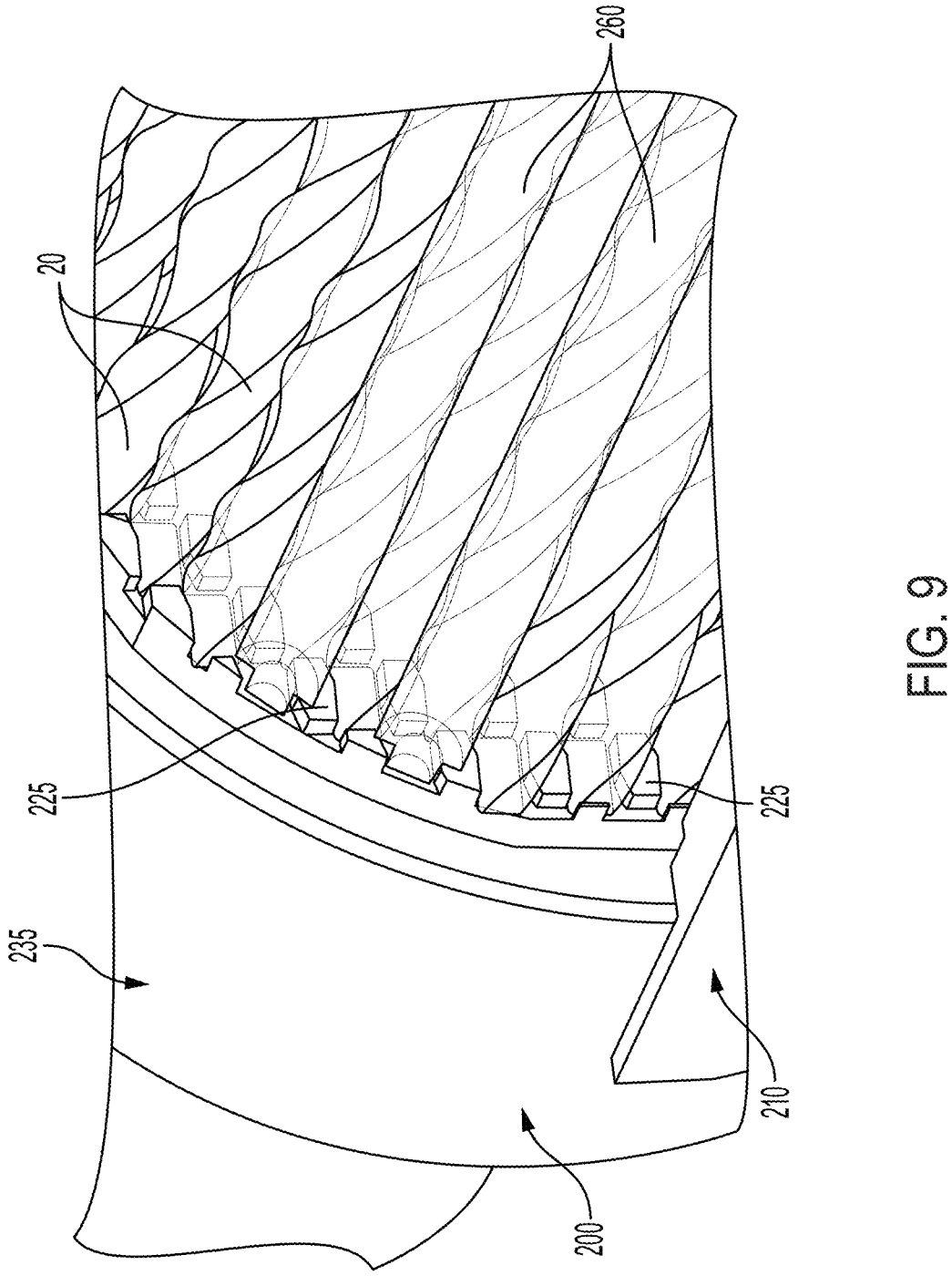
FIG. 9 is a magnified view during assembly of a fuel bundle and showing the ends of the twisted ribbon fuel rodlets and filler rods seated in the rodlet seating fixture.

FIG. 9 is a magnified view during assembly of a fuel bundle and showing the ends of the twisted ribbon fuel rodlets 20 and filler rods 260 seated in the rodlet seating fixture 200. In FIG. 9, the twisted ribbon fuel rodlets 20 and filler rods 260 are shown in partial transparency to facilitate observation of the twisted ribbon fuel rodlets 20 and filler rods 260 in the receiving space 240 between the protrusions 225.

Figures 10A, 10B:
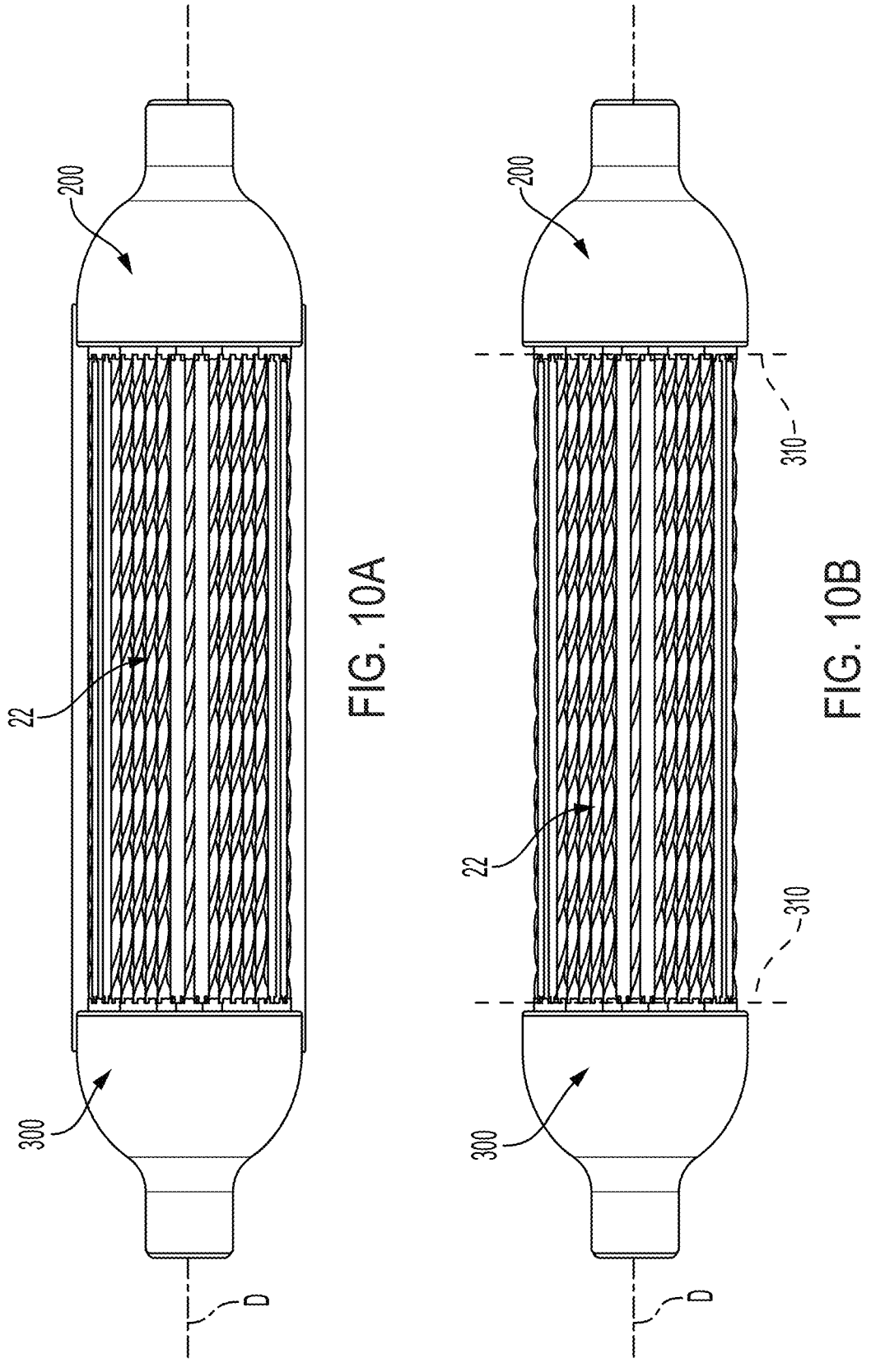
FIG. 10A is a schematic illustration of a fuel bundle during assembly and with a portion of the support housing removed to make visible the twisted ribbon fuel rodlets and filler rods.
FIG. 10B is a schematic illustration of a fuel bundle during assembly and with the entire support housing removed.

After attaching the end cap 300, the twisted ribbon fuel rodlets 20 and filler rods 260 (if present) seated in the rodlet seating fixture 200 and end cap 300 are prepared for application of the multilayer casing 30. In one embodiment, the lower support housing 210 is removed to form a pre-bundle in which the twisted ribbon fuel rodlets 20 and filler rods 260 (if present) are seated in the rodlet seating fixture 200 and end cap 300. FIG. 10A is a schematic illustration of a fuel bundle during assembly and with a portion of the support housing 210 removed to make visible the twisted ribbon fuel rodlets 20 and filler rods 260 in the core region 22. In another embodiment, a pre-bundle is formed by attaching additional sections of the support housing 210 to completely enclose the assembled twisted ribbon fuel rodlets 20 (and any filler rods 260 that may be present). FIG. 10B is a schematic illustration of a fuel bundle during assembly and with the entire support housing 210 removed.

Once a pre-bundle is formed, the method S100 continues and an optional infiltrant is introduced to the pre-bundle to occupy the void spaces 40 in the assembled twisted ribbon fuel rodlets 20 (step S140). An infiltrant is more easily introduced where the pre-bundle includes the support housing 210, which acts as a mold to contain the infiltrant. Additionally, use of the support housing allows vacuum assisted techniques to be used to infiltrate the infiltrant into the void spaces 40. The infiltrant has a sufficiently low viscosity to flow throughout the interior volume defined by the support housing 210 and into the void spaces 40, where the infiltrant will then solidify. The solidified infiltrant provides support to the assembled twisted ribbon fuel rodlets 20 so that the arrangement and relative spacing of the assembled twisted ribbon fuel rodlets 20 are held in place. Also, the solidified infiltrant protects the assembled twisted ribbon fuel rodlets 20 from damage during subsequent steps, such as encasing of the assembled twisted ribbon fuel rodlets 20 (and any filler rods 260 that may be present) in a multilayer casing 30 (see steps S150a and S150b). Additionally, the presence of the infiltrant prevents detritus from entering the while the void spaces 40. In some embodiments, the infiltrant is paraffin wax, which is heated to facilitate infiltration into the assembled twisted ribbon fuel rodlets 20, where it solidifies upon cooling.

After the optional infiltration with infiltrant, the assembled twisted ribbon fuel rodlets 20 (and any filler rods 260 that may be present) of the pre-bundle are encased in a multilayer casing 30. Two encasing methods are disclosed—a manual layup method (step S150a) and a mandrel winding method (step S150b).

In the manual layup method (S150a), the materials that forms the inner layer 32, the inner intermediate layer 34, the outer intermediate layer 36, and the outer layer 38 are each applied manually to form the various layers of the multilayer casing 30. In applying the inner layer 32, the material (such as graphite compressive felt insulation) is wrapped over the exposed core region 22 with an amount of material, e.g., about 15 mm) extending axially past each of the ends of the core region 22 and overlapping the rodlet seating fixture 200 and the end cap 300. The material of the inner layer 32 is fastened to remain in place, for example, by stitching the material together with carbon fiber or ZrC thread. The material of the inner intermediate layer 34 is then applied over the inner layer. The inner intermediate layer 34 is fastened to remain in place with, for example, carbon fiber or ZrC thread. In some instances, the inner intermediate layer 34 is a braided material and is axially slipped over the pre-bundle. The outer intermediate layer 36 is applied over the inner intermediate layer 34 by wrapping the pre-bundle under tension with the +45/−45 prepeg carbon-fiber fabric. Multiple layers of the +45/−45 prepeg carbon-fiber fabric can be used. The outer layer 38 is applied by overwrapping with the circumferentially-oriented, unidirectional prepreg fabric under tension. Overwrapping with the outer layer 38 preferably occurs at helix angles of equal to or greater than 80 degrees (for example, greater than 80 degrees to less than 90 degrees, equal to or greater than 85 degrees to equal to or less than 90 degrees, or equal to or greater than 86 degrees to equal to or less than 88 degrees). In some embodiments, overwrapping with the outer layer 38 utilizes non-geodesic winding parameters, and the helix angle of the fiber winding can be varied as a function of length down the pre-bundle to optimize strength in specific axial locations. During overwrapping with the outer layer 38, sufficient wraps are applied so the overall outer diameter of the wrapped pre-bundle is approximately 2 mm over the desired final diameter of the fuel bundle to allow for machining to final dimension. The wrapped pre-bundle is then cured at temperature to cure the various layers into a multilayer casing 30. An example curing process includes curing at 94° C. using a ramped heating schedule, typically per the manufacturer's specifications.

In the mandrel winding method (step S150b), the materials that form the inner layer 32, the inner intermediate layer 34, the outer intermediate layer 36, and the outer layer 38 are each applied using filament winding processes in which continuous fibers or rovings are applied to the pre-bundle, which functions as a mandrel in the filament winding processes, to form the various layers of the multilayer casing 30. Inclusion of CNC manufacturing techniques provides maximum control over fiber placement and uniformity.

Figures 11A, 11B, 11C:
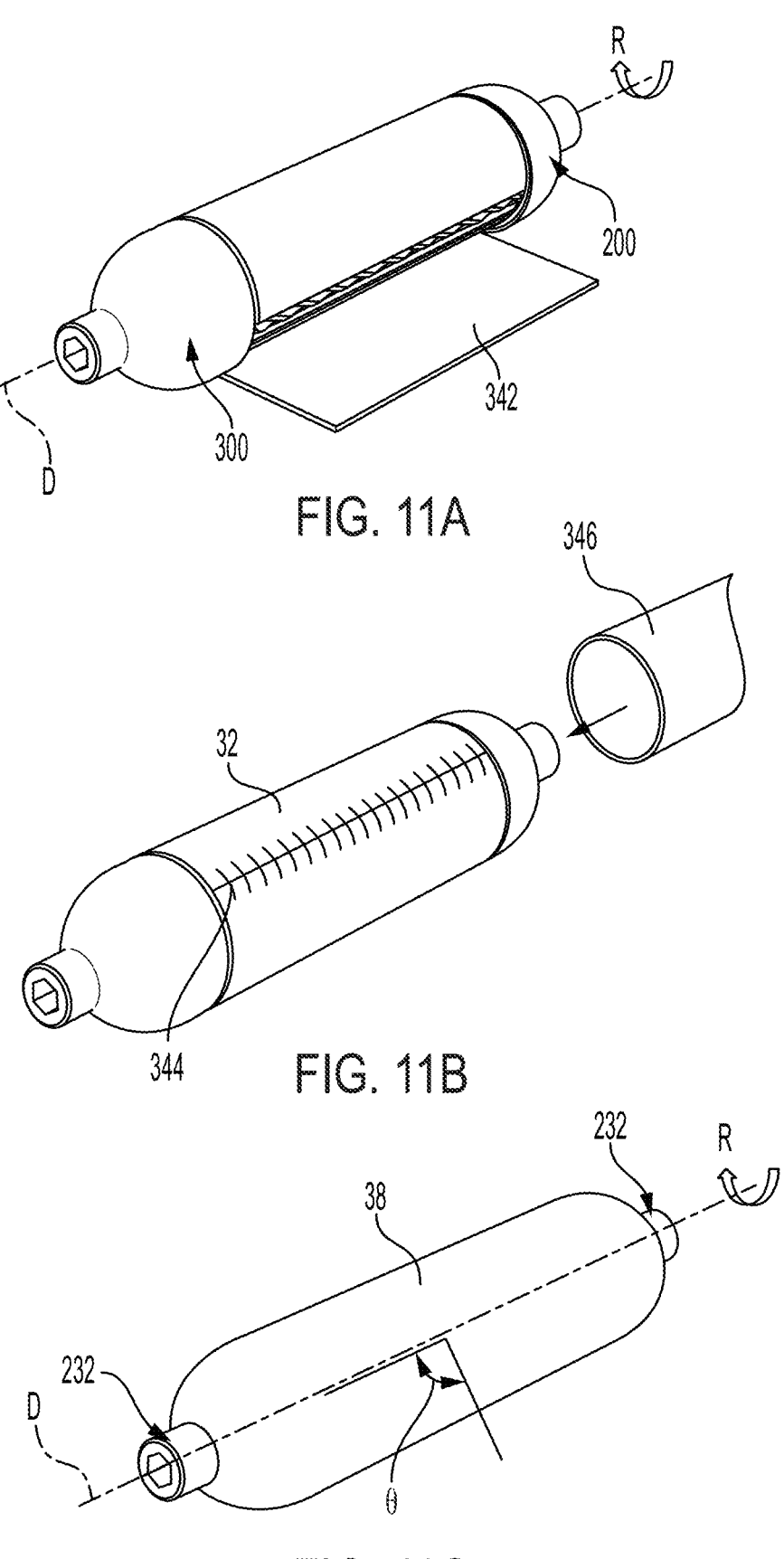
FIGS. 11A-C show the fuel bundle at various points during the process of fiber mandrel winding of a multilayer casing.

In applying the inner layer 32, the material (such as graphite compressive felt insulation) is wrapped over the exposed core region 22 with an amount of material, e.g., about 15 mm) extending axially past each of the ends of the core region 22 and overlapping the rodlet seating fixture 200 and the end cap 300. The material of the inner layer 32 is fastened to remain in place, for example, by stitching the material together with carbon fiber or ZrC thread 344. FIG. 11A shows the material 342 of the inner layer 32 being applied to the pre-bundle.

The material 346 of the inner intermediate layer 34 is then applied over the inner layer 32. The inner intermediate layer 34 is fastened to remain in place with, for example, carbon fiber or ZrC thread. In some instances, the inner intermediate layer 34 is a braided material and is axially slipped over the pre-bundle. FIG. 11B shows an example of the material of the inner intermediate layer 34 being applied to the pre-bundle by slipping it axially over the pre-bundle.

The outer intermediate layer 36 is applied over the inner intermediate layer 34 by wrapping the pre-bundle under tension with the +45/−45 prepeg carbon-fiber fabric. Multiple layers of the +45/−45 prepeg carbon-fiber fabric can be used. The outer layer 38 is applied by overwrapping with the circumferentially-oriented, unidirectional prepreg fabric under tension. Both the outer intermediate layer 36 and the outer layer 38 are applied using mandrel winding techniques and FIG. 11C shows an example of mandrel winding of the outer layer 38. Overwrapping with the outer layer 38 preferably occurs at helix angles ($\theta$) of equal to or greater than 80 degrees (for example, greater than 80 degrees to less than 90 degrees, equal to or greater than 85 degrees to equal to or less than 90 degrees, or equal to or greater than 86 degrees to equal to or less than 88 degrees). In some embodiments, overwrapping with the outer layer 38 utilizes non-geodesic winding parameters, and the helix angle of the fiber winding can be varied as a function of length down the pre-bundle to optimize strength in specific axial locations. Further, with mandrel winding techniques, one or both of the outer intermediate layer 36 and the outer layer 38 extend axially past the interfaces 310 and at least partially over the end cap surface 235, preferably over the end cap surface 235 and extending to the mandrel mating feature 232. Oscillating the pre-bundle about the axis D as the mandel rotates (R) moves the tow winding in corresponding oscillating directions during mandrel winding.

Various mandrel winding methods can be used, particularly for the outer layer 38. Example mandrel winding methods include wet winding and prepreg or dry winding with vacuum resin infusion. Note that the infiltrant protects the core region 22 from the materials of the mandrel winding methods from penetrating into the core region 22.

In both the manual layup method (step S150*a*) and the mandrel winding method (step S150*b*), sufficient wraps are applied during overwrapping with the outer layer 38 so the overall outer diameter of the wrapped pre-bundle is approximately 2 mm over the desired final diameter of the fuel bundle to allow for machining to final dimension.

In both the manual layup method (step S150*a*) and the mandrel winding method (step S150*b*), the wrapped pre-bundle is then cured at temperature to solidify the various layers into a multilayer casing 30. An example curing process includes curing at 94° C. using a ramped heating schedule, typically per the manufacturer's specifications.

In both the manual layup method (step S150*a*) and the mandrel winding method (step S150*b*), a further step applying a shrink wrap can be included after applying the outer layer 38 and before curing.

Figures 12, 13:
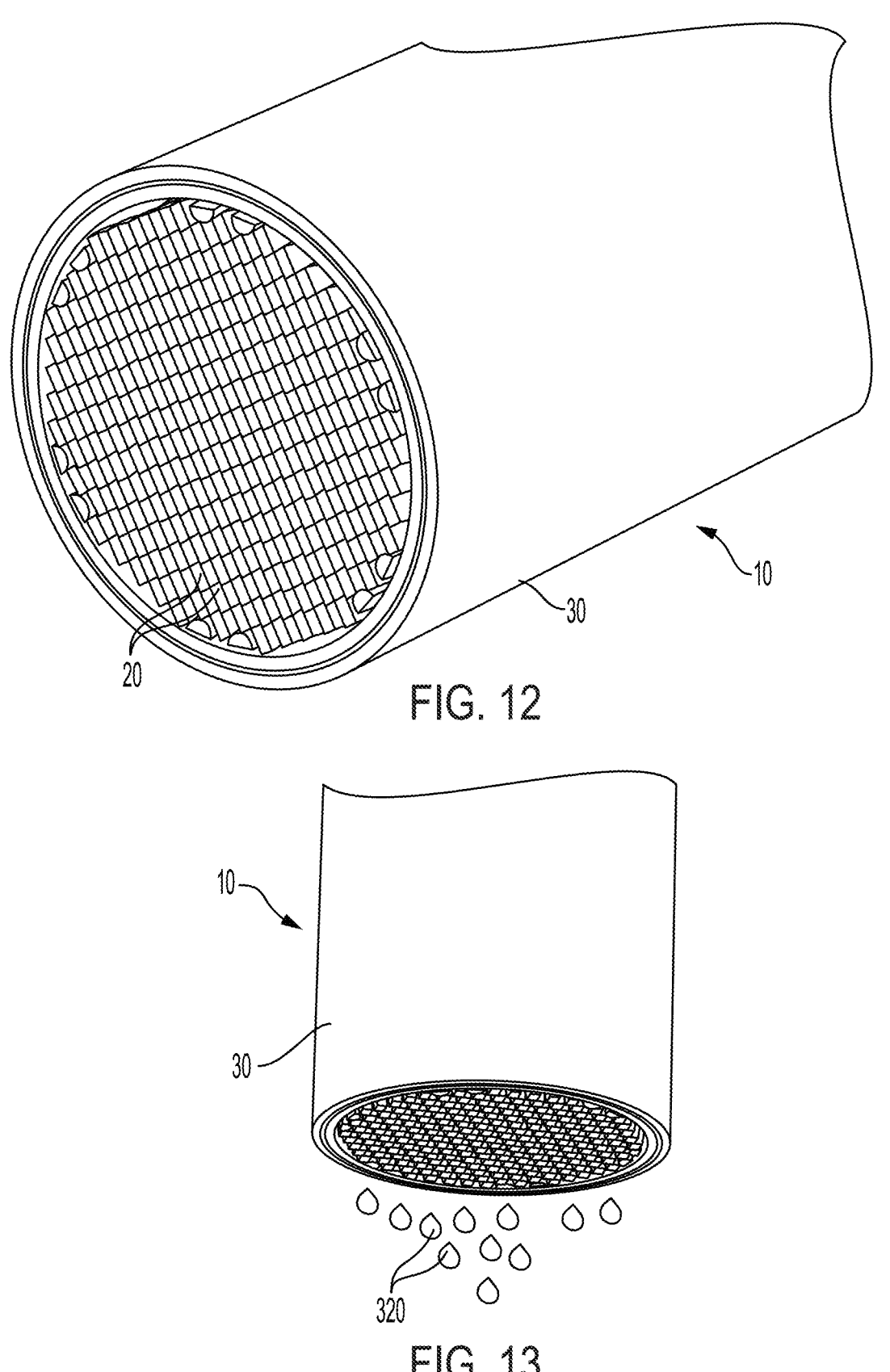
FIG. 12 is a schematic perspective view of an end of the assembled fuel bundle after the end cap has been removed.
FIG. 13 is a schematic illustration of removal of the infiltrant from the void space in the assembled twisted ribbon fuel rodlets.

After forming the multilayer casing 30 by either the manual layup method (step S150*a*) or the mandrel winding method (step S150*b*), the encased pre-bundle is further processed to final form. This includes removing the rodlet seating fixture 200 and end cap 300 and surface finishing the outer surface of the multilayer casing 30 to final dimensions (step S160). The rodlet seating fixture 200 and end cap 300 can be removed by, for example, cutting of the ends at the interfaces 310 of the rodlet seating fixture 200 and end cap 300 with the core region 22 or a short distance, i.e., less than 3-5 mm, axially inward from the interfaces 310. Surface finishing includes one or more of machining the outer diameter of the fuel bundle 10 to final dimensions, machining the outer diameter of the fuel bundle to be concentrically round, and machining the outer diameter of the fuel bundle to a uniform outer diameter. Example machining processes include centerless grinding. FIG. 12 is a schematic perspective view of an end of the assembled fuel bundle 10 after the end cap 300 has been removed.

If present, the infiltrant is removed from the void space 40 (S170). Infiltrant removal can include heating or dissolution with a solvent, such as acetone (depending on infiltrant material). FIG. 13 is a schematic illustration of removal of the infiltrant 320 from the void space 40 in the assembled twisted ribbon fuel rodlets 20. Infiltrant removal can occur after removal of one or both of the rodlet seating fixture 200 and end cap 300 and completion of surface finishing. Optionally the infiltrant 320 can be removed once one or both of the rodlet seating fixture 200 and end cap 300 are removed and further machining and surface finishing can occur after infiltrant removal.

Additional steps of heat treatment, pyrolysis, and prepeg burnout can also be included in method S100. For example, pyrolysis can improve binding of the various fibers with the matrix material in the fiber architecture. Also for example, repeated infiltrant infiltration and polymer infiltration and pyrolysis (PIP) cycles can add density to the multilayer casing 30 to improve strength of the multilayer casing 30. In some embodiments, vacuum infusion PIP or spray PIP on the outer diameter surface of the multilayer casing 30 can be used to concentrate the increase in density on outer side of the multilayer casing 30, which leaves a void fraction in regions adjacent the inner diameter surface of the multilayer casing 30 that advantageously increases the insulative performance of the multilayer casing 30.

The disclosed method of manufacturing a fuel bundle with twisted ribbon fuel rodlets and a multilayer casing (S100) has several advantages resulting from the compressive bundling structure. For example, compressive bundling strengthens the fuel bundle 10 by providing cylindrical preload on the assembled twisted ribbon fuel rodlets 20, thereby mitigating or avoiding cracks in the individual ribbons. Also for example, compressive bundling prevents twisted ribbon fuel rodlets 20 bending failures after the brittle to ductile transition at ~1800° C. Also for example, compressive bundling mitigates the adverse effects of cracking of the twisted ribbon fuel rodlets 20 if they do occur, as twisted ribbon fuel rodlets 20 cannot move axially and are constrained on all other rotation angles. Here, a fractured twisted ribbon fuel rodlets 20 in the fuel bundle would only minimally impact reactor dP, preventing runaway axial dP forces on the twisted ribbon fuel rodlets 20, preserving reactor life and preventing overheating the fuel caused by cooling starvation in blocked flow regions of the reactor. Also for example, compressive bundling allows for a high technology readiness level manufacturing method to organize ribbons and avoid random arrangements of ribbons, which is less volumetrically efficient.

Figure 14A:
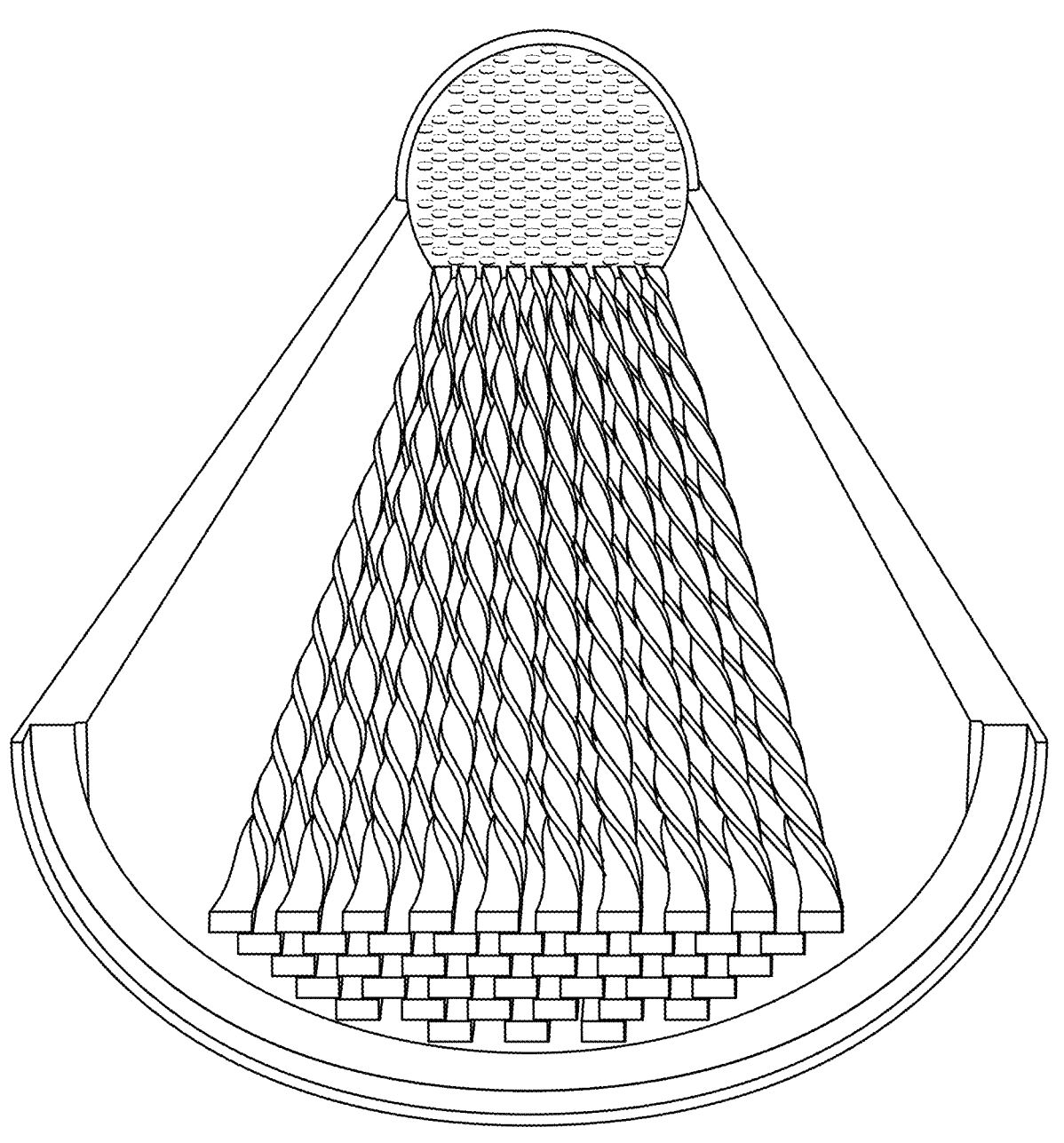
FIGS. 14A-C are images show the arrangement of twisted ribbon fuel rodlets at different stages during assembly of a prototype fuel bundle.
Figure 14B:
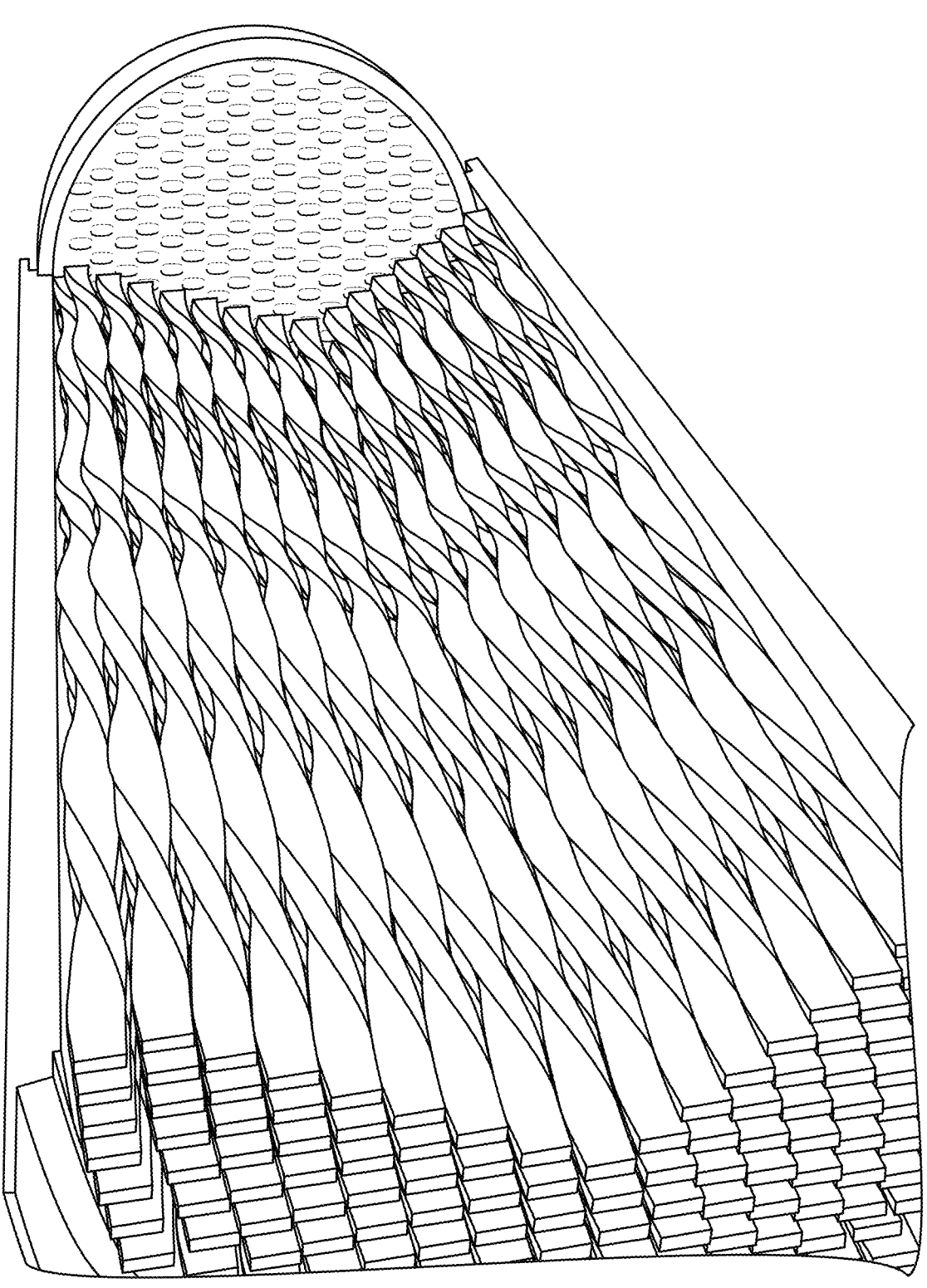
Figure 14C:
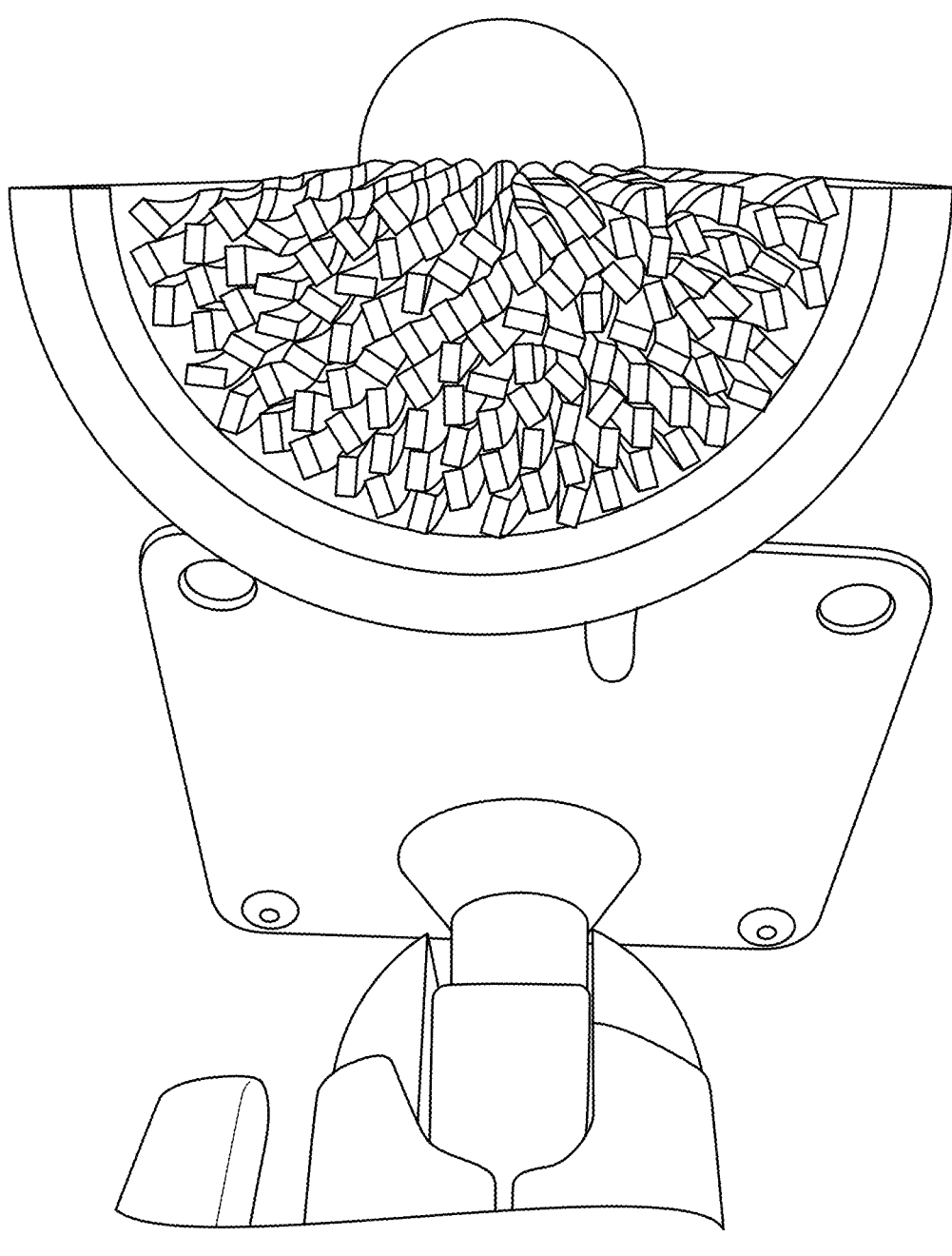

FIGS. 14A-C are images show the arrangement of twisted ribbon fuel rodlets at different stages during assembly of a prototype fuel bundle.

Figures 15A, 15B:
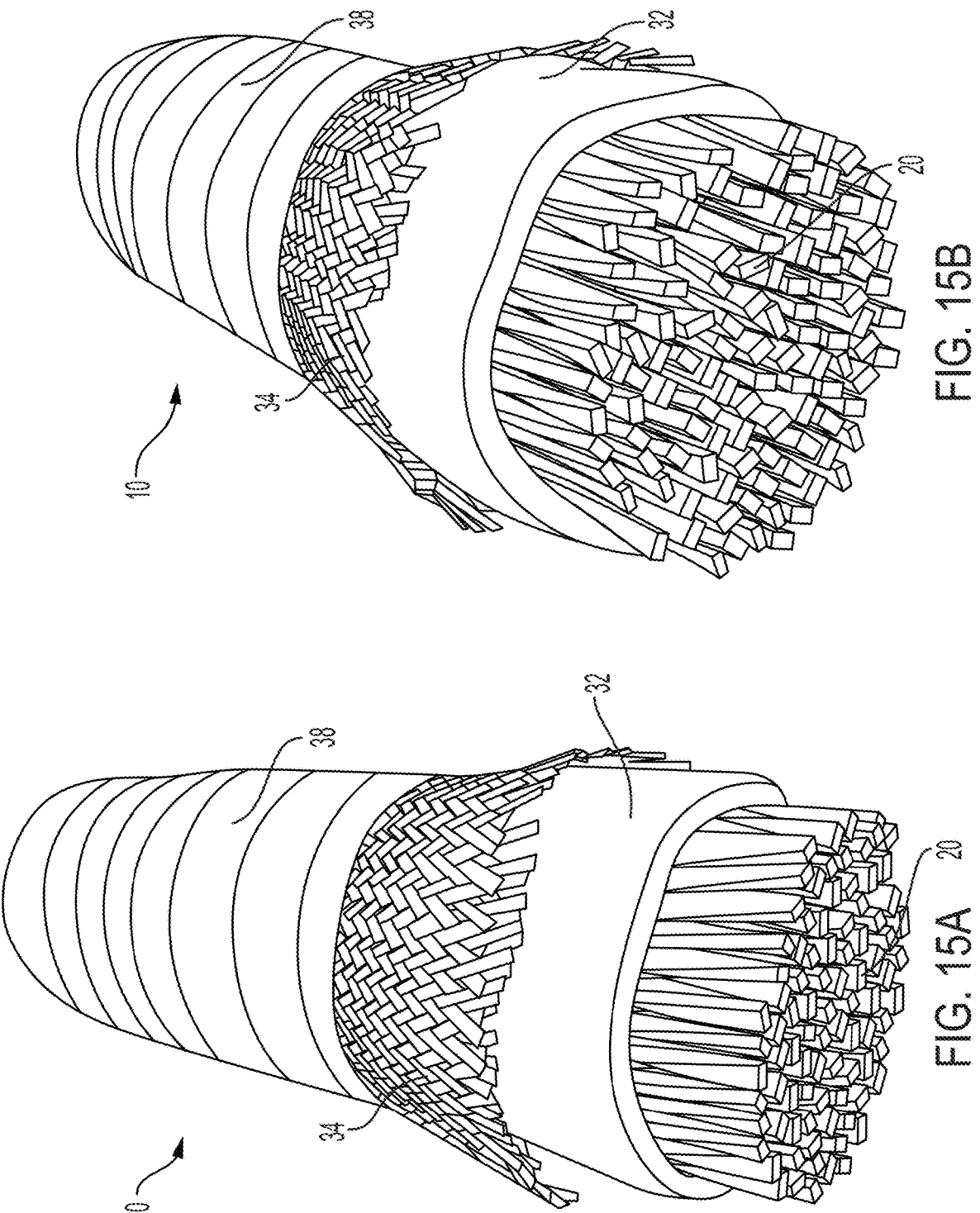
FIGS. 15A-B are images showing a prototype fuel bundle in two perspective views and with the various layers exposed.

FIGS. 15A-B are images showing a prototype fuel bundle in two perspective views and with the various layers exposed. For example, visible in the prototype fuel bundle 10 in FIGS. 15A-B are twisted ribbon fuel rodlets 20, inner layer 32, inner intermediate layer 34 and outer layer 38.

Figure 16:
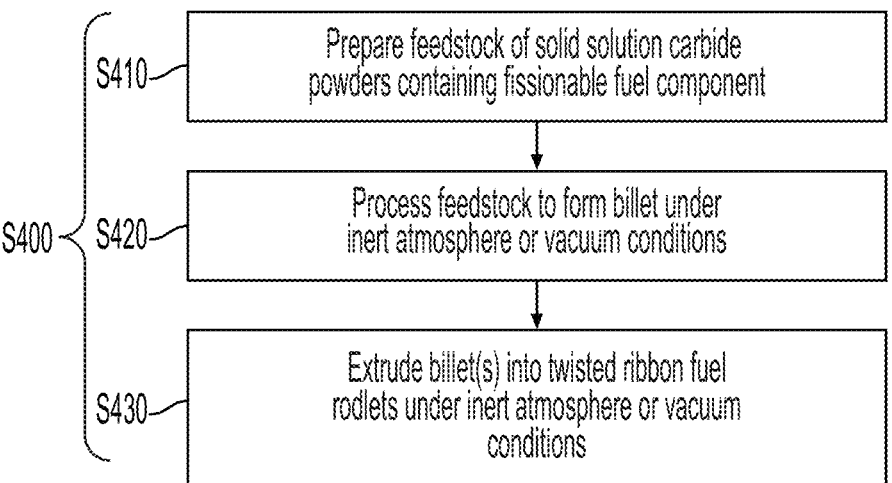
FIG. 16 is a flow diagram setting forth the general processes in an embodiment of a method of manufacturing twisted ribbon fuel rodlets.

FIG. 16 is a flow diagram setting forth the general processes in an embodiment of a method of manufacturing twisted ribbon fuel rodlets (S400). The general processes include preparing feedstock of solid solution carbide powders containing a fissionable fuel component (S410), processing the feedstock to form a billet (S420), and extruding the billet or plurality of billets into twisted ribbon fuel rodlets (S430). Both the processing of the feedstock to form a billet (S420) and the extruding of the billet or plurality of billets into twisted ribbon fuel rodlets (S430) occurs under inert atmosphere or vacuum conditions.

Figure 17A:
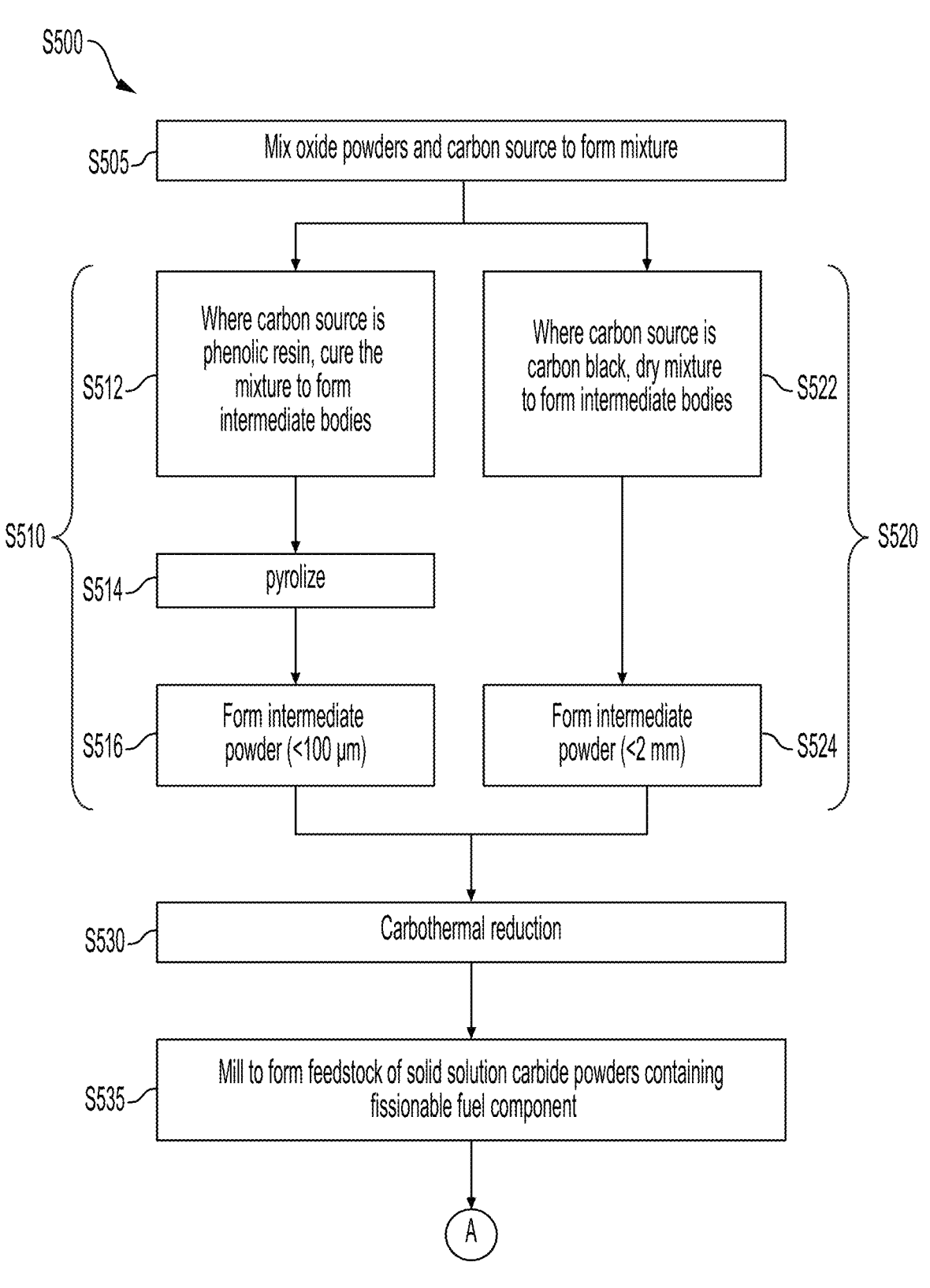
FIGS. 17A-C is a flow diagram setting forth in more detail various steps in an embodiment of a method of manufacturing twisted ribbon fuel rodlets.
Figure 17B:
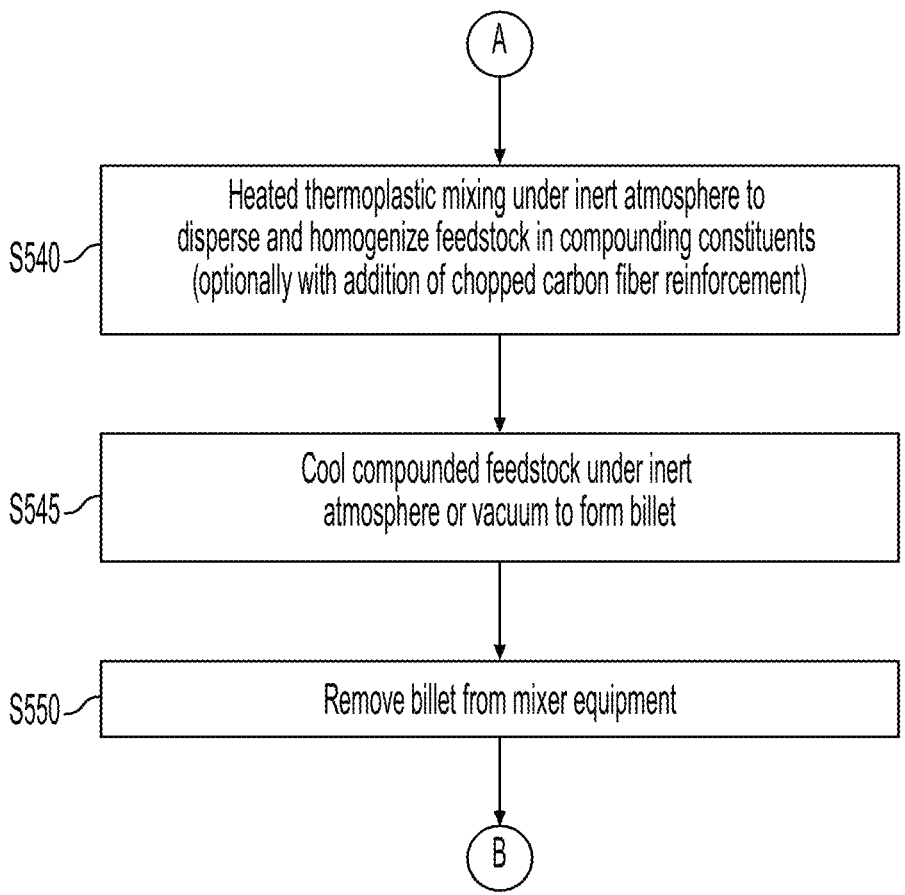
Figure 17C:
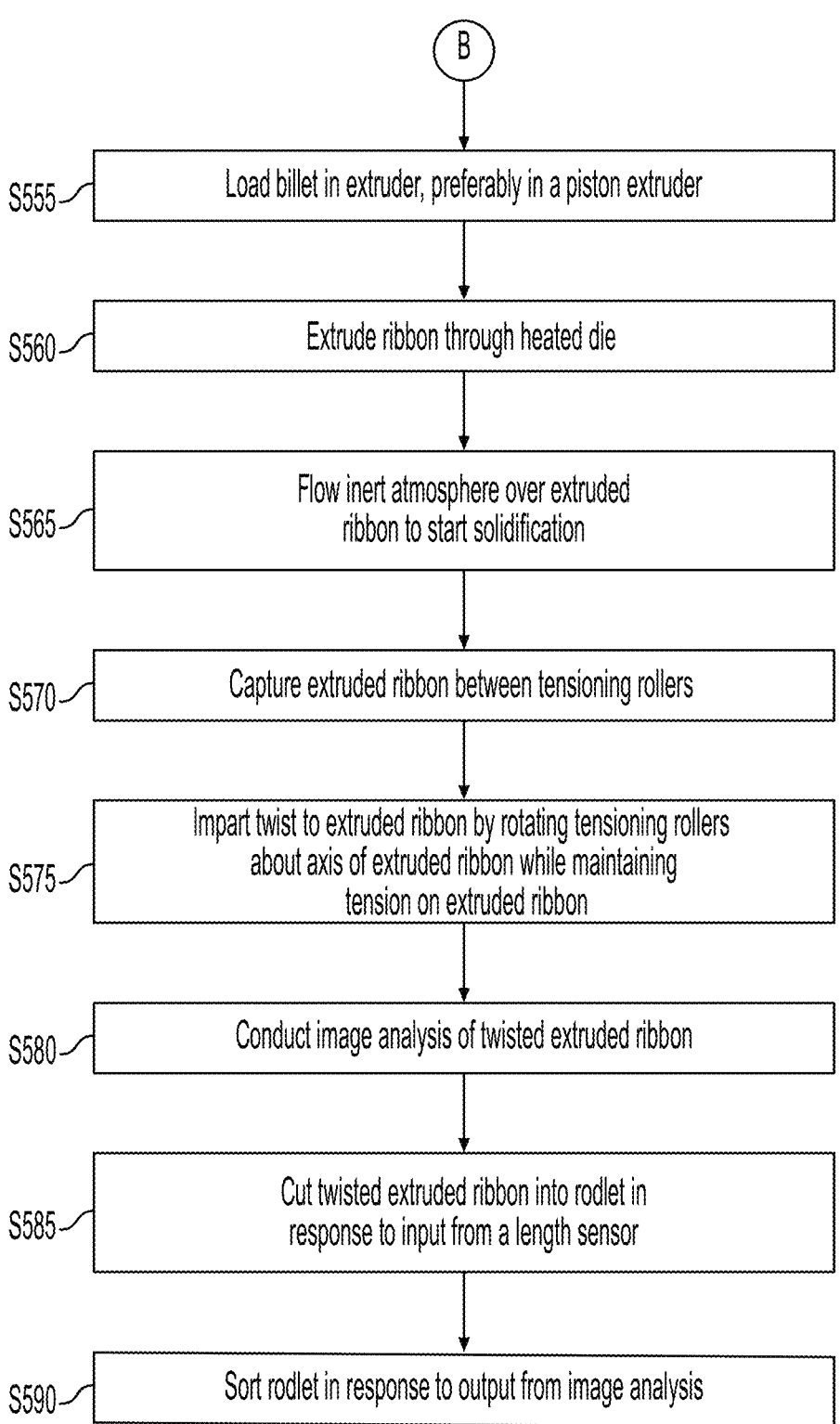

FIGS. 17A-C is a flow diagram setting forth in more detail various steps in an embodiment of a method of manufacturing twisted ribbon fuel rodlets (S500). The method (S500) begins by mixing oxide powders and a carbon source to form a mixture (S505). In example embodiments, the oxide powders include zirconium oxide nano-powder (<50 nm), niobium oxide (<1 µm) and an oxide of a fissionable fuel component, such as uranium oxide. The carbon source can be either a phenolic resin or carbon black. Additional components used to form the mixture include one or more of a diluent, a dispersant and a binder. Table 2 sets forth the components and their amounts for an example embodiment using (i) phenolic resin as a carbon source (Composition 1) and (ii) carbon black as a carbon source (Composition 2).

TABLE 2

Compositions of Mixture

| Composition 1 (phenolic resin) | Composition 2 (carbon black) |
|---|---|
| 10-35 wt % ZrO₂ nano-powder (<50 nm) | 10-35 wt % ZrO₂ nano-powder (<50 nm) |
| 0-16 wt % Nb₂O₅ (<1 µm) | 0-16 wt % Nb₂O₅ (<1 µm) |
| 5-30 wt % UO₃ | 5-30 wt % UO₃ |
| 15-30 wt % phenolic resin | 7-15 wt % carbon black |
| 40-45 wt % isopropyl alcohol | 40-45 wt % isopropyl alcohol |
| | 0-5 wt % polyethylene glycol (600) diacrylate |
| | 0-3 wt % polypropoxy quaternary ammonium chloride |

The processing steps to form an intermediate powder differ based on the carbon source. Step S510 sets forth steps where the carbon source is phenolic resin and steps S520 sets forth steps where the carbon source is carbon black.

Where the carbon source is phenolic resin, the mixture (having, for example, Composition 1) is poured into molds and cured to form intermediate bodies (S512). An example curing process is heating at 120° C. for 4 hours. The intermediate bodies are then pyrolized in inert atmosphere or vacuum (S514). An example pyrolyzing process is heating at 800 C in argon. After pyrolyzing, an intermediate powder is formed (S516). An example process for forming the intermediate powder includes mechanically breaking apart the pyrolized intermediate body by, for example a mortar and pestle or a mill, and then sieving to attain a powder with diameters less than 100 microns (µm). In example embodiments, the intermediate powder is a solid particle ranging in size from 1-100 µm and composed of a matrix of solid carbon (from the pyrolyzed phenolic resin solid particles) with fine oxide nano-powders dispersed within the matrix.

Where the carbon source is carbon black, the mixture (having, for example, Composition 2) is dried to form intermediate bodies (S522). An example drying process is evaporating the isopropyl alcohol, with or without heat. After drying, an intermediate powder is formed (S524). An example process for forming the intermediate powder includes mechanically breaking apart the intermediate body by, for example a mortar and pestle or a mill, and then sieving to attain granules with diameters less than 2 microns, alternatively 1-2 microns. In example embodiments, the granules are agglomerates ranging in size from 1-2 µm and composed of oxide and carbon nano-powders that are held together by surface forces.

The powders from step S510 or granules from step S520 formed into pellets (with or without a binder, such as a 10 wt % binder in polyvinyl alcohol solution) and then subjected to carbothermal reduction (S530). An example carbothermal reduction process includes heating at 1300° C. to 1700° C. in inert atmosphere, such as argon, or vacuum.

Subsequently, the carbothermally reduced material is mechanical processed to form a feedstock of solid solution carbide powders containing a fissionable fuel component (S535). Mechanical processing can be any suitable mechanical processing, such as milling. Mechanical processing can also include sieving to sort particle sizes. The composition of the feedstock can range in composition following the formula $(U_a Zr_b Nb_c)C_d$, where $0.05 < a < 0.4$, $0 < b < 0.95$, $0 < c < 0.4$, and $0.7 < d < 1$.

Figure 18A:
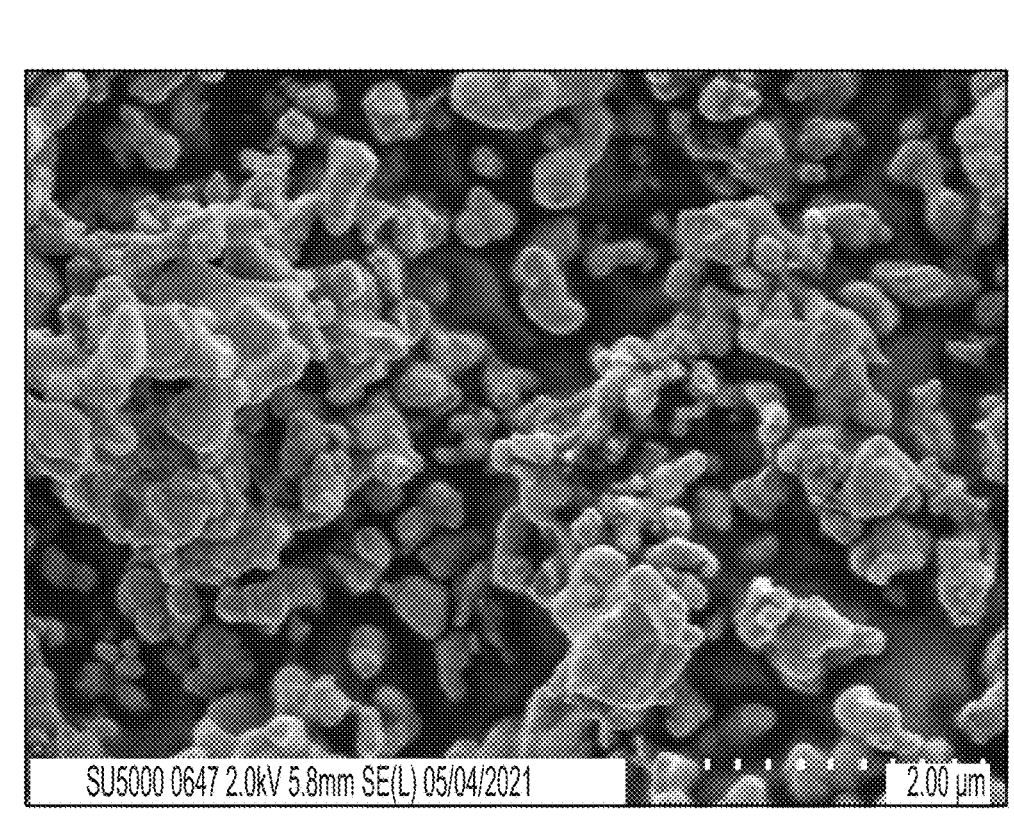
FIGS. 18A and 18B are an SEM image (FIG. 18A) showing solid solution carbide powder feedstock formed with a phenolic resin carbon source and (FIG. 18B) associated X-ray diffraction pattern.
Figure 18B:
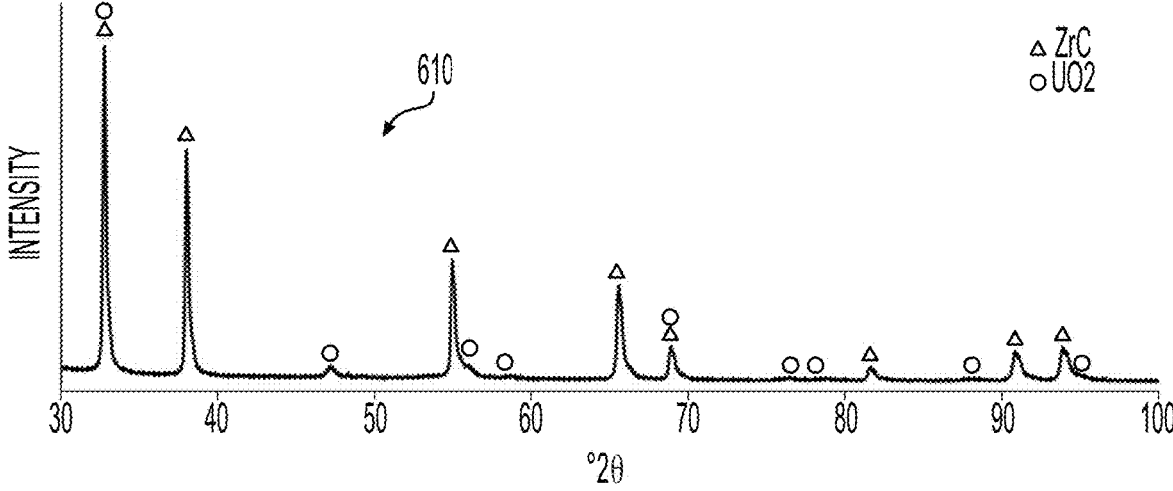

FIGS. 18A and 18B are an SEM image (FIG. 18A) showing solid solution carbide powder feedstock formed with a phenolic resin carbon source and (FIG. 18B) associated X-ray diffraction pattern. Visible in the SEM image 600 are feedstock powders, which have an observed size that is <500 nm (for a majority of the particles in the feedstock powder) with a minority of particles approaching 1 micron in size. The X-ray diffraction pattern 610 exhibits peaks for ZrC and UO₂. There is a UO₂ peak in the X-ray diffraction pattern 610 for solid solution carbide powder feedstock formed with a phenolic resin carbon source because the material has not fully reacted to solid solution carbide and there is still UO₂ present in the feedstock. During subsequent processing, such as extrusion processing and heat treatments, the remaining UO₂ will react and form the desired solid solution carbide. Post-processing, the material will then exhibit an X-ray diffraction pattern consistent with a single-phase material and with peaks characteristic of ZrC, but shifted to a lower diffraction angle due to uranium doping in the crystal structure and increasing the lattice parameter.

Figure 19A:
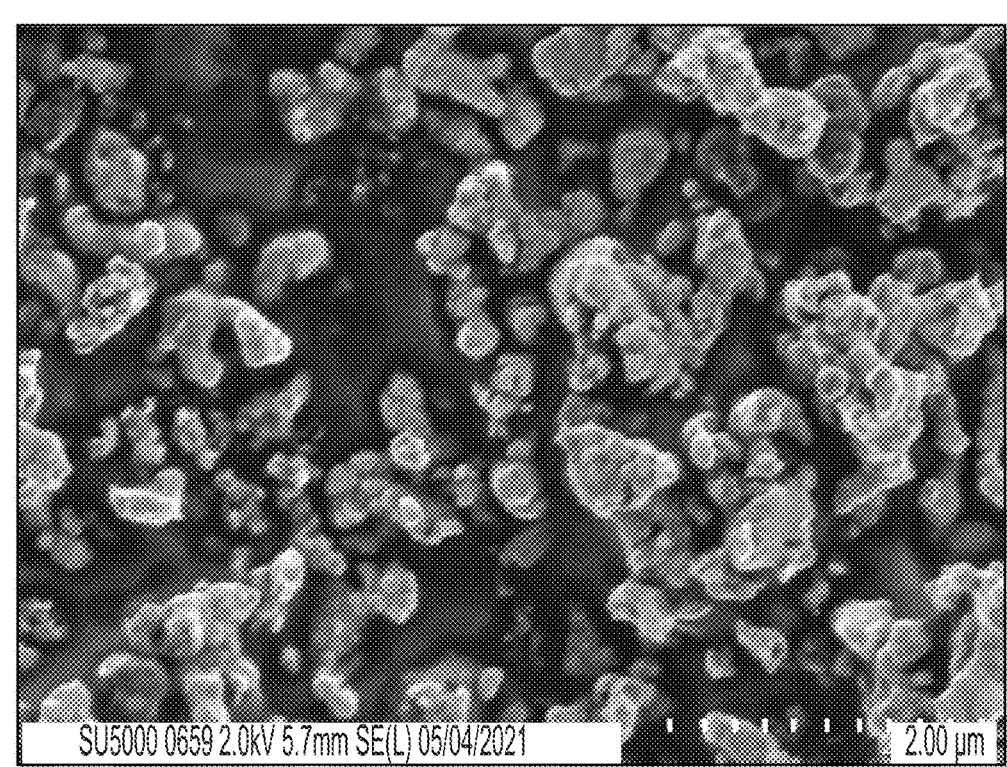
FIGS. 19A and 19B are an SEM image (FIG. 19A) showing solid solution carbide powder feedstock formed with a carbon black carbon source and (FIG. 19B) associated X-ray diffraction pattern.
Figure 19B:
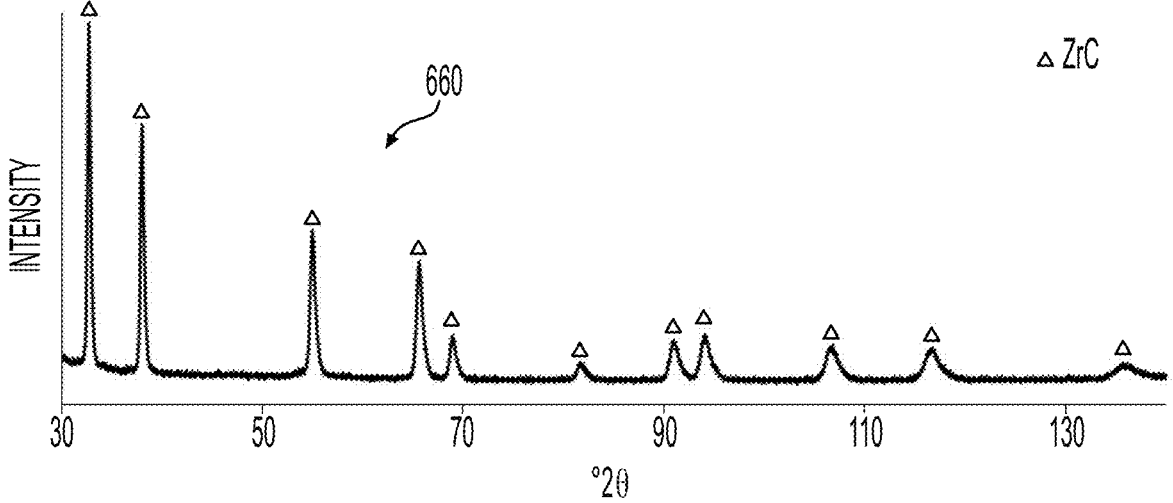

FIGS. 19A and 19B are an SEM image (FIG. 19A) showing solid solution carbide powder feedstock formed with a carbon black carbon source and (FIG. 19B) associated X-ray diffraction pattern. Visible in the SEM image 650 are feedstock powders, which have an observed size that is <500 nm (for a majority of the particles in the feedstock powder) with a minority of particles approaching 1 micron in size. The X-ray diffraction pattern 660 exhibits peaks for ZrC. Because this material is single-phase solid solution carbide with uranium doped uniformly in the ZrC phase, the uranium doping slightly shifts the ZrC peaks in the diffraction pattern to a lower 2theta, but there are no additional peaks when the uranium is fully incorporated in the structure.

One difference between the solid solution carbide powder feedstock formed with a phenolic resin carbon source and e solid solution carbide powder feedstock formed with carbon black is that the phenolic produces a two-phase mixture (ZrC+UO2) that reacts further in later processing steps. Otherwise, powder particle size and behavior during further processing is similar between the solid solution carbide powder feedstock formed from the two different carbon sources.

The feedstock of solid solution carbide powders containing a fissionable fuel component is used to form a billet for extrusion into twisted ribbon fuel rodlets 20. Turning to FIG. 17B, forming the billet includes the steps of heated thermoplastic mixing to disperse and homogenize the feedstock in the compounding constituents (S540) and cooling to form a billet (S550), which is then removed from the mixer equipment (S550).

The heated thermoplastic mixing step (S540) mixes the feedstock of solid solution carbide powders containing a fissionable fuel component with compounding constituents under an inert atmosphere. Compounding constituents include polymers, such as poly(ethylene vinyl acetate) and high density poly ethylene (HDPE) polymers, and waxes, such as paraffin and carnauba. Stearic acid is also included in the formulation as a dispersant for the ceramic particles. In one embodiment of the formulation, the compounding constituents are 40% backbone polymer (such as poly(ethylene vinyl acetate) and HDPE)/60% wax. Optionally, one or more of nickel nano-powder, diamond nano-powder, and carbon fiber can be added to the formulation. An example composition of a formulation is presented in Table 3.

TABLE 3

| Composition of Formulation | |
| --- | --- |
| Component | Amount |
| ZrNbUC | 40-55% by volume |
| backbone polymer [e.g., poly(ethylene vinyl acetate) or HDPE] | 10-40% by volume |
| wax (paraffin and/or carnauba) | 10-40% by volume |
| stearic acid | 1-5% by volume |
| nickel nano-powder (optional) | 0-0.02% by volume |
| diamond nano-powder (optional) | 0-0.02% by volume |
| carbon fiber | 0-15% by volume |

The formulation is placed in a high shear mixer under an inert atmosphere or vacuum for heated thermoplastic mixing. A suitable high shear mixer is FlackTec DAC1100-VAC commercially available from FlackTek of Landrum, South Carolina. In some embodiments, the polymeric compounding constituents are first placed in the high shear mixer, melted under shear mixing, and then the feedstock powders and any remaining compounding constituents are added to the melted polymeric compounding constituents. A high shear mixer is used to impart heat to the formulation (resulting in thermoplastic melting) and to homogenize the composition. Temperature of the formulation during the mixing process in the shear mixer is monitored indirectly by a thermocouple or RTD thermistor placed under the mixing cup of the shear mixer. The preferred temperature range for shear mixing is 100 to 125° C. Example parameters for mixing is 1600 rpm for a 300 second cycle. A minimum of three cycles (each 300 seconds) is used, alternatively three to five cycles. Speed and time may be reduced to control temperature of the formulation to within the noted range of 100 to 125° C. An example total mixing time is up to about 30 minutes, but other times can be used as long as there is a homogeneous distribution of the particles in the thermoplastic mixture and breaking apart any agglomerates and the temperature of the mixture does not go above 125° C. to avoid damage to, e.g., the steric acid dispersant.

Figure 20A:
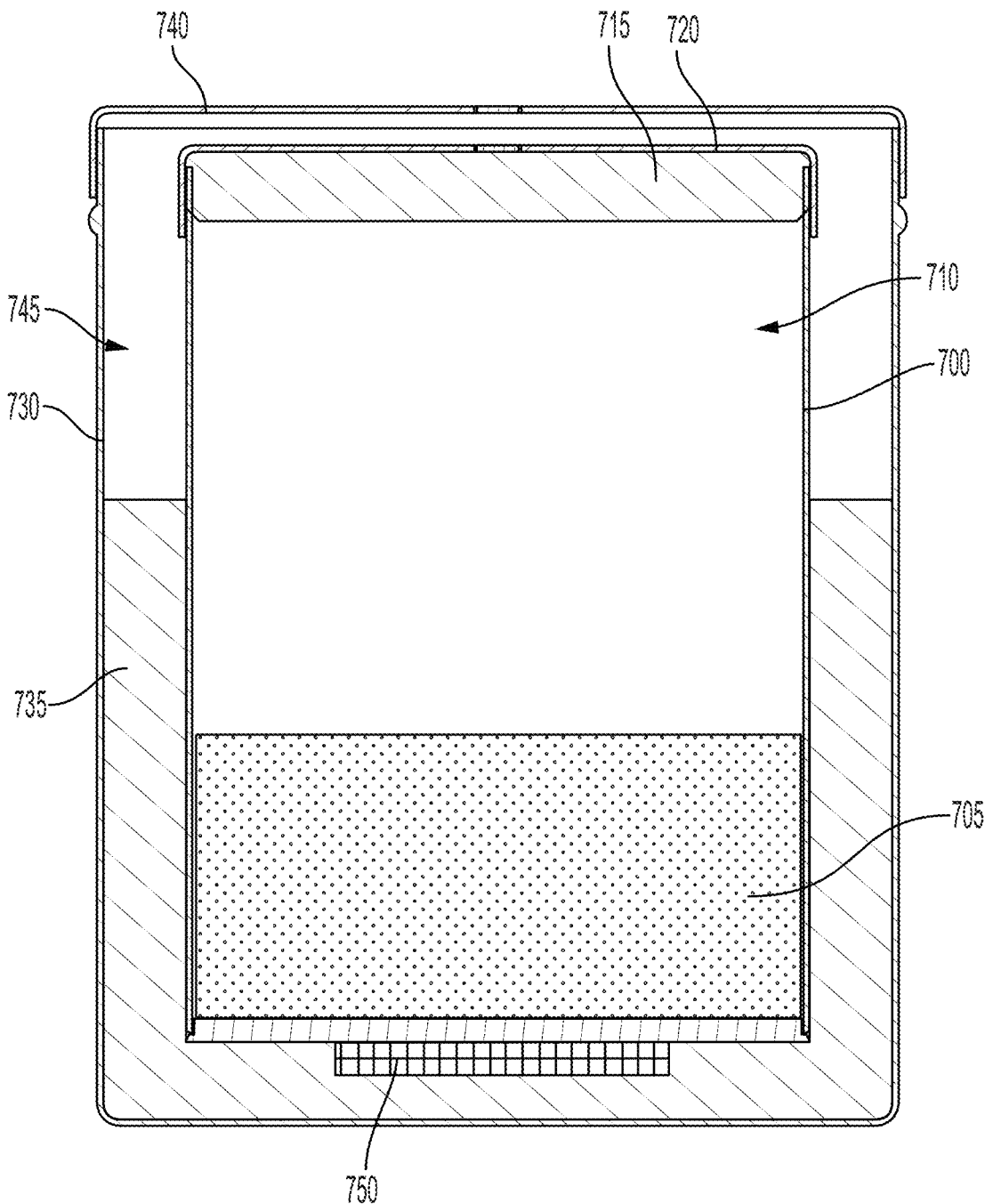
FIG. 20A shows an embodiment of a mixing cup for compounding feedstock to form a billet for the extruder and FIG. 20B shows an embodiment of an arbor press extracting the billet from the mixing cup.

FIG. 20A shows an embodiment of a mixing cup for compounding feedstock to form a billet for the extruder. The mixing cup 700 contains the components of the formulation 705 and a primary atmosphere 710 and is sealed at the mouth end by a cup insulation layer 715 and cap 720. The primary atmosphere 710 may be an inert atmosphere and protects the fissionable fuel containing component (such as ZrUC) from oxidation. Argon may be used as the primary atmosphere 710. The mixing cup 700 can be made of a high heat transfer material, such as aluminum. The mixing cup 700 sits in a containment vessel 730 of the shear mixer and there is a mixer insulation layer 735 between the mixing cup 700 and the containment vessel 730. Further, the containment vessel 730 is sealed at the mouth end by a cover 740. A secondary protective atmosphere 745, which may be an inert atmosphere such as argon, occupies the void space within the containment vessel 730. Suitable material for the cup insulation layer 715 and the mixer insulation layer 735 includes silicone-based insulation material.

A thermocouple or RTD thermistor 750 is embedded in the mixer insulation layer 735. The Thermocouple or RTD thermistor is preferably attached to a microprocessor with wireless data transmission capabilities so that the temperature of the formulation 705 can be determined actively during the high shear mixing process. The program containing the mixing parameters used by the high shear mixer may be modified automatically or manually to keep the formulation 705 within the minimum and maximum temperature limits of the constituents of the formulation. Particular care should be taken so that components with lower melting points are not vaporized during the mixing process.

After mixing, the compounded feedstock is cooled under inert atmosphere or vacuum to form a billet (S545). Cooling can be ambient cooling or forced air cooling with inert gas.

Figure 20B:
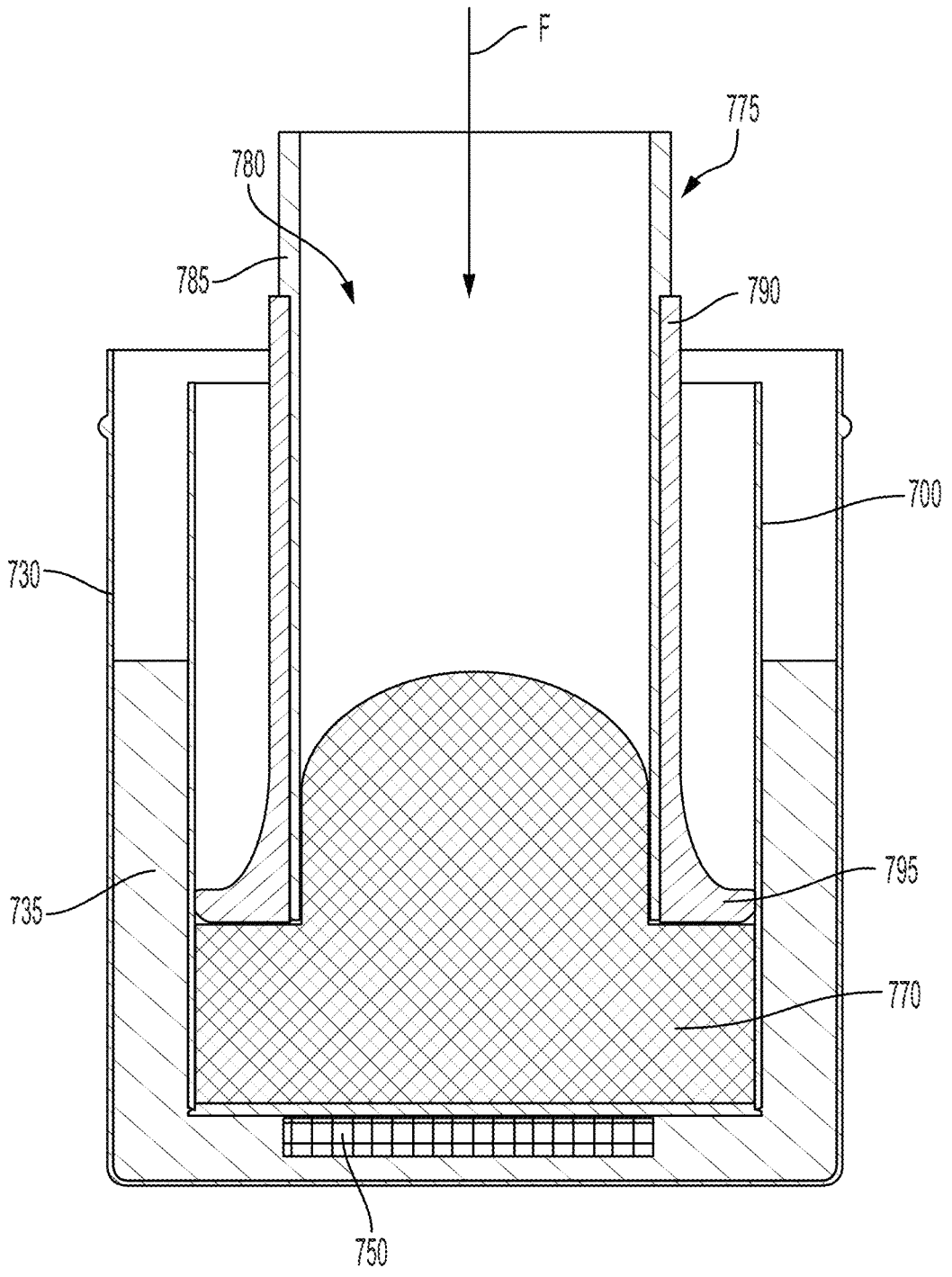

After partial cooling, the billet is removed from the mixer equipment (S550). Partial cooling maintains some ductility in the billet to facilitate removal, e.g., by the arbor press 775. An example working temperature range for partial cooling of the billet is 70° C. to 110° C. In example embodiments, the billet is removed from the mixer equipment using an arbor press. FIG. 20B shows an embodiment of an arbor press 775 extracting the billet 770 from the mixing cup 700. The arbor press 775 has a central channel 780 defined by outer walls 785. A wiper system, such as a sleeve 790 with flexible wings 795, is located on the outer surfaces of the arbor press 775. The arbor press 775 is placed inside the mouth of the mixing cup 700 and forced (F) into the area of the mixing cup 700 where the billet 770 is located. By this action, the billet 770 is forced into the central channel 780 of the arbor press 775 while the flexible wings 795 wipe the inner surfaces of the mixing cup 770. Once the billet 770 is sufficiently contained within the central channel 780, the arbor press 775 (with the billet 770 contained therein) can be removed from the mixing cup 700. The billet 770 can subsequently be ejected from the central channel 780 and reserved for use in forming twisted ribbon fuel rodlets 20, e.g., by extrusion. Billet 770 removal is performed under a protective atmosphere, for example, inside a glove box with an inert atmosphere such as argon. Extraction of the billet 770 with the arbor press 775 minimizes surface defects on the billet 770 that, if present, can transfer to the extruded ribbon during the extrusion process.

Turning to FIG. 17C, the process of forming the billet 770 into twisted ribbon fuel rodlets 20 includes the steps of loading the billet 770 in an extruder, (S555) and extruding a ribbon through a heated die (S560). As the extruded ribbon exits the heated die, an inert atmosphere flows over the extruded ribbon to start solidification (S565). The extruded ribbon is then captured between tensioning rollers (S570), which are rotated about the axis of the extruded ribbon while maintaining tension on the extruded ribbon to impart a twist to the extruded ribbon (S575). Image analysis is conducted on the twisted extruded ribbon (S580) and the twisted extruded ribbon is cut into a rodlet in response to input from a length sensor (S585). The twisted ribbon fuel rodlets 20 are then sorted in response to output from the image analysis (S590).

Figure 21A:
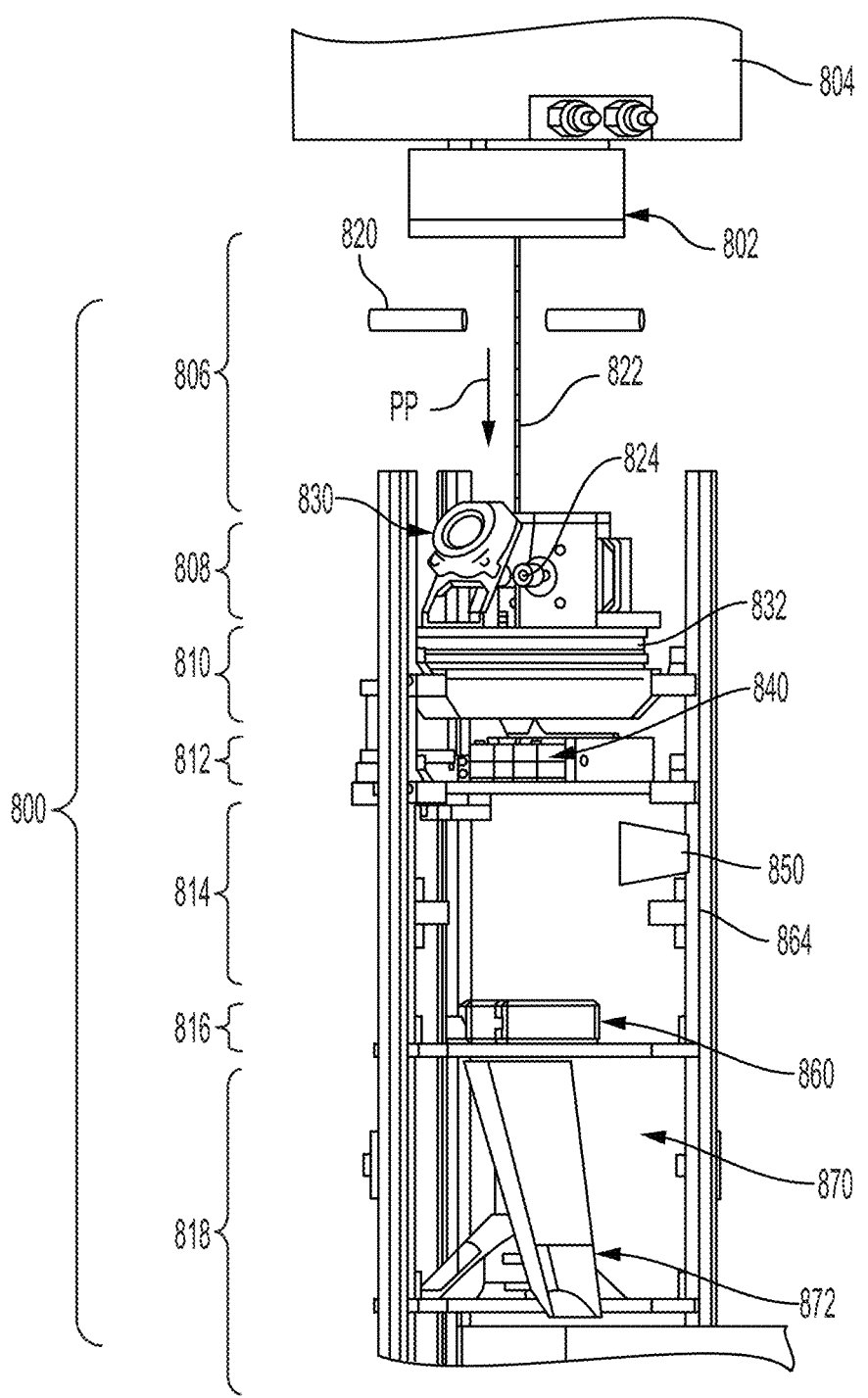
FIGS. 21A and 21B show a twisted fuel rodlet manufacturing system including the sub-systems and components.
Figure 21B:
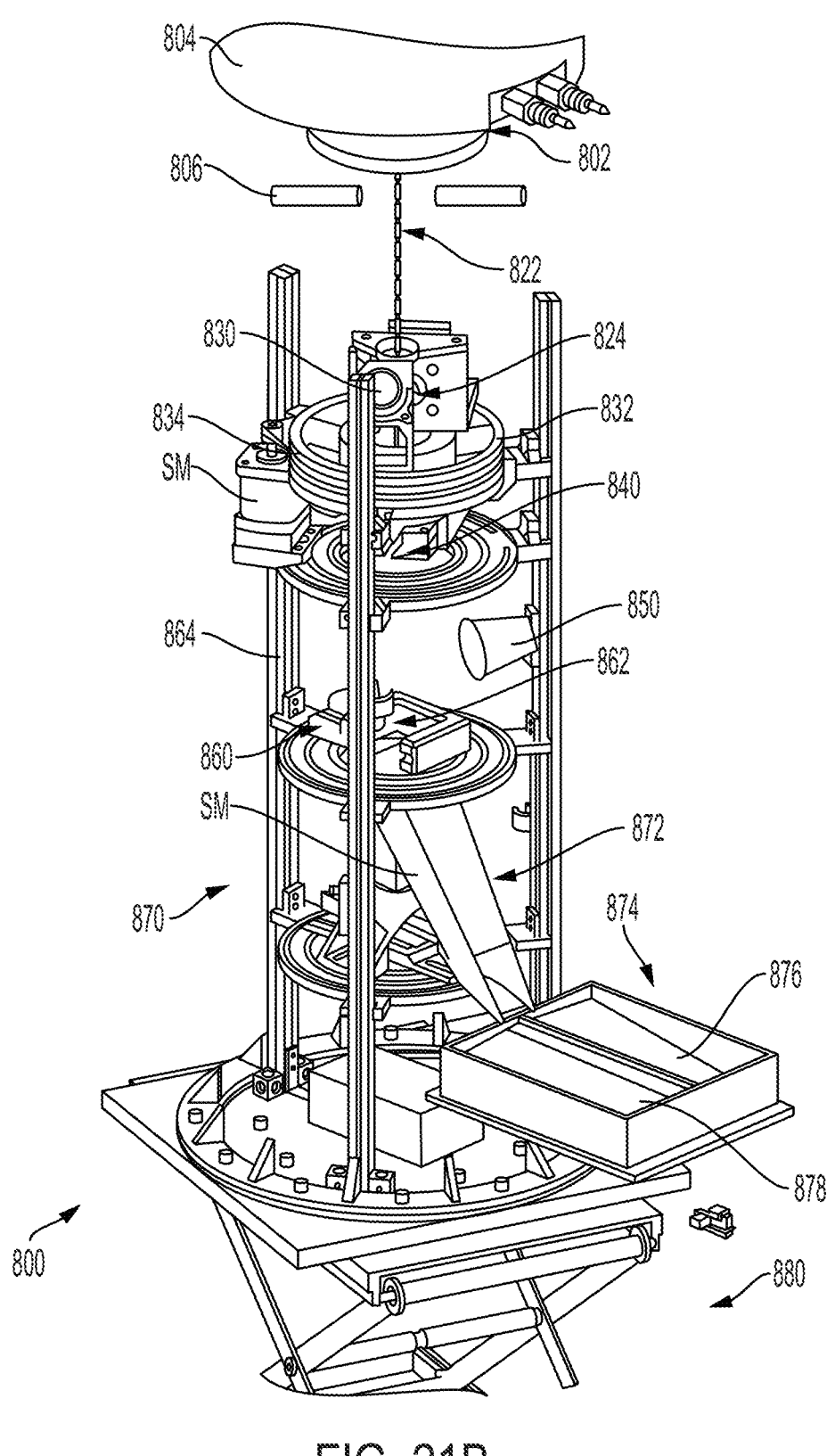

FIGS. 21A and 21B show a twisted fuel rodlet manufacturing system including the sub-systems and components. The twisted fuel rodlet manufacturing system 800 is downstream from the exit of a heated die 802 of an extruder 804, preferably a piston extruder. The twisted fuel rodlet manufacturing system 800 has various zones, sub-systems, and components. In order along the processing path (PP), the twisted fuel rodlet manufacturing system 800 includes a ribbon initial cooling zone 806, a ribbon tensioning sub-system 808, a ribbon twisting sub-system 810, a ribbon cutting sub-system 812, a ribbon inspection zone 814, a length sensor sub-system 816, and a rodlet sorting and collection sub-system 818.

The ribbon initial cooling zone 806 is the area between the exit of the heated die 802 and the ribbon tensioning sub-system 808. External cooling, such as forced air cooling with an inert atmosphere, can be located in the ribbon initial cooling zone 806. In FIG. 21A, external cooling is provided by nozzles 820, which direct inert atmosphere such as argon into the processing path. The distance in the processing path of the ribbon initial cooling zone 806 can vary, but is of sufficient size to allow the extruded ribbon 822 to start solidification. This distance can be affected by any external cooling conditions, such as the forced air cooling conditions. In example embodiments, the forced air cooling conditions and the size of the ribbon initial cooling zone 806 cool the extruded ribbon 822 from an initial temperature (at the exit of the heated die 802) of about 110 C to a temperature in the range of 60° C. to 80° C. at which (i) the surfaces of the extruded ribbon 822 can be contacted without leaving artifacts on the surface and (ii) the extruded ribbon 822 is sufficiently pliable that a twist of periodicity S/2 can be imparted to the extruded ribbon 822.

Figure 22:
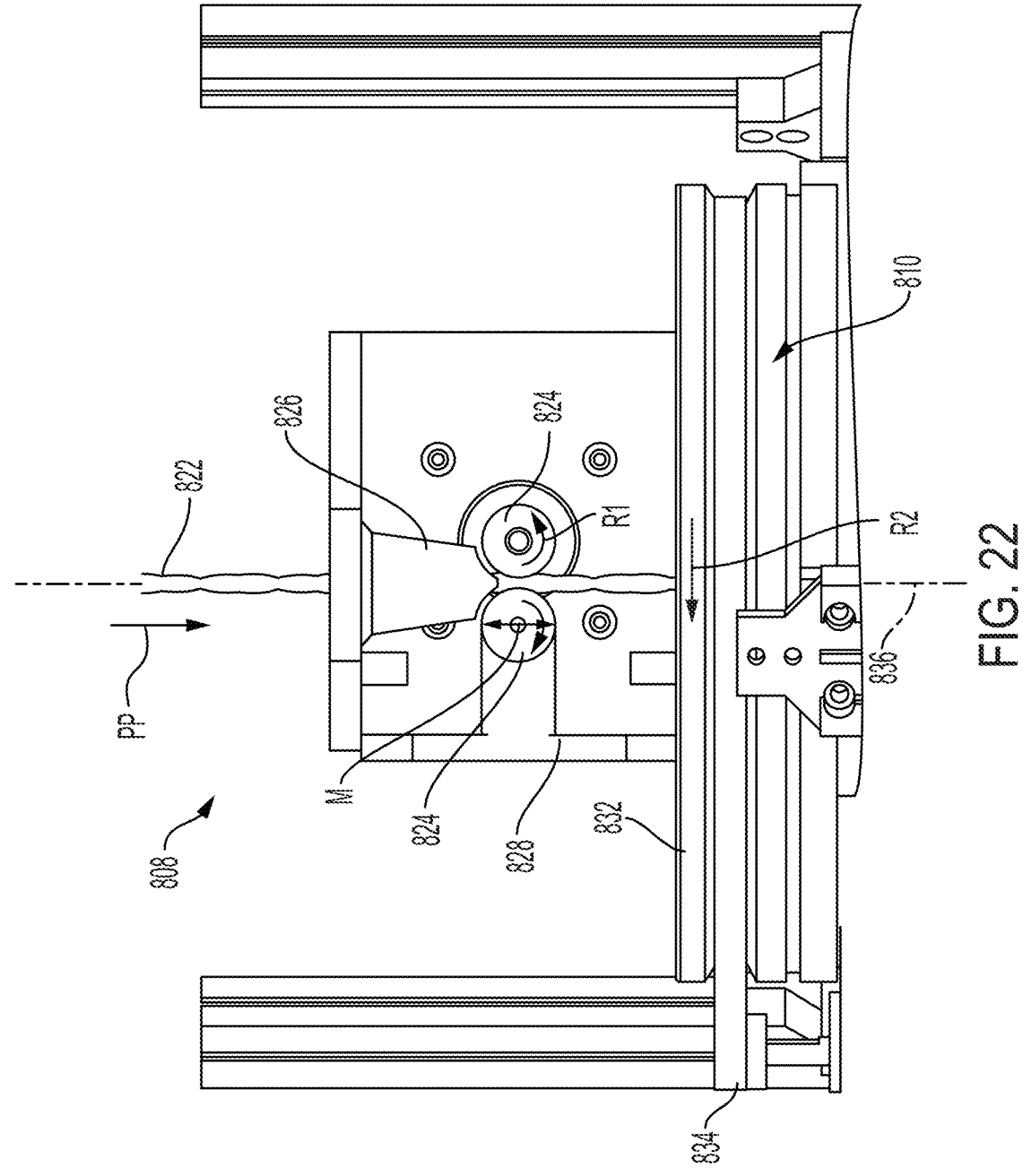
FIG. 22 shows details of the ribbon tensioning sub-system

The extruded ribbon 822 extends through the ribbon initial cooling zone 806 and passes between tensioning rollers 824 of the ribbon tensioning sub-system 808. FIG. 22 shows details of the ribbon tensioning sub-system. The tensioning rollers 824 contact the extruded ribbon 822 and rotate (R1) at a rotation speed. Typically, the tensioning rollers 824 contact the long side 26 of the extruded ribbon 822. The material of the tensioning rollers 824, such as polyurethane, allows some slippage of the extruded ribbon 822 to maintain tension in the extruded ribbon 822 in the ribbon initial cooling zone 806. In some embodiments, the tensioning rollers 824 rotate (R1) at a rotation that matches or is 2 to 5% above the output speed of the extruder 804 and slippage of the tensioning rollers 824 relative to the surface of the extruded ribbon 822 maintains the tension. In addition, one or both tensioning rollers 824 are spring mounted (M) in a direction parallel to the processing path (PP) to accommodate changes in the extrusion rate without breakage of the extruded ribbon 822. In FIG. 22, one of the tensioning rollers 824 is mounted on a spring arm 828. A funnel 826 helps direct the extruded ribbon 822 into the nip of the tensioning rollers 824. As seen in FIGS. 21A and 21B, additional cooling can be provided in the vicinity of the ribbon tensioning sub-system 808, for example, by a cooling fan 830.

The ribbon tensioning sub-system 808 is mounted on a stage 832 of the ribbon twisting sub-system 810. The stage 832 has a shape of an annulus or similar shape with a center opening that accommodates passage of the extruded ribbon 822. The stage 832 can incorporate a coaxial slip ring system. A drive system, such as a stepper motor (SM) attached to the stage 832 by belt 834, rotates (R2) the stage 832 about the axis 836 of the extruded ribbon 822, i.e., about the axis of the processing path (PP). The rotation (R2) of the stage 832 moves the mounted ribbon tensioning sub-system 808 and, during rotation (R2) of the stage 832, the ribbon tensioning sub-system 808 maintains tension on the extruded ribbon 822.

Rotation (R2) of the stage 832 is controllable and, during initial operation, the stage 832 is rotated at a higher rate to establish the initial periodicity S/2 of the extruded ribbon 822. Once the periodicity S/2 of the extruded ribbon 822 is established, rotation of the stage 832 is approximately steady state, with adjustments based on feedback from the inspection conducted in the ribbon inspection zone 814.

The combined operation of the ribbon tensioning sub-system 808 and the ribbon twisting sub-system 810 impart the twist of periodicity S/2 to the extruded ribbon 822. The twisting of the extruded ribbon 822 occurs in the ribbon initial cooling zone 806, between the exit of the heated die 802 and the tensioning rollers of the ribbon tensioning sub-system 808. Twisted ribbon fuel rodlets 20 can have different twist periodicity to accommodate reactor design, such as differential pressure in the fuel bundle 10 and/or fuel assembly during operation.

Figure 24A:
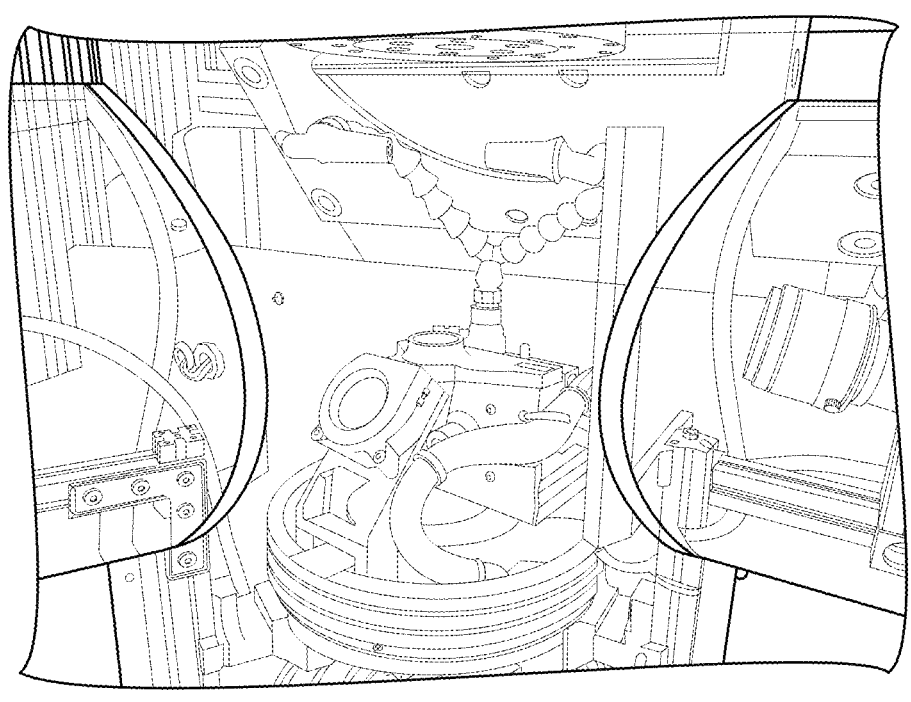
FIGS. 24A-F are images of sub-systems and components of a twisted fuel rodlet manufacturing system.
Figure 24B:
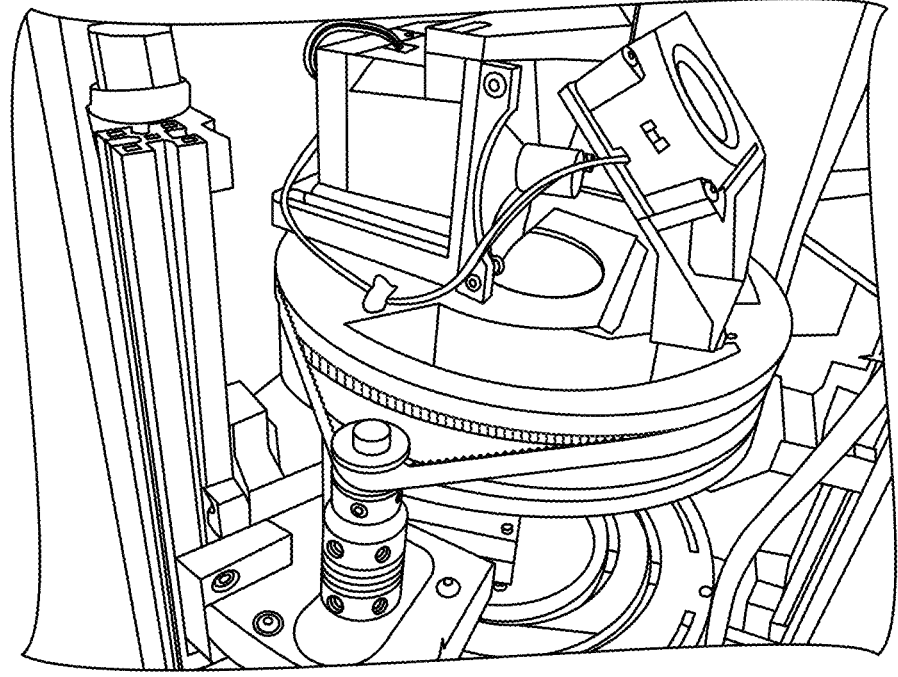
Figure 24C:
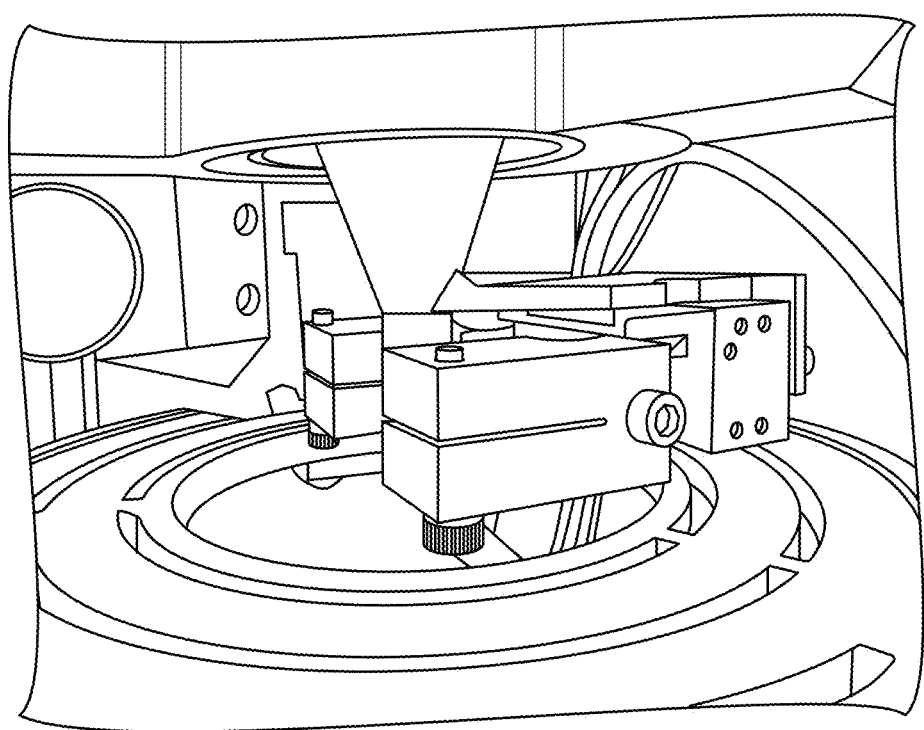
Figure 24D:
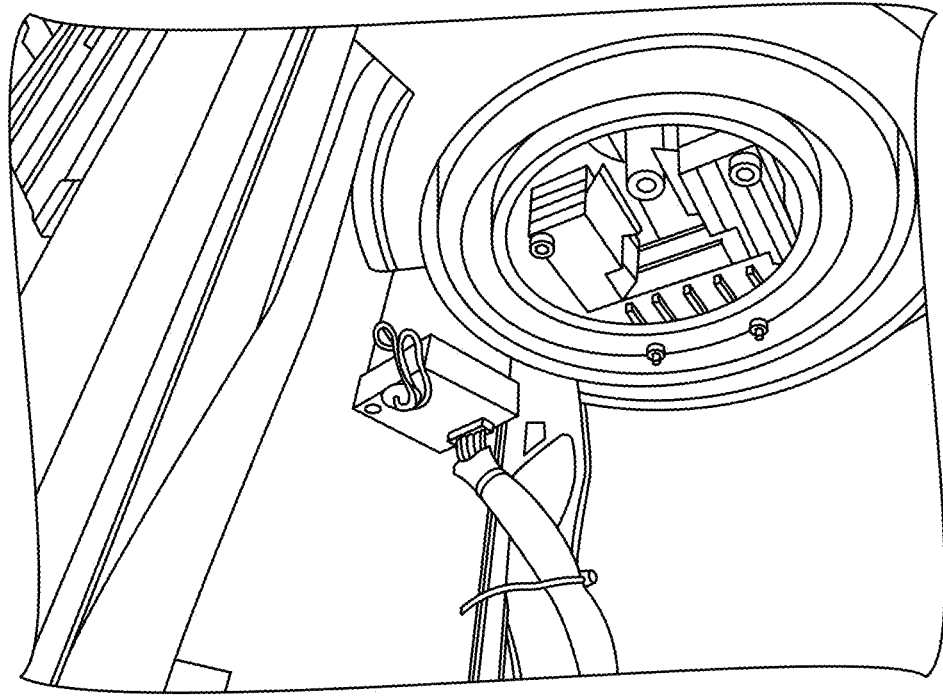
Figure 24E:
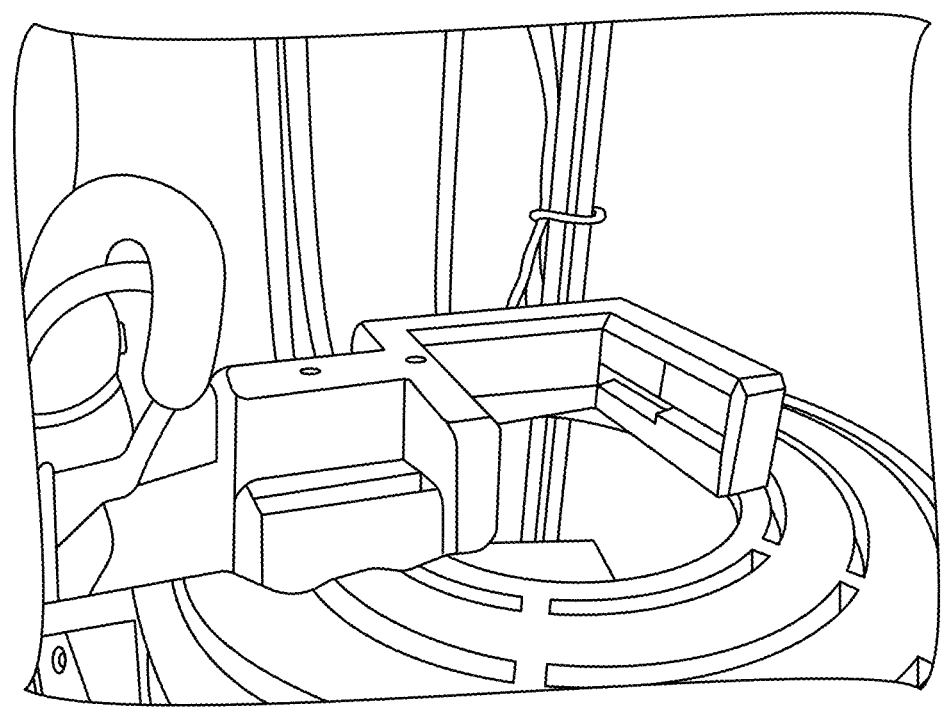

The ribbon cutting sub-system 812 includes a cutting apparatus 840 that actuates based on a signal received from the length sensor sub-system 816. After passing through the tensioning rollers 824 and the opening in the stage 832, the extruded ribbon 822 passes through an actuation zone of the cutting apparatus 840. The cutting apparatus 840 can include cutting surfaces, such as razor blades or the like. The cutting surfaces are mounted in grips on either side of the processing path (PP) and are operated, for example, pneumatically actuated, to reciprocally close to cut the extruded ribbon 822 to rodlet length and to open after cutting to allow additional length of extruded ribbon 822 to pass. This reciprocating cutting action repeats to cut the extruded ribbon 822 to form each twisted ribbon fuel rodlet 20. A funnel is located upstream from the actuation zone in the processing path (PP) (see FIG. 24C) and the outlet of the funnel helps to stabilize the extruded ribbon 822 in the actuation zone for cutting.

The ribbon inspection zone 814 includes sub-systems and components to inspect the extruded ribbon 822 and identify defects. In some embodiments, visual inspection systems (VIS) 850, such as cameras, are positioned in the ribbon inspection zone 814 and inspect the and the extruded ribbon 822 as it moves in the processing path (PP) past an inspection point. One or more other non-destructive inspection techniques can also be included, such as radiography, computed tomography, and ultrasonic testing. Characteristics of the extruded ribbon 822 that are inspected include: twist periodicity (S/2), twist regularity (e.g., consistency of S/2 over the length of the extruded ribbon), distance between peaks and/or valleys in the profile of the extruded ribbon 822, surface finish defects, and combinations thereof. Example surface finish defects include die shrinkage or swelling, surface tearing, surface porosity, and periodic surface defects caused by gradual damage to the die geometry over time. Optical analyses of information from the visual inspection systems (VIS) (and optionally analysis of information from other non-destructive inspection techniques) can be used to control the rodlet sorting and collection sub-system 818. Additionally, analysis of collected information can be analyzed by, for example, machining learning and can be used to provide feedback control to other processing equipment, such as the extruder 804, the ribbon tensioning sub-system 808, the ribbon twisting sub-system 810, which can then be adjusted to mitigate or correct the identified defect. Analysis can also be used to identify maintenance requirements.

In alternative embodiments, ribbon inspection occurs in the ribbon initial cooling zone 806 and the sub-systems and components of the ribbon inspection zone 814 are incorporated into the ribbon initial cooling zone 806. Inspection in both the ribbon initial cooling zone 806 and in the ribbon inspection zone 814 can also be used.

A length sensor sub-system 860 is located in the processing path (PP). In one embodiment, the length sensor sub-system 860 includes a laser line scanner and a photodiode detector 862. As the extruded ribbon 822 traveling along the processing path (PP) breaks the plane of detection between the laser line scanner and the photodiode detector, the length sensor sub-system 860 sends a signal to the ribbon cutting sub-system 812, which then cuts the extruded ribbon 822. The distance along the processing path (PP) from the location of the reciprocating cutting action in the ribbon cutting sub-system 812 to the plane of detection between the laser line scanner and the photodiode detector in the length sensor sub-system 860 determines the length (L) of the twisted ribbon fuel rodlets 20. The position of the plane of detection between the laser line scanner and the photodiode detector in the length sensor sub-system 860 can be adjusted to adjust the length (L) of the twisted ribbon fuel rodlet 20, for example, by moving the attachment point between the length sensor sub-system 860 and rails 864.

After being cut to length, the twisted ribbon fuel rodlet 20 is sorted and collected by the rodlet sorting and collection sub-system 870. For example, an embodiment of a rodlet sorting and collection sub-system 870 includes a sorting chute 872 and a sorting tray 874. The entrance to the sorting chute 872 is positioned so that the cut twisted ribbon fuel rodlets 20 enter into the sorting chute 872. The exit from the sorting chute 872 is positioned so that the cut twisted ribbon fuel rodlets 20 is directed to the sorting tray 874. The sorting chute 872 is movable (for example, by a servo motor (SM)) to orient the exit toward a first bin 876, e.g. a first location for collecting twisted ribbon fuel rodlets 20 that pass inspection criteria (as determined by the analyses of information from the ribbon inspection zone 814), or to orient the exit toward a second bin 878, e.g. a second location for collecting twisted ribbon fuel rodlets 20 that fail inspection criteria (as determined by the analyses of information from the ribbon inspection zone 814).

In FIG. 21B, the twisted fuel rodlet manufacturing system 800 is supported on an adjustable platform 880 that can be used to adjust the distance between the exit of the heated die 802 and the twisted fuel rodlet manufacturing system 800, which will adjust, for example, the length of the ribbon initial cooling zone 806.

Figure 23:
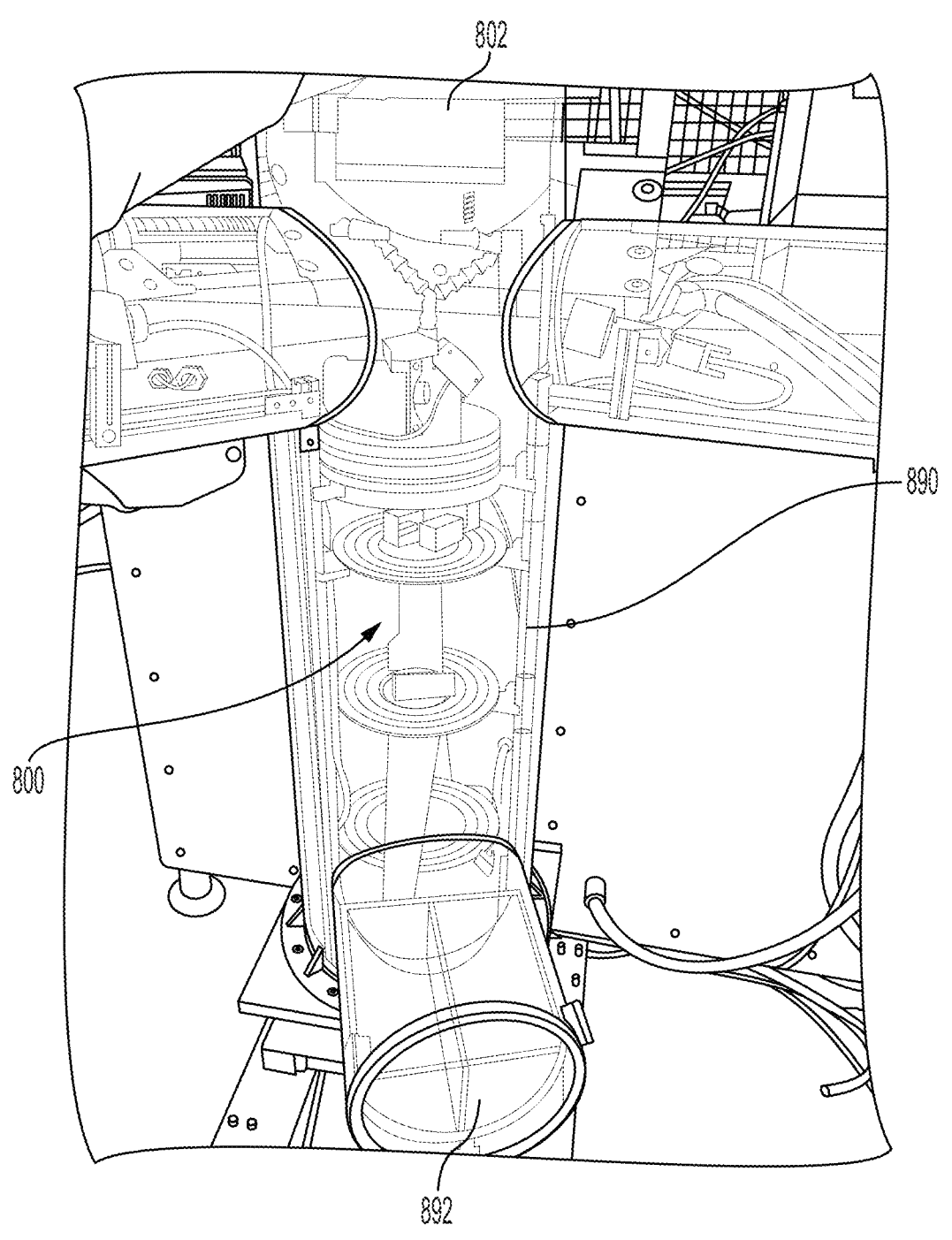
FIG. 23 is an image of a twisted fuel rodlet manufacturing system and showing the various sub-systems and components enclosed in an inert atmosphere chamber.

FIG. 23 is an image of a twisted fuel rodlet manufacturing system and showing the various sub-systems and components. The twisted fuel rodlet manufacturing system 800 is enclosed in an inert atmosphere chamber 890. A portion of the heated die 802, such as the exit, is also enclosed within the inert atmosphere chamber 890. Alternatively, the entire extruder 804 or a portion of the extruder 804 can also be enclosed within the inert atmosphere chamber 890. As an example, an inert atmosphere chamber 890 can be constructed of polycarbonate. The inert atmosphere chamber 890 can include sealable access ports. In FIG. 23, access port 892 allows access to chambers functioning as the sorting tray 874.

Figure 24F:
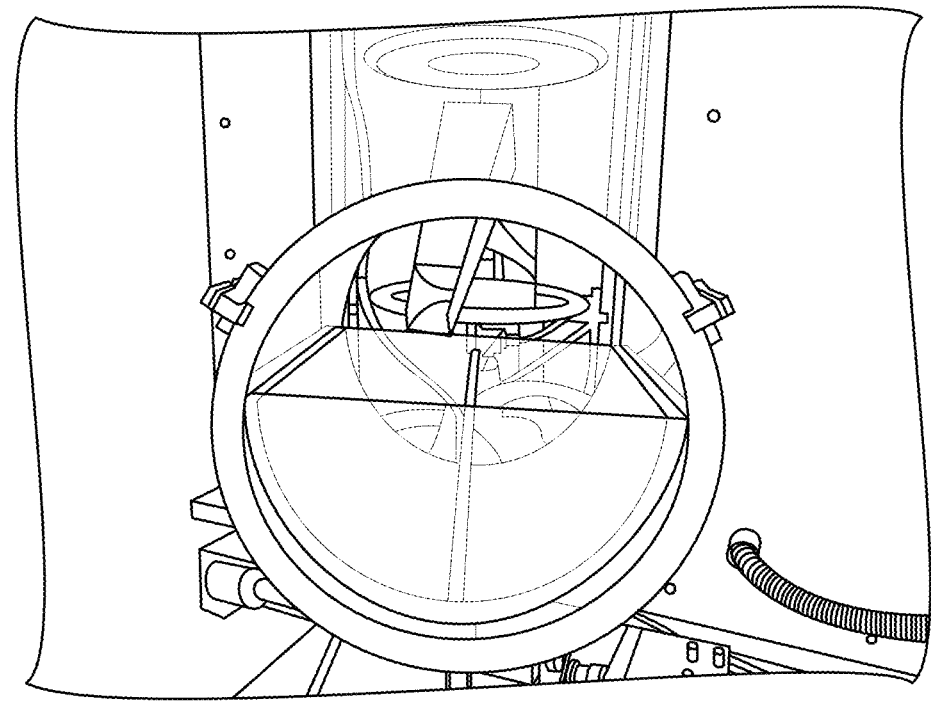

FIGS. 24A-F are images of sub-systems and components of a twisted fuel rodlet manufacturing system 800, including: a ribbon initial cooling zone 806 and a ribbon tensioning sub-system 808 (in a first top side view) (FIG. 24A), a ribbon tensioning sub-system 808 (in a second top side view) and a ribbon twisting sub-system 810 (FIG. 24B), a ribbon cutting sub-system 812 in aside view (FIG. 24C) and in a view from below (FIG. 24D), a length sensor sub-system 816 (FIG. 24E), and a rodlet sorting and collection sub-system 818 (FIG. 24F).

Figure 25A:
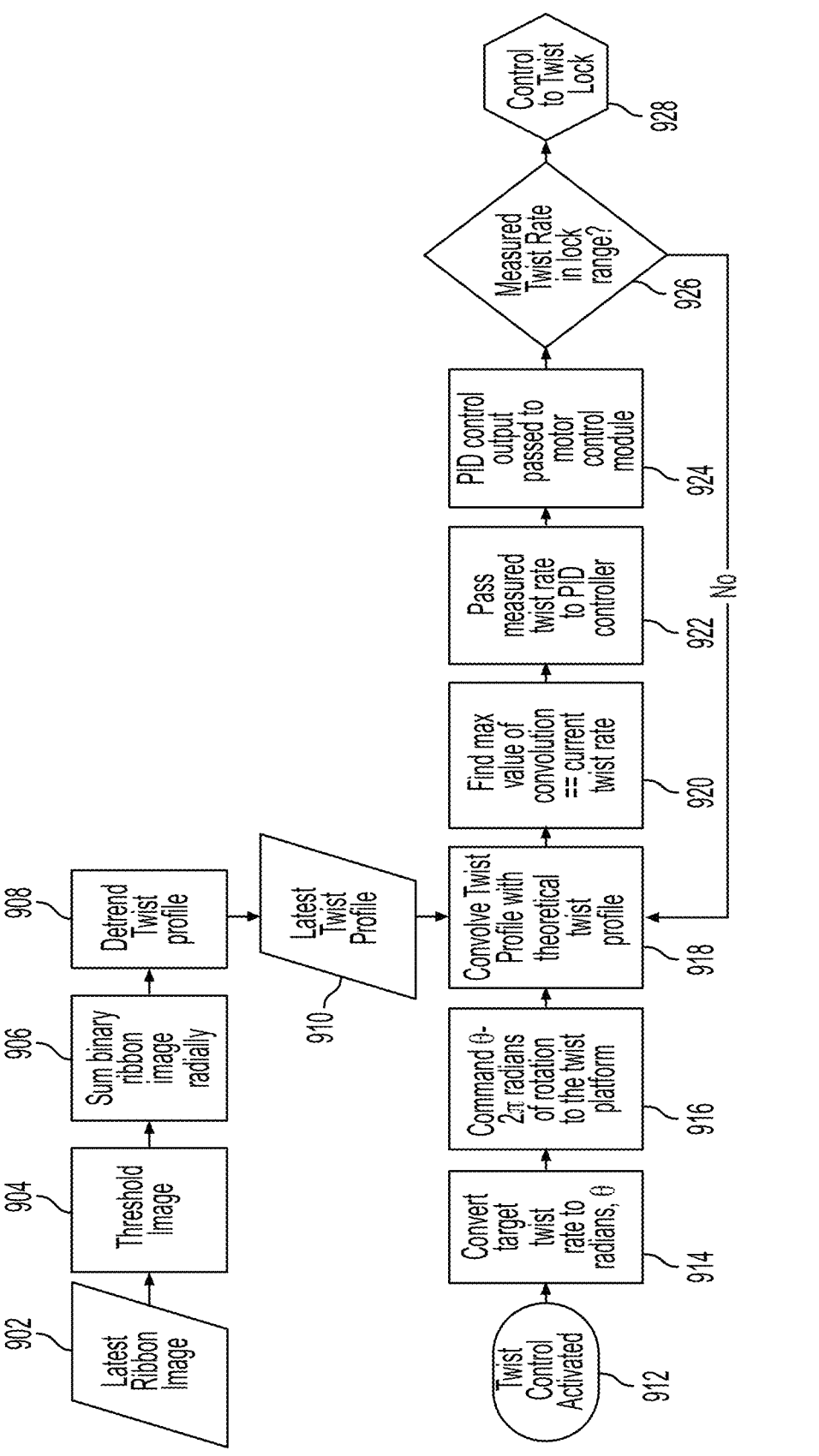
FIGS. 25A-C illustrate a process to monitor and correct the twist rate of fuel rodlets according to some embodiments.
Figure 25B:
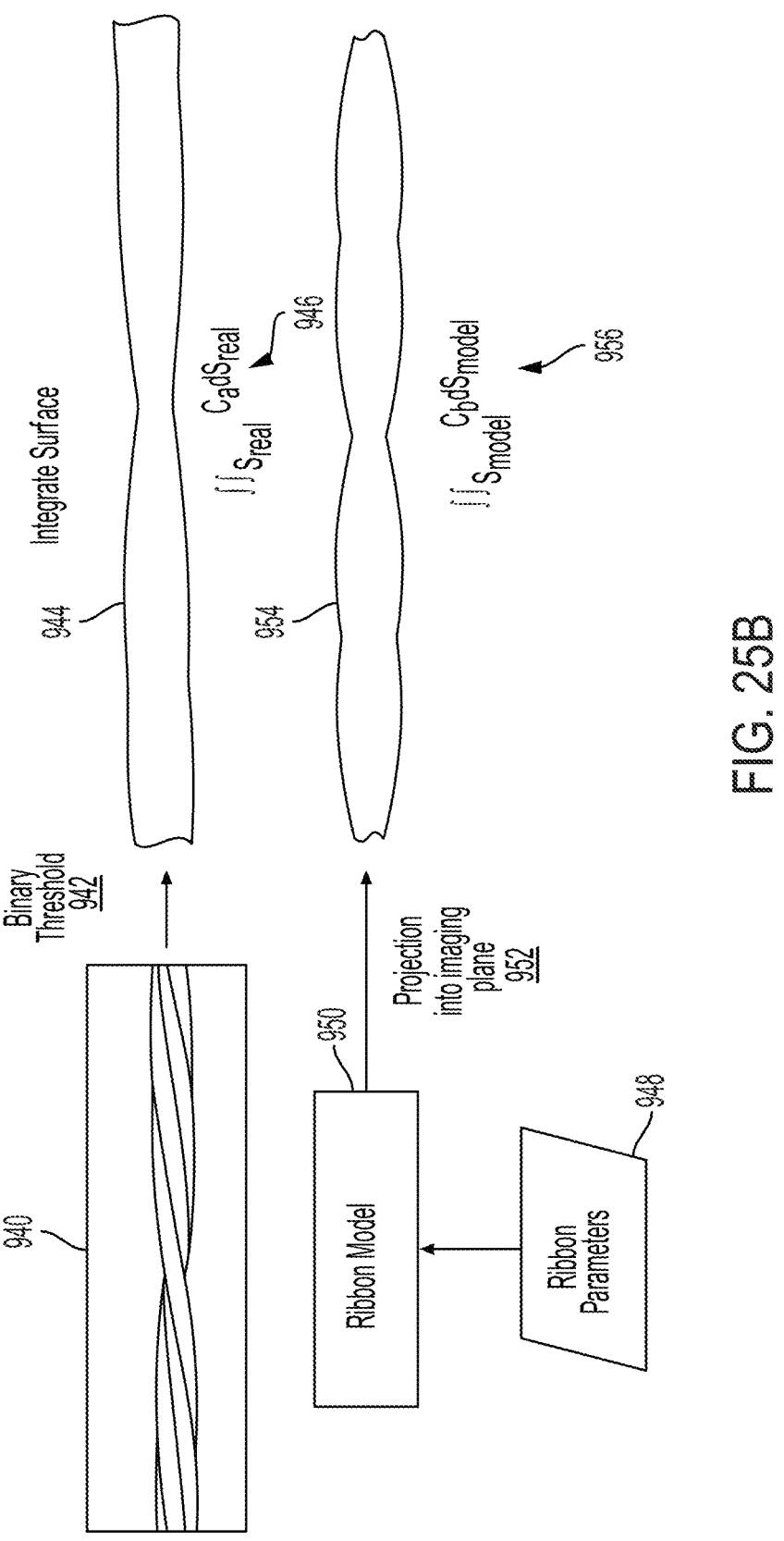
Figure 25C:
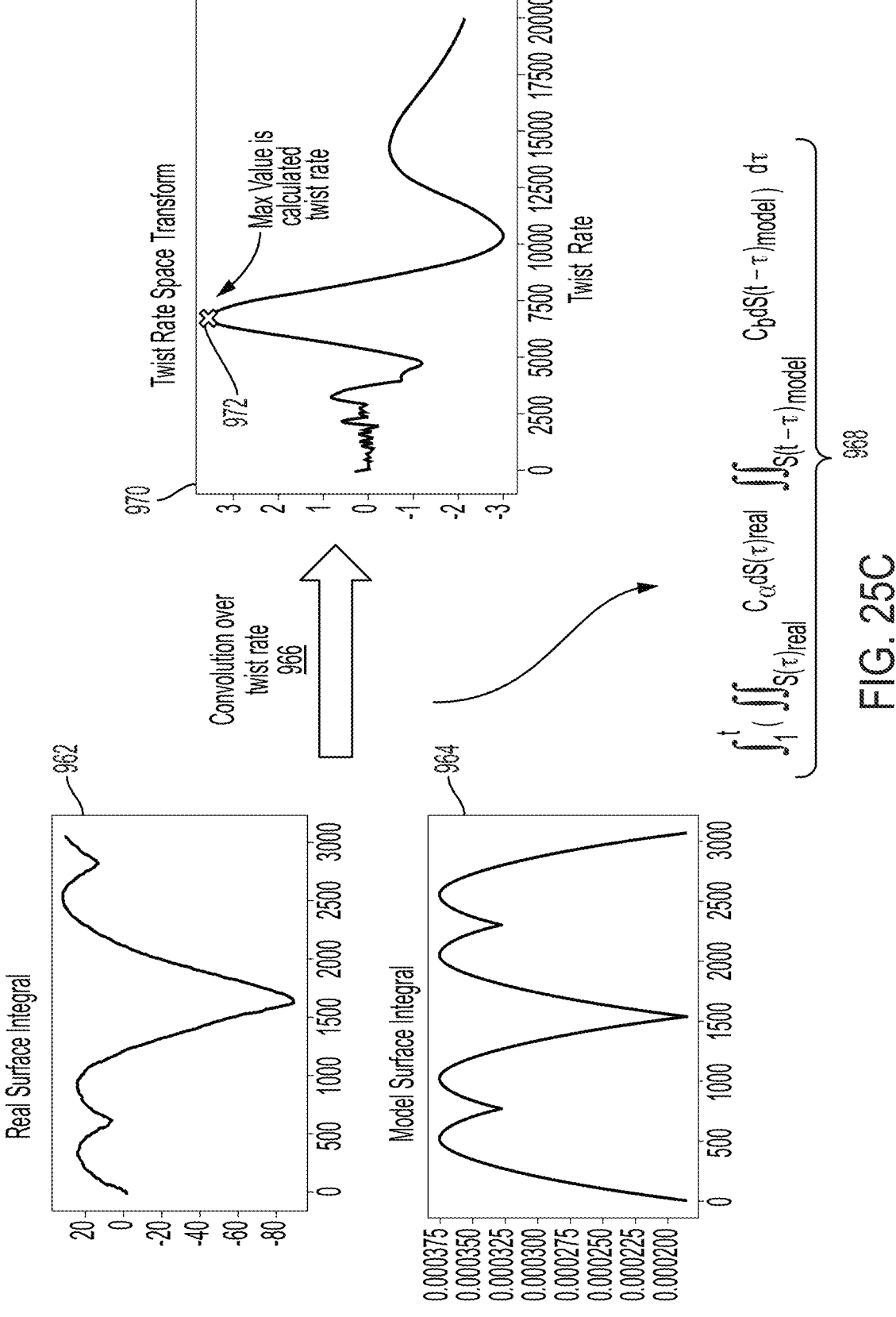

FIGS. 25A-C illustrate a process to monitor and correct the twist rate of fuel rodlets according to some embodiments. As shown in FIG. 25B, an image 940 of an extruded ribbon is captured. For each pixel in the image, the system compares it to a binary threshold 942 to produce a binary ribbon image 944. In the illustrated embodiment, black denotes any portion of the original image 940 showing the ribbon, and the background is white. If $S_{real}$ denotes the surface, the integral 946 represents the area (e.g., the area of the shadow cast by the ribbon). The constant Ca can be used to adjust scaling.

The target shape of the ribbon is based on a set of ribbon parameters 948, which includes the target twist rate. According to these parameters, the system has a ribbon model 950 of what the ribbon is supposed to look like. This model is projected (952) onto a plane to create a target surface shape 954. If $S_{model}$ represents the surface of the target surface shape, the corresponding integral 956 represents the area. The constant $C_b$ can be used for scaling.

In FIG. 25C, the real surface 962 and the model surface 964 are convoluted (966) over twist rate, using the integral 968. The upper bound of the outer integral is t, which is a twist rate, and the lower bound is 1. The plot of the convolution as a function of twist rate t is shown in the plot 970. Within this plot, the maximum value occurs at the calculated twist rate. In the plot 970, the calculated twist rate is the x-coordinate of the maximum point 972.

There are at least two intuitive reasons to understand why the maximum point identifies the calculated twist rate. First, since the system is doing the convolution over twist rates, the system transforms the measured twist surface integral results into twist rate space, thus the maximum value will occur at the actual twist rate. Second, the convolution is essentially the same as the correlation between the measured ribbon and the theoretical ribbon over the discrete twist rates. Because of this, the peak will be at the twist rate where that correlation is highest, which is the twist rate of the measured ribbon.

FIG. 25A provides a flowchart of this overall process. Images of the ribbon can be captured continuously or periodically (e.g., every second, every tenth of a second, or every millisecond). The upper boxes 902-910 in the flowchart occur either continuously or periodically to process a latest ribbon image 902. As illustrated in FIG. 25B, the sum generates (904) a binary image by comparing the pixels in the latest ribbon image to a threshold and then sums (906) the binary ribbon image radially.

In some embodiments, the system detrends (908) the twist profile. This entails doing a linear regression over the summed and integrated twist profile threshold and subtracting that out. This removes potential influence from how the ribbon is lighted (e.g., the threshold might change over the length of the ribbon as a result of higher light exposure at one end). The results of these steps is to produce the latest twist profile 910.

The lower part of the flowchart is started when the twist control is activated (912). In order to produce the appropriate projection from the ribbon model 950, the system identifies the platform rotation and the distance of the extruder exit. The system converts (914) the target twist rate to θ radians, and sends (916) a command to rotate the twist platform by θ-2π radians. θ in this case is the twist rate converted to radians of platform rotation, so it is a variable that is dependent on both the desired twist rate and the distance from the extruder exit to the tensioner wheels that actually grab the extrusion. One reason for these two steps is to take the ribbon to a state that is close to the final desired twist rate, which is achieved by the θ-2π radians of initial rotation. This puts the system in a state that is close enough to the target twist rate that it is possible to accurately measure the current twist rate, and start the PID control loop. Otherwise the system is somewhat unstable when trying to measure essentially infinite twist rates (initial extrusion state).

In some embodiments, images of the ribbon are taken at the camera's given frame rate, and the twist rate is calculated from each new frame. Some embodiments use a simple moving average over the last X frames of twist rate calculation. The platform moves the requested number of radians, while the twist rate is continuously calculated at the camera frame rate, and when the rotation platform finishes its movement, the twist rate at that point (be it the instantaneous rate or the moving average) is passed to the PID control loop to generate the next platform movement.

As described in FIG. 25C, the system convolves (918) the twist profile with the theoretical twist profile, and then finds (920) the maximum value of the convolution (e.g., at point 972 in the plot in FIG. 25C). The x-coordinate of this point is the calculated twist rate. This calculated twist rate is then passed (922) to the PID controller and/or passed (924) to the motor control module.

For top performance, the twist rate should be in the desired range and stay there. Therefore, the process checks (926) whether the calculated twist rate is in the desired range. If it is in the desired range, the system sends a control signal to lock the twist (928). If the calculated twist rate is not in the desired range, the flow chart loops back to calculate a new convolution. As noted above, the upper steps 902-910 in the flow are proceeding all the time, so the return to the convolution step 918 computes a new convolution using a new latest twist profile 910.

Locking the twist rate means either reducing or completely removing the ability of the system to control the rotation platform. This process achieves very stable twist rates, which avoids constantly altering the platform's rotational position. Under some threshold, it is preferable to just stop control. The system is still calculating the current twist rate at the same rate as images are received, and there is a check to see if the calculated current twist rate is still within some tolerance range of the target rate. This is useful to avoid a possible "slip" of the twist (e.g., when the extrusion does a half rotation in the tensioner assembly and looses half a twist). When this occurs, the twist lock is lost, and the control system takes back over in order to restore the desired twist rate.

Twist rates can be tracked using various units. The system generally reports twist rate to a user in terms of mm/full twist, but internally the units are just pixels/full twist. This lets the system apply the pixels/mm scaling factor that is solely a function of the physical camera setup and the image plane after the twist rate in the pixel space has been calculated. Embodiments can do it either way since it's just a constant factor.

This methodology of measuring twist rate has multiple advantages. First, this methodology is robust to ribbon position and orientation in camera field of view. Second, the methodology reduces the amount of ribbon that needs to be imaged to get an accurate idea of twist rate. (In contrast, a pure Fourier based method requires a length of ribbon that is at least twice the twist rate. In many cases, this is impossible based on the limited size of the extrusion handling system.) Third, the methodology can be adapted to any arbitrary ribbon aspect ratio. And fourth, the methodology can be utilized to detect asymmetry in the ribbon twist.

Figures 26A, 26B:
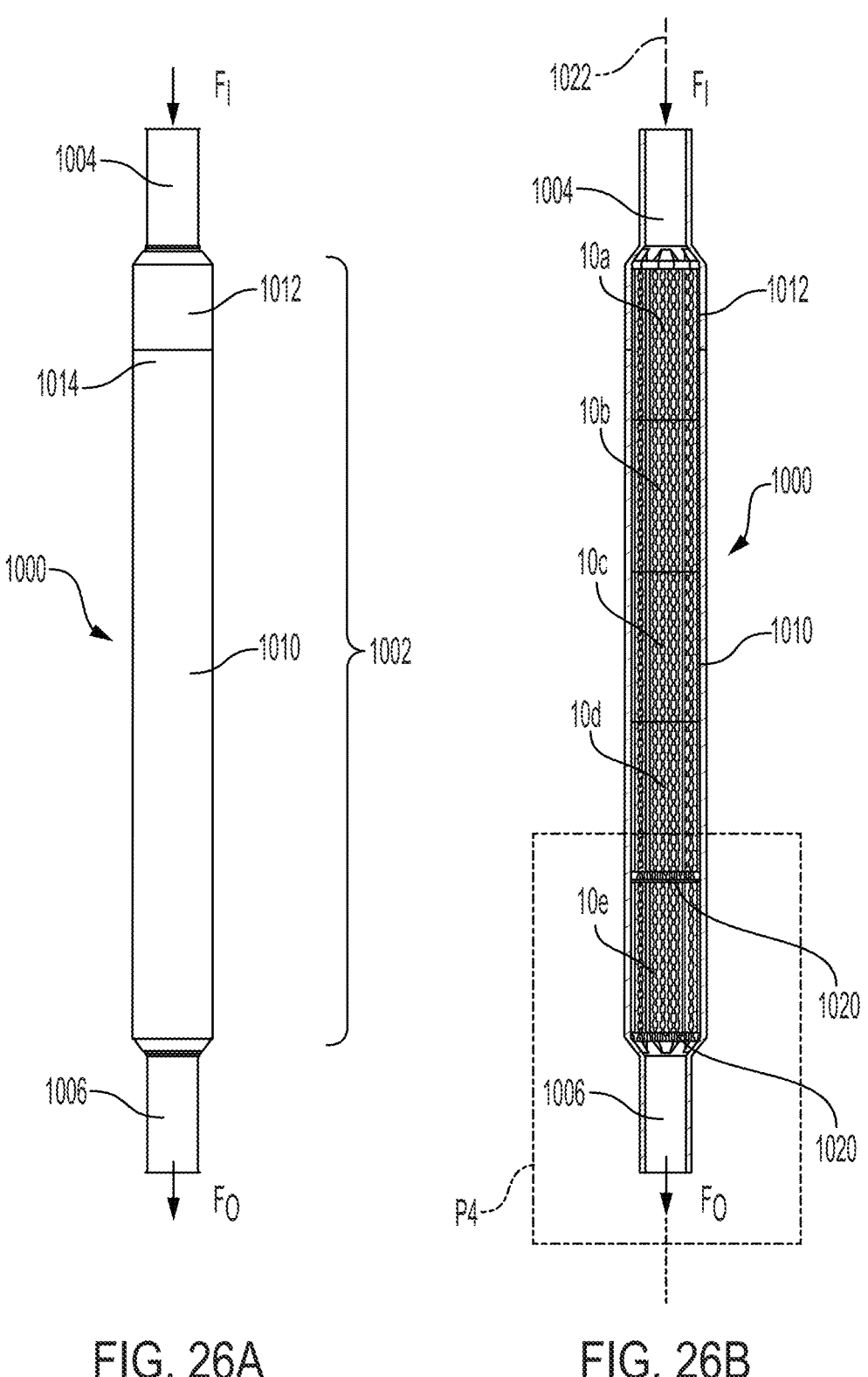
FIGS. 26A-C illustrate an embodiment of a fuel assembly comprising a plurality of fuel bundles with twisted ribbon fuel rodlets in fully assembled view (FIG. 26A), cross-sectional view (FIG. 26B), and in a magnified view of region P4 (FIG. 26C).
Figure 26C:
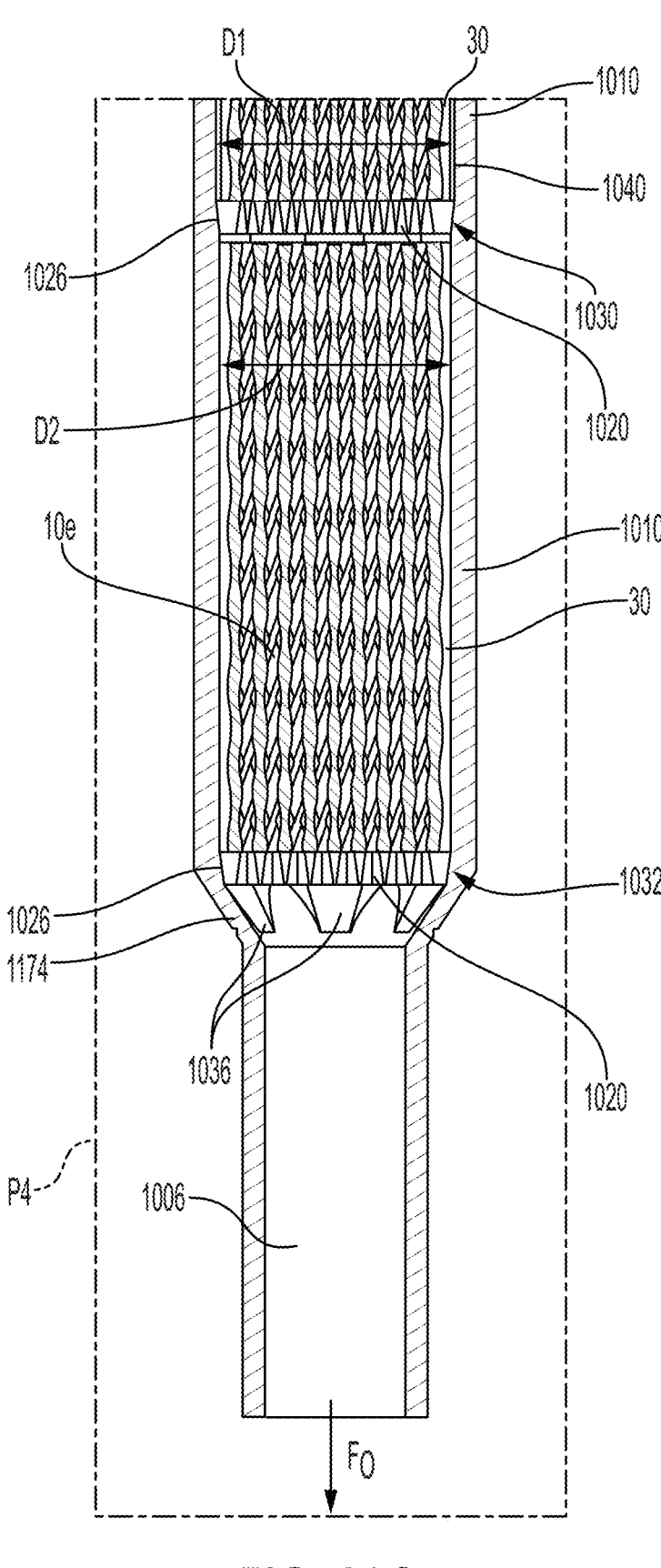

FIGS. 26A-C illustrate an embodiment of a fuel assembly comprising a plurality of fuel bundles with twisted ribbon fuel rodlets. In FIG. 26A, the fuel assembly 1000 is illustrated fully assembled. The fuel assembly 1000 includes a fuel assembly outer structure 1002, an inlet connection assembly 1004 connected to an inlet end of the fuel assembly outer structure 1002, and an outlet connection assembly 1006 connected to an outlet end of the fuel assembly outer structure 1002. The fuel assembly outer structure 1002 can include one or more pieces that encase and house the fuel bundles. In one example embodiment, the fuel assembly outer structure 1002 includes a lower fuel assembly outer structure 1010 and an upper fuel assembly outer structure 1012. During manufacture, the internal components of the fuel assembly 1000, such as the fuel bundles and any support structures, are inserted into the lower fuel assembly outer structure 1010 and then the upper fuel assembly outer structure 1012 is attached to the lower fuel assembly outer structure 1010, for example, a braze joint 1014. The braze joint 1014 is in the region of the fuel assembly outer structure 1002 toward the inlet end so that it is not exposed to temperatures above the melting point of the braze materials.

The inlet connection assembly 1004 and outlet connection assembly 1006 can be formed integrally with the upper fuel assembly outer structure 1012 and the lower fuel assembly outer structure 1010, respectively. For example, fiber manufacturing techniques can be used to form these structures. During operation, coolant flows through the fuel assembly 1000. Coolant flows ($F_I$) into the inlet connection assembly 1004, through the fuel bundles, and exhausts ($F_O$) from the outlet connection assembly 1006.

In FIG. 26B, the fully assembled fuel assembly 1000 is illustrated in cross-sectional view. Within the interior of the fuel assembly outer structure 1002 are interior components, that include a plurality of fuel bundles and, optionally, one or more fuel bundle supports 1020. In the illustrated embodiment, there are five fuel bundles (10a, 10b, 10c, 10d, 10e) arranged along the longitudinal axis 1022 of the fuel assembly 1000, with an inlet fuel bundle 10a located closest to the inlet end of the fuel assembly 1000 and an outlet fuel bundle 10e located closest to the outlet end of the fuel assembly 1000. During operation, the fuel bundles 10 in the fuel assembly outer structure 1002 are exposed to progressively higher temperatures. For example, the inlet fuel bundle 10a is typically exposed to temperatures of 200 to 610 K and, sequentially in the coolant flow direction, the fuel bundles are exposed to the following temperatures: temperature in second fuel bundle 10b is 610 to 1020 K, temperature in third fuel bundle 10c is 1020 to 1430 K, temperature in fourth fuel bundle 10d is 1430 to 1850 K, and temperature in outlet fuel bundle 10e is 1850 to 2250 K. Once the operating temperature in the fuel bundle is above approximately 1850 K, the twisted ribbon fuel rodlets are susceptible to ductile failures. To provide mechanical support and distribute the axial loading on the fuel bundles 10, one or more fuel bundle supports 1020 are located adjacent the fuel bundle(s) with design temperatures above 1850 K. For example, an outlet fuel bundle support 1020 is located below (in the coolant flow direction) the outlet fuel bundle 10e and in intermediate fuel bundle support 1020 is located between the outlet fuel bundle 10e and the preceding (in the coolant flow direction) fuel bundle 10d. Although FIG. 26B includes two fuel bundle supports 1020, a fuel bundle support may be installed below every fuel bundle 10 to isolate loads for each. Including a fuel bundle support 1020 below every fuel bundle 10 may be mechanically advantageous, but may have to be balanced against the core neutronics associated with having a fuel bundle support 1020 below every fuel bundle 10.

FIG. 26C is a magnified view of region P4 from FIG. 26B and illustrates details of the fuel bundle supports 1020 arranged in the fuel assembly outer structure 1002. An outer circumferential surface of the fuel bundle supports 1020 includes a tapered surface 1026. For fuel bundle supports 1020 at intermediate locations between fuel bundles 10, the tapered surface 1026 contacts a corresponding portion of the inner surface of the fuel assembly outer structure 1002 at which there is a reduction in cross-sectional diameter. For example, in FIG. 26C the inner surface of the fuel assembly outer structure 1002 changes from diameter D1 to diameter D2 (where D2 is less than D1) at tapered section 1030. For the outlet fuel bundle support 1020 that is located below (in the coolant flow direction) the outlet fuel bundle 10e, the tapered surface 1026 contacts a corresponding portion where there is a reduction in inner diameter as the coolant flow path transitions from the fuel bundles 10 to the outlet connection assembly 1006 and the corresponding portion can be associated with inner surfaces of the fuel assembly outer structure 1002, the outlet connection assembly 1006, or a combination thereof. For example, in FIG. 26C the reduction in inner diameter as the coolant flow path transitions from the fuel bundles 10 to the outlet connection assembly 1006 as at tapered section 1032. Alternatively or additionally to tapered section 1032, cleats 1036 or other structural support projecting radially inward from the inner diameter surface can provide a seating surface for the outlet fuel bundle support 1020.

Where the dimension of the inner surface of the fuel assembly outer structure 1002 is larger than the outer diameter of the outer surface of the multilayer casing 30 of the fuel bundle 10, a spacer 1040 or other inner diameter feature to allow for physical space between the inner diameter of the fuel assembly outer structure 1002 and the outer diameter of the fuel bundle 10. The spacer 1040 may be used to increase the radial thermal resistance profile of the fuel assembly 1000 in the location in which the spacer 1040 is present. The spacer 1040 may be formed on the inner diameter of the fuel assembly outer structure 1002, wound in a spiral on the outer diameter of the fuel bundle 10 installed in that location, or a separate part wound around the fuel bundle 10 before installation to fill the gap between the outer surface of the multilayer casing 30 of the fuel bundle 10 and the inner surface of fuel assembly outer structure 1002. Alternatively, fuel bundles 10 with different diameters can be used in the regions of the fuel assembly outer structure 1002 that have different inner diameters.

Figure 27:
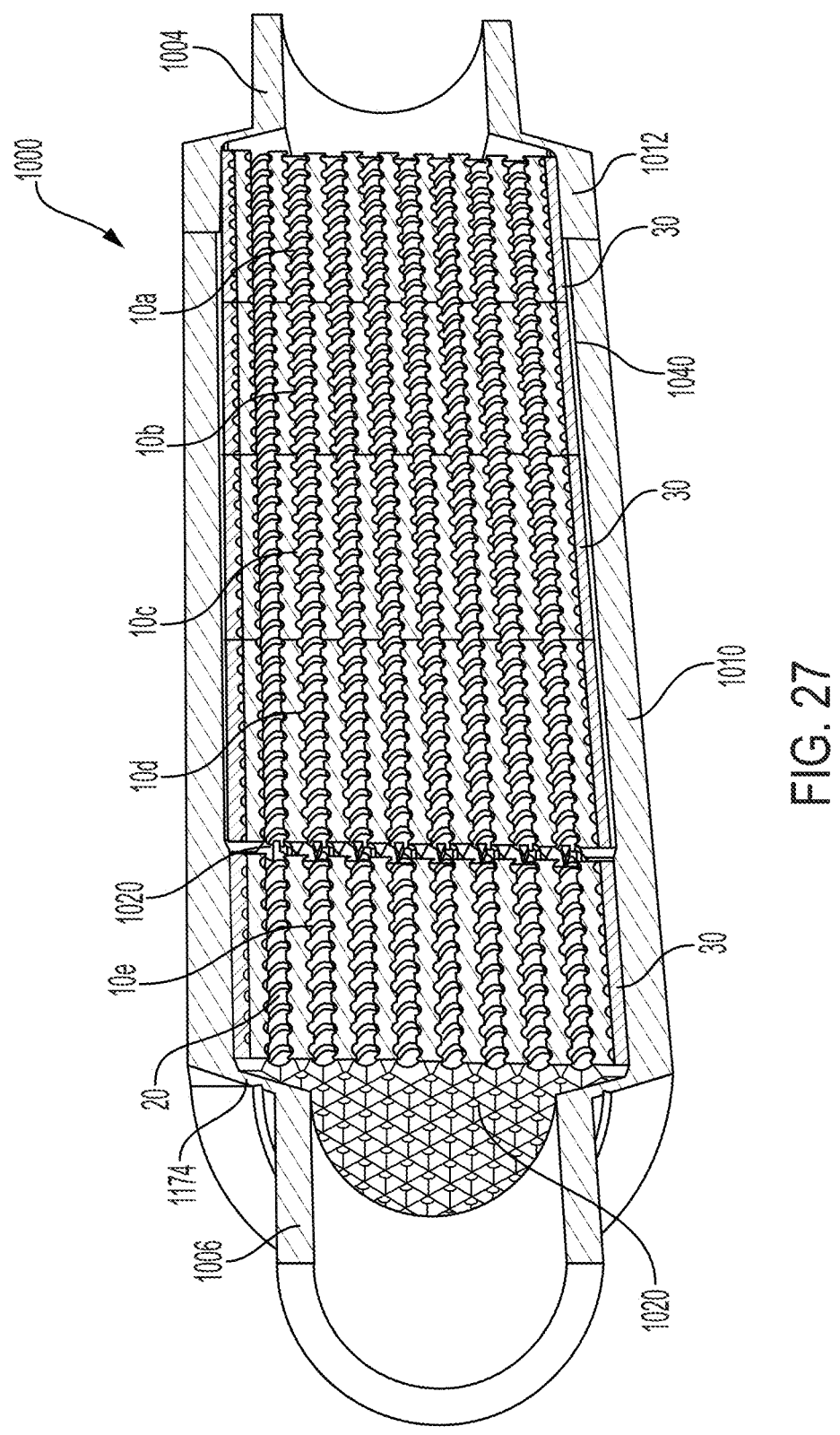
FIG. 27 is a perspective cross-sectional view of a fuel assembly comprising a plurality of fuel bundles with twisted ribbon fuel rodlets.
Figure 28:
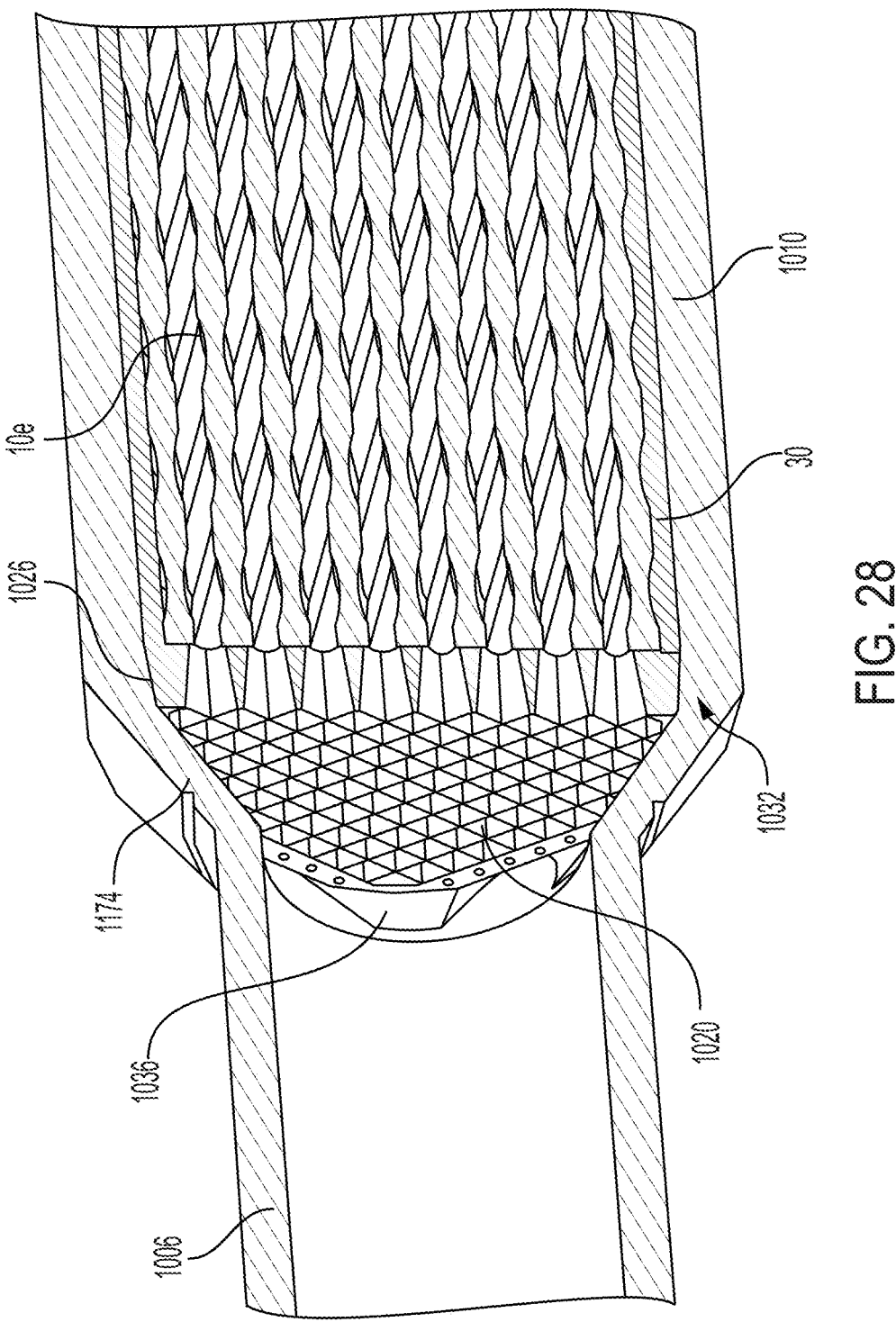
FIG. 28 is a magnified perspective cross-sectional view of an outlet region of a fuel assembly comprising a plurality of fuel bundles with twisted ribbon fuel rodlets and showing the fuel bundle support and a portion of the outlet fuel bundle.

FIG. 27 is a perspective cross-sectional view of a fuel assembly comprising a plurality of fuel bundles with twisted ribbon fuel rodlets and FIG. 28 is a magnified perspective cross-sectional view of an outlet region of a fuel assembly comprising a plurality of fuel bundles with twisted ribbon fuel rodlets and showing the fuel bundle support and a portion of the outlet fuel bundle. FIGS. 27 and 28 provide additional views of the internal features and structure of the fuel assembly 1000 in the outlet region.

Figure 29A:
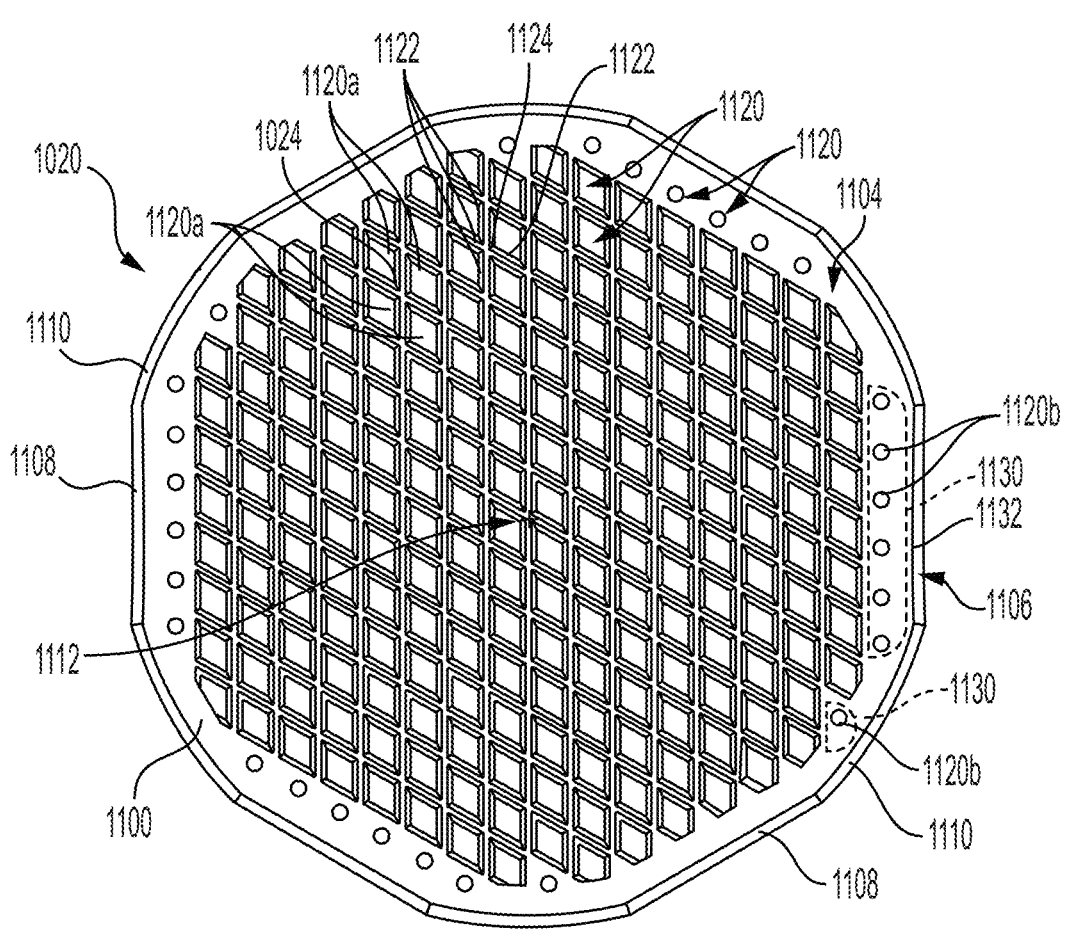
FIGS. 29A and B are schematic views of an embodiment of a fuel bundle support in plan bottom view (FIG. 29A) and plan side view (FIG. 29B).
Figure 29B:
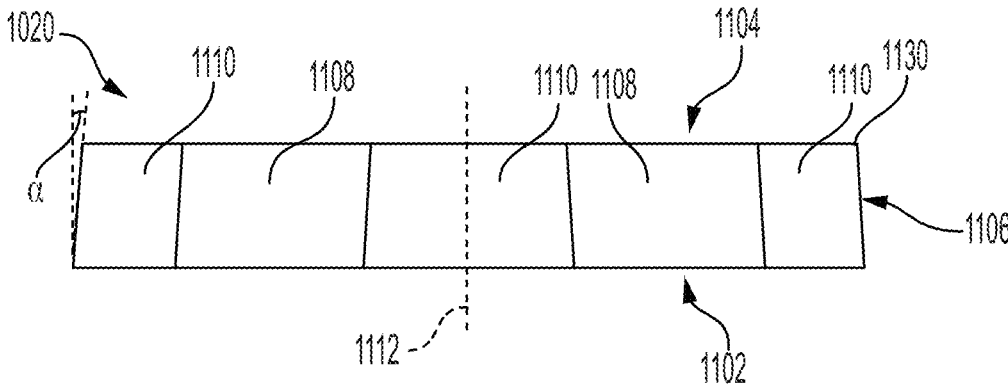

FIGS. 29A and B are schematic views of an embodiment of a fuel bundle support in plan bottom view (FIG. 29A) and plan side view (FIG. 29B). The fuel bundle support 1020 includes a body 1100 having a top surface 1102, a bottom surface 1104, and a circumferential side surface 1106. In example embodiments, the circumferential side surface 1106 includes alternating plane surfaces 1108 and curved surfaces 1110. In addition, the circumferential side surface 1106 is angled relative to an axis 1112 normal to the surfaces 1102, 1104 and located at the center of the body 1100 in the plan bottom view. The angled circumferential side surface 1106 is shown in FIG. 29B as having angle alpha ($\alpha$) and is in an axial direction from the top surface 1102 to the bottom surface 1104 is angled radially inward relative to the axis 1112. Angle alpha ($\alpha$) can vary from 3 to 20 degrees, alternatively 5 to 15 degrees. The angled circumferential side surface 1106 forms the tapered surfaces 1026 shown and described in connection with FIGS. 26C, 27, and 28.

The fuel bundle support 1020 also includes openings 1120 in the body 1100 that extend from the top surface 1102 to the bottom surface 1104. In example embodiments, the fuel bundle support 1020 has two types of opening 1120.

In a first opening type, the walls defining the individual openings are oriented relative to the plane of the top surface 1102 at an angle beta ($\beta$) greater than 90 degrees (see FIGS. 31A-B) so that the area of the opening at the top surface 1102 is less than the area of the opening at the bottom surface 1104. Example values for angle beta ($\beta$) range from 93 to 105 degrees. As an example, the walls defining the individual openings of the first opening type can form a truncated pyramid or a truncated cone with the truncated end oriented toward the top surface 1102 and the base end oriented toward the bottom surface 1104.

Figures 31A, 31B:
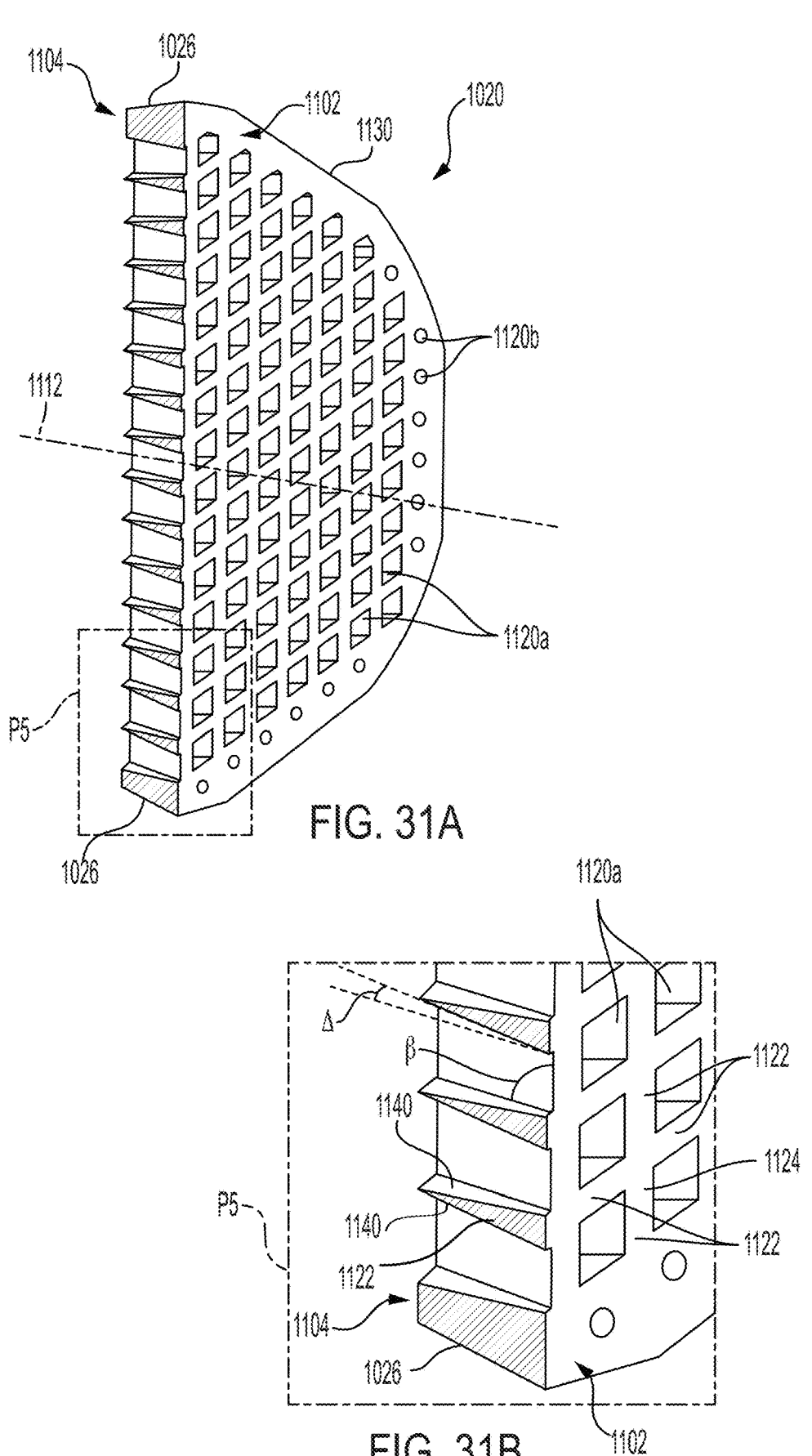
FIG. 31A is a perspective cross-sectional view of the fuel bundle support from FIGS. 29A-B and 30 and FIG. 31B is a magnified view of region P5 in FIG. 31A.

In FIG. 29A, the first opening type 1120a is a truncated pyramid that forms a rhombus at the top surface 1102 and the bottom surface 1104, but other geometries can be used such as other parallelograms. As seen from the bottom surface 1104 in FIG. 29A, a plurality of first opening types 1120a are arranged in a grid pattern, in which adjacent first opening types 1120a are separated by a wall 1122. The walls 1122 meet at intersections 1124. The top surface 1102 has a similar grid pattern with walls and intersections, but with thicker walls (as seen in FIGS. 31A-B). In example embodiments, the walls 1122 on the top surface 1102 have a length equal to or greater than 1 mm and equal to or less than 2 mm, such as 1.3 to 1.6 mm, and the walls 1122 on the top surface 1102 form an area for the opening of the first opening types 1120a of equal to or less than 4 mm$^2$, such as 1.7 to 2.6 mm$^2$. In example embodiments, the walls 1122 on the bottom surface 1104 have a length equal to or greater than 1.5 mm and equal to or less than 2.5 mm, such as 1.9 to 2.2 mm, and the walls 1122 on the bottom surface 1104 form an area for the opening of the first opening types 1120a of equal to or less than 6.25 mm$^2$, such as 2.25 to 2.6 mm$^2$, and the area for the opening of the first opening types 1120a formed by the walls 1122 on the bottom surface 1104 is greater than the area for the opening of the first opening types 1120a formed by the walls 1122 on the top surface 1102.

In a second opening type, the walls defining the individual openings are oriented relative to the plane of the top surface

1102 at an angle of about 90 degrees (where about means the angle varies by ±1 degree and accounts for manufacturing tolerances) so that the area of the opening at the top surface 1102 is equal to (within ±2%) of the area of the opening at the bottom surface 1104. As an example, the walls defining the individual openings of the second opening type 1120*b* can form a right angle relative to the top surface 1102 and the bottom surface 1104. In some embodiments, the second opening type 1120*b* is a right cylinder with a first circular end oriented toward the top surface 1102 and a second circular end oriented toward the bottom surface 1104 or the second opening type 1120*b* an elongated polygon with a first end oriented toward the top surface 1102 and a second end oriented toward the bottom surface 1104.

In FIG. 29A, the second opening type 1120*b* is a right cylinder that forms a circle at the top surface 1102 and the bottom surface 1104, but other geometries can be used as noted above. As seen from the bottom surface 1104 in FIG. 29A, a plurality of second opening types 1120*b* are arranged in regions 1130 that are radially inward from the periphery 1132 of the bottom surface 1104 and radially outward from the grid pattern formed by the first opening types 1120*a*. These regions 1130 correspond to locations where, if the first opening type 1120*a* were to be continued radially outward in continuation of the grid pattern, the area of the first opening type 1120 would be constrained by the circumferential side surface 1106 to have an area of the opening that is less than 1 mm². Therefore, a second opening type 1120*b* can be formed in the regions 1130 to replace these small first opening types 1120 and still provide a cooling path in that region of the fuel bundle 10 and the fuel assembly 1000. In example embodiment, the second opening types 1120*b* are holes having a diameter of 1 mm (±0.1 mm).

Figure 30:
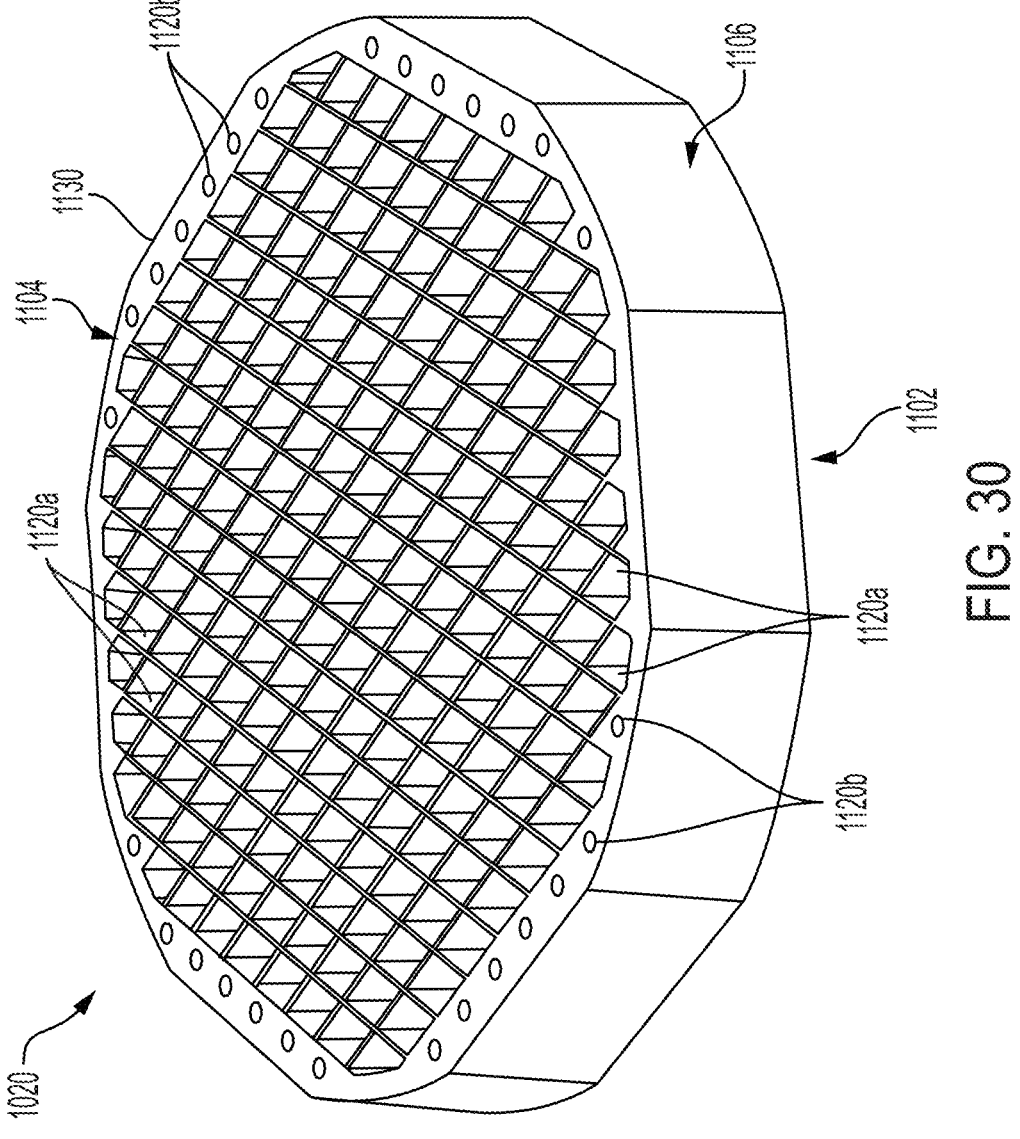
FIG. 30 is a perspective view of the fuel bundle support from FIGS. 29A and B.

FIG. 30 is a perspective view of the fuel bundle support 1020 from FIGS. 29A and B. The perspective view is from above and to the side of the fuel bundle support 1020 and shows the bottom surface 1104 and circumferential side surface 1106. Both the first opening type 1120*a* and second opening type 1120*b* are visible in FIG. 30.

FIG. 31A is a perspective, cross-sectional view of the fuel bundle support 1020 from FIGS. 29A-B and 30 and FIG. 31B is a magnified view of region P5 in FIG. 31A. The perspective view shows the top surface 1102 of the fuel bundle support 1020 with a plurality of first opening types 1120*a* in a grid pattern, in which adjacent first opening types 1120*a* are separated by a wall 1122 and walls 1122 of adjacent first opening types 1120*a* meet at intersections 1124. As noted previously, the plurality of first opening types 1120*a* are arranged in a grid pattern with walls 1122 and intersections 1124 and the grid pattern with walls and intersections of the top surface 1102 is similar to the grid pattern with walls and intersections of the bottom surface, but the walls 1122 are thicker at the top surface 1102 as compared to at the bottom surface 1104. As seen in the magnified view of the cross-section shown in FIG. 31B, surfaces 1140 of the wall 1122 are oriented at an angle delta (Δ) relative to the direction of axis 1112 from a first end 1142 (corresponding to the top surface 1102) to a second end 1144 corresponding to the bottom surface 1104). Example values for angle delta (Δ) range from 3 to 15 degrees. Typically, all walls of the first opening types 1120*a*, e.g., four walls, are oriented at an angle delta. In other embodiments, at least two of the walls are oriented at an angle delta (in which case, the remaining walls are at right angles to the top surface and bottom surface). Orienting the surfaces 1140 of the walls 1122 of the first opening types 1120*a* and creating first opening types 1120*a* where the area of the opening at the top surface 1102 is less than the area of the opening at the bottom surface 1104 contributes to minimizing the pressure drop across the fuel bundle support 1020 during operation of the fuel assembly.

The choice of material for the fuel bundle support 1020 can be based, at least in part, on the location in the fuel assembly 1000 where the fuel bundle support 1020 will be installed and on the anticipated temperatures during operation for that location. For example, for anticipated operating temperatures at or above 2000 K (i.e., in high temperature regions of the fuel assembly), the fuel bundle support 1020 can be formed of a carbide, such as zirconium carbide (ZrC) or zirconium niobium carbide (ZrNbC). Also for example, for anticipated operating temperatures below 2000 K (i.e., cooler temperature regions of the fuel assembly), the fuel bundle support 1020 can be formed of tungsten, molybdenum, or other refractory metals, or by refractory metal alloys such as a Zircaloy-4 alloy. Of course, materials used for the high temperature region fuel bundle support can also be used for the cooler temperature region fuel bundle supports. In the embodiment of FIGS. 26B and 26C, the outlet fuel bundle support 1020 is formed of zirconium carbide and the fuel bundle supports 1020 at intermediate locations (if any) are formed of either tungsten or zirconium carbide or zirconium niobium carbide.

When formed of tungsten, an example manufacturing method includes powder metallurgy techniques to form near net shape green bodies of the fuel bundle support 1020, followed by sintering. The sintered bodies are then machined to form the first opening types 1120*a* in the grid pattern, such as by creating an initial hole and then wire EDM (electrical discharge machining) the first opening type 1120*a* using a 3-axis EDM machine, which allows creating of the various angled surfaces, followed by any finish machining, and to form the second opening types 1120*b*, such as with a EDM hole popper or a drill. Fuel bundle supports 1020 of tungsten and other refractory metals can also be manufactured using additive manufacturing processes.

When formed of a carbide, such as zirconium carbide, example manufacturing methods include gel casting techniques, spark plasma sintering, and injection molding, in each case followed by machining. For example, a slurry of zirconium carbide can be cast to form a green body and sintered. The mold for casting can be a negative mold of the final geometry (including one or both opening types) with suitable allowance for shrinkage and so as to form a near net-shape part. The sintered bodies are then machined (as necessary) to form the first opening types 1120*a* in the grid pattern, such as by creating an initial hole and then wire EDM the first opening type 1120*a* using a 3-axis EDM machine, which allows forming of the various angled surfaces, followed by any finish machining. For gel cast or injection molded parts, the parts may need only surface grinding on the top surface 1104 and the bottom surface 1102 and circumferential side surfaces 1106 on the tapered surface defined by the angle alpha (α). Regardless of how manufactured, the interior wall surfaces 1140 of the openings 1120 may be left as-manufactured and do not need to be machined or enhanced, e.g., by EDM, in order to increase production cycle speed.

Figure 32:
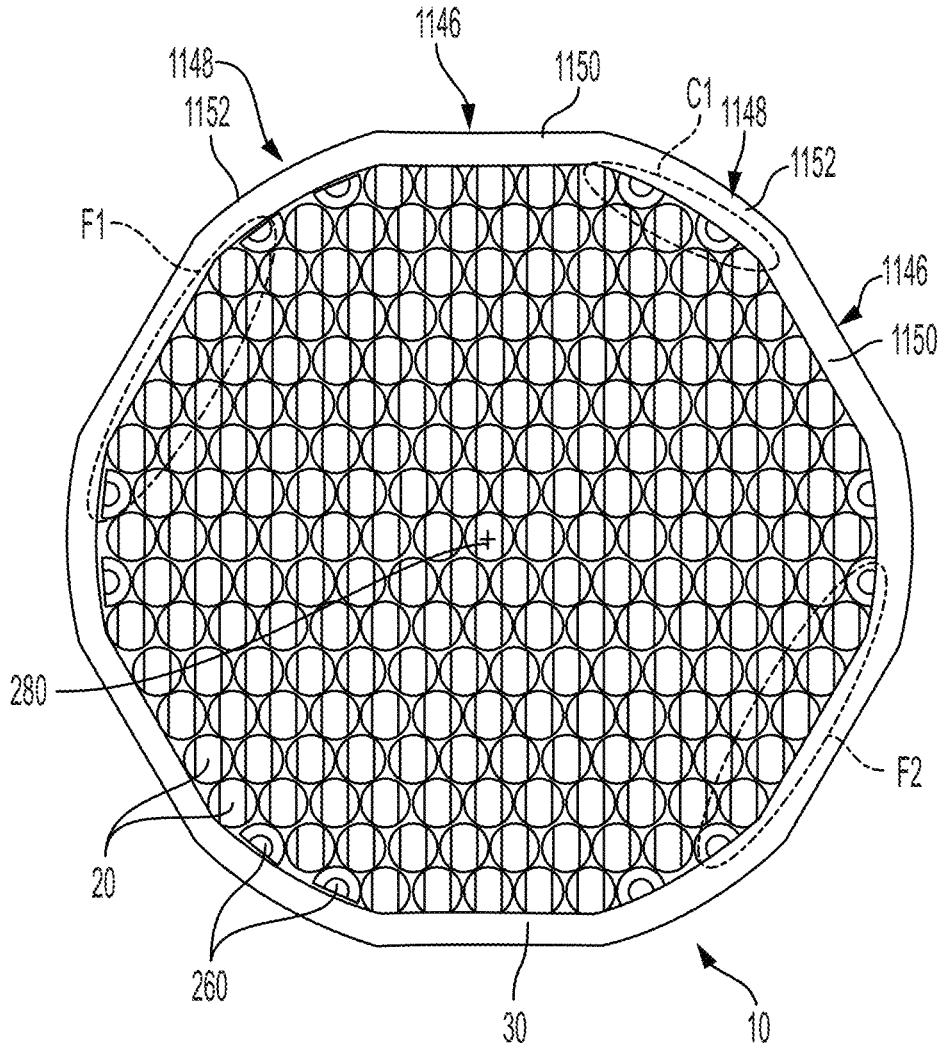
FIG. 32 is an end view of another embodiment of an assembled fuel bundle.

FIG. 32 is an end view of another embodiment of an assembled fuel bundle. In this embodiment, the shape of the circumference of the assembled fuel bundle 10 deviates from the circular geometry shown and described in FIG. 12. Instead, the multilayer casing 30 has an outer surface including planar areas 1146 and curved areas 1148 (in cross-section, these areas are seen as straight segments 1150 and curved segments 1152, respectively). Because of the hexagonal pattern of the twisted ribbon fuel rodlets 20 in the core region 22, there are areas (e.g., F1 and F2) of the side of the core region that are planar and these planar areas translate to planar areas 1146 when the assembled twisted ribbon fuel rodlets are encased in the multilayer casing 30. Other areas (e.g., C1) associated with the presence of filler rods 260 result in sides of the core region that are curved and these curved sides translate to curved areas 1148 when the assembled twisted ribbon fuel rodlets are encased in the multilayer casing 30. The presence of curved areas 1148 contributes to the ability to tightly wind the fibers of the multilayer casing 30 during manufacture using fiber manufacturing techniques.

Figure 33A:
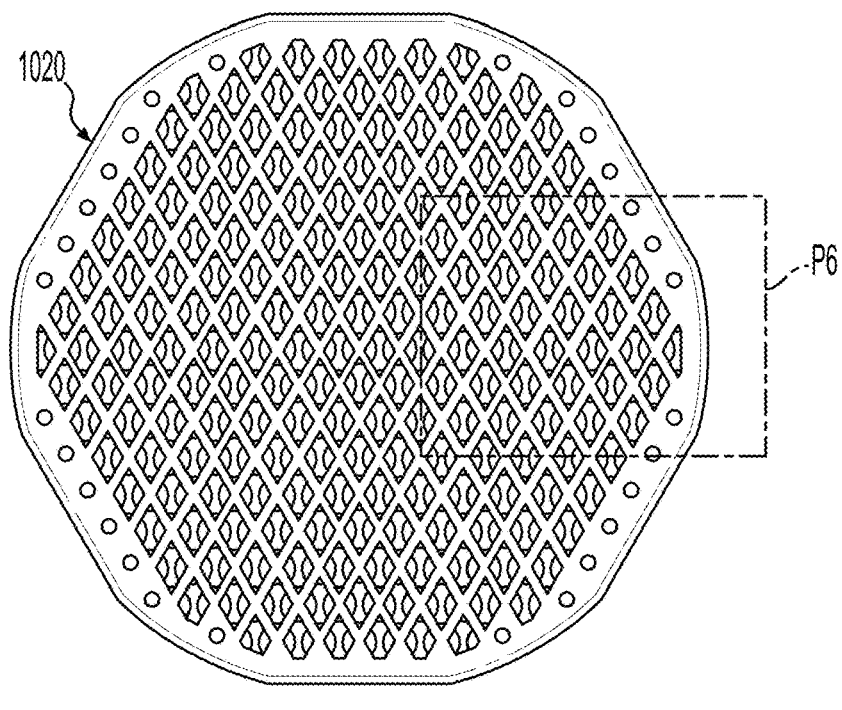
FIG. 33A illustrates the assembled fuel bundle of FIG. 32 seated on a fuel bundle support and FIG. 33B is a magnified view of region P6 in FIG. 33A.
Figure 33B:
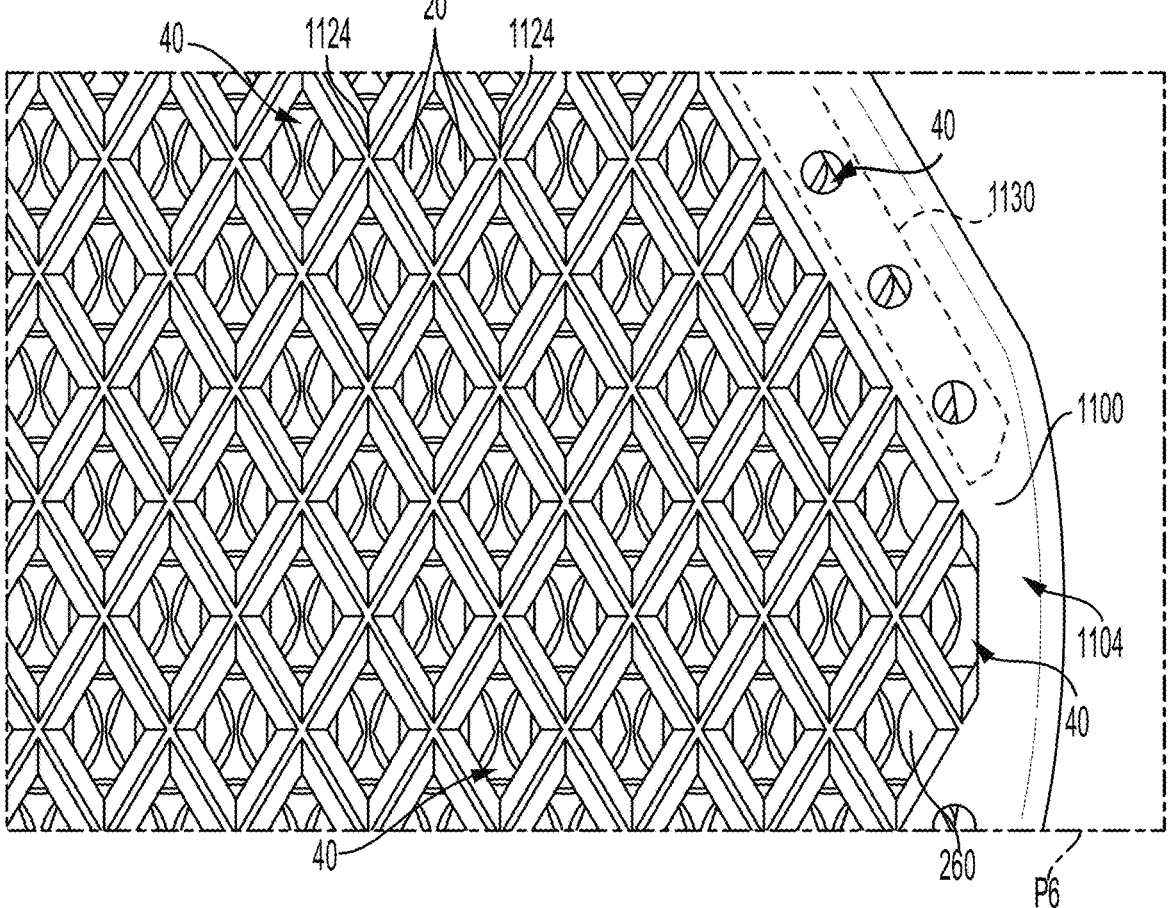

FIG. 33A illustrates an assembled fuel bundle of FIG. 32 seated on a fuel bundle support and FIG. 33B is a magnified view of region P6 in FIG. 33A. The twisted ribbon fuel rodlets 20 are visible through the openings 1120 in the fuel bundle support 1020. The twisted ribbon fuel rodlets 20 are aligned with an intersection 1124 of the grid pattern. In this way, the twisted ribbon fuel rodlets 20 are supported by the grid pattern of the fuel bundle support 1020 when axial forces (in a direction of the longitudinal axis 12 of the fuel bundle 10) exist in the fuel bundle 10. The twisted ribbon fuel rodlets 20 at the periphery of the core region 22 are similar supported in the presence of axial forces by the body 1100 of the fuel bundle support 1020 in the regions 1130. The end of the multilayer casing 30 can also be supported in the regions 1130. Additionally, a majority of the cross-sectional area of the void spaces 40 between the twisted ribbon fuel rodlets 20 are aligned with the openings 1020, either the first opening types 1120*a* or second opening types 1120*b*, which facilities coolant flow through the fuel assembly 1000 during operation with a minimum of pressure drop.

Figure 34A:
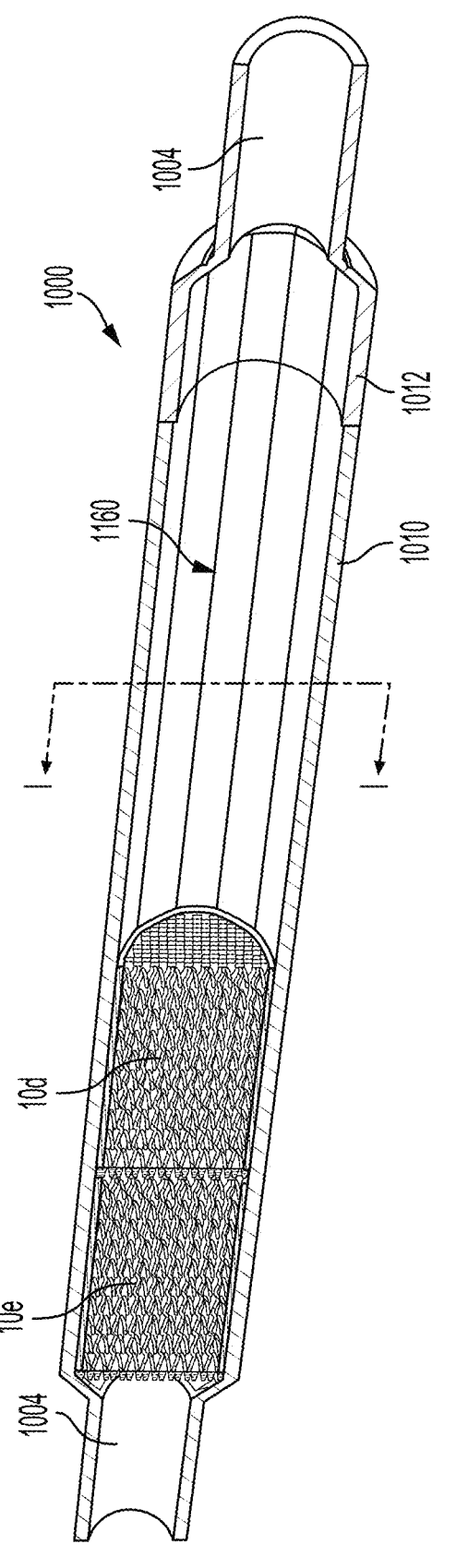
FIGS. 34A-C are various internal views of a fuel assembly including a cross-sectional view (FIG. 34A), a view at section I-I (FIG. 34B), and a magnified view (FIG. 34C) and shows the contoured inner surface of the fuel assembly outer structure.
Figure 34B:
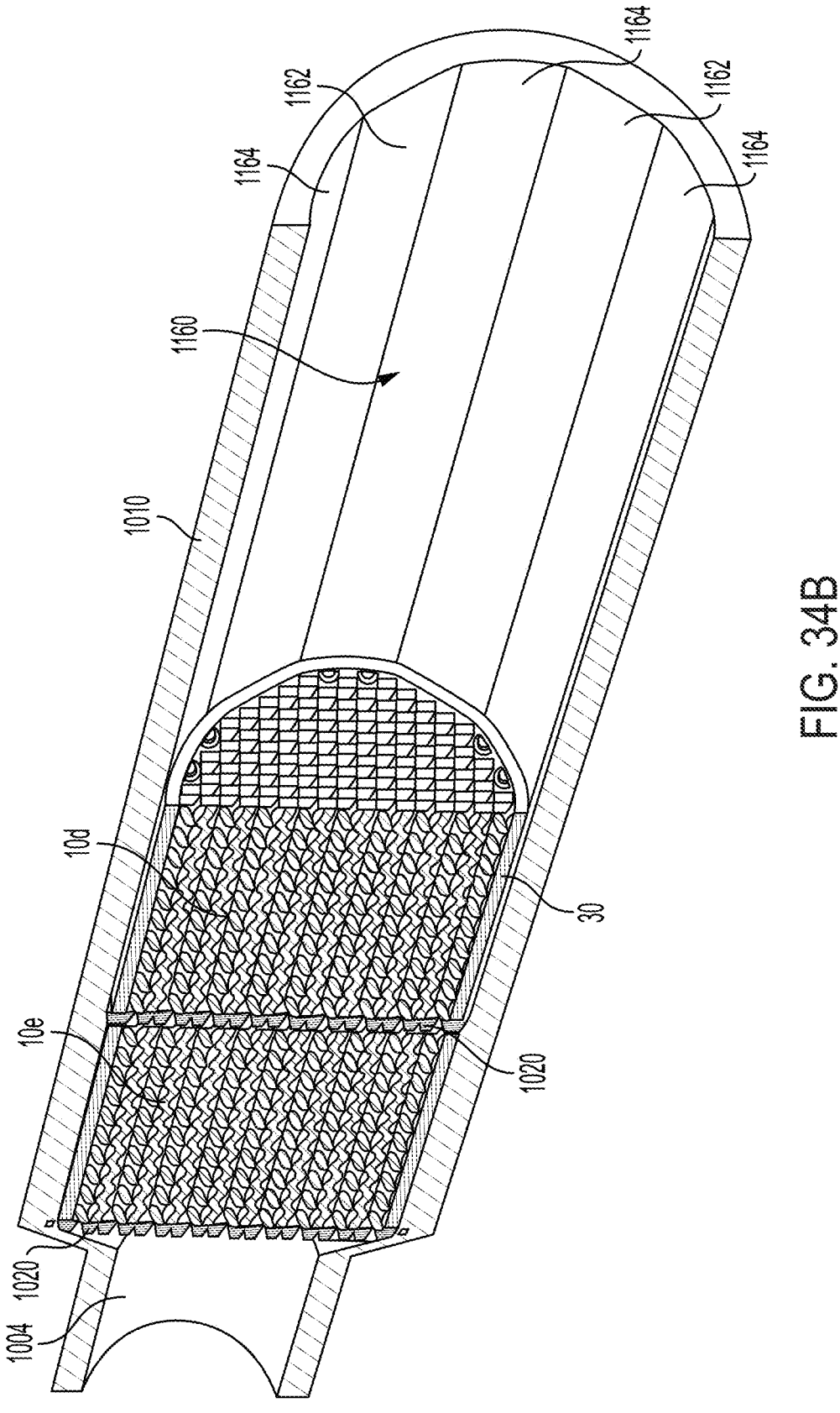

FIG. 34A is a cross-sectional view of a fuel assembly 1000 showing fuel bundles (outlet fuel bundle 10*e* and fourth fuel bundle 10*d*) toward the outlet end of the fuel assembly 1000 and the contoured inner surface 1160 of the fuel assembly outer structure 1002. FIG. 34B corresponds to the view at section I-I of FIG. 34A. The contoured inner surface 1160 has facets. The facets are located in both the lower fuel assembly outer structure 1010 and the upper fuel assembly outer structure 1012. In exemplary embodiments, the facets include planar sections 1162 and curved sections 1164 extending in the longitudinal direction of the fuel assembly outer structure 1002. The planar sections 1162 and curved sections 1164 can alternate on the contoured inner surface 1160. The planar sections 1162 and curved sections 1164 correspond in shape and size to the planar areas 1146 and curved areas 1148, respectively, of embodiments of the multilayer casing 30 shown, for example, in FIG. 32.

Figure 34C:
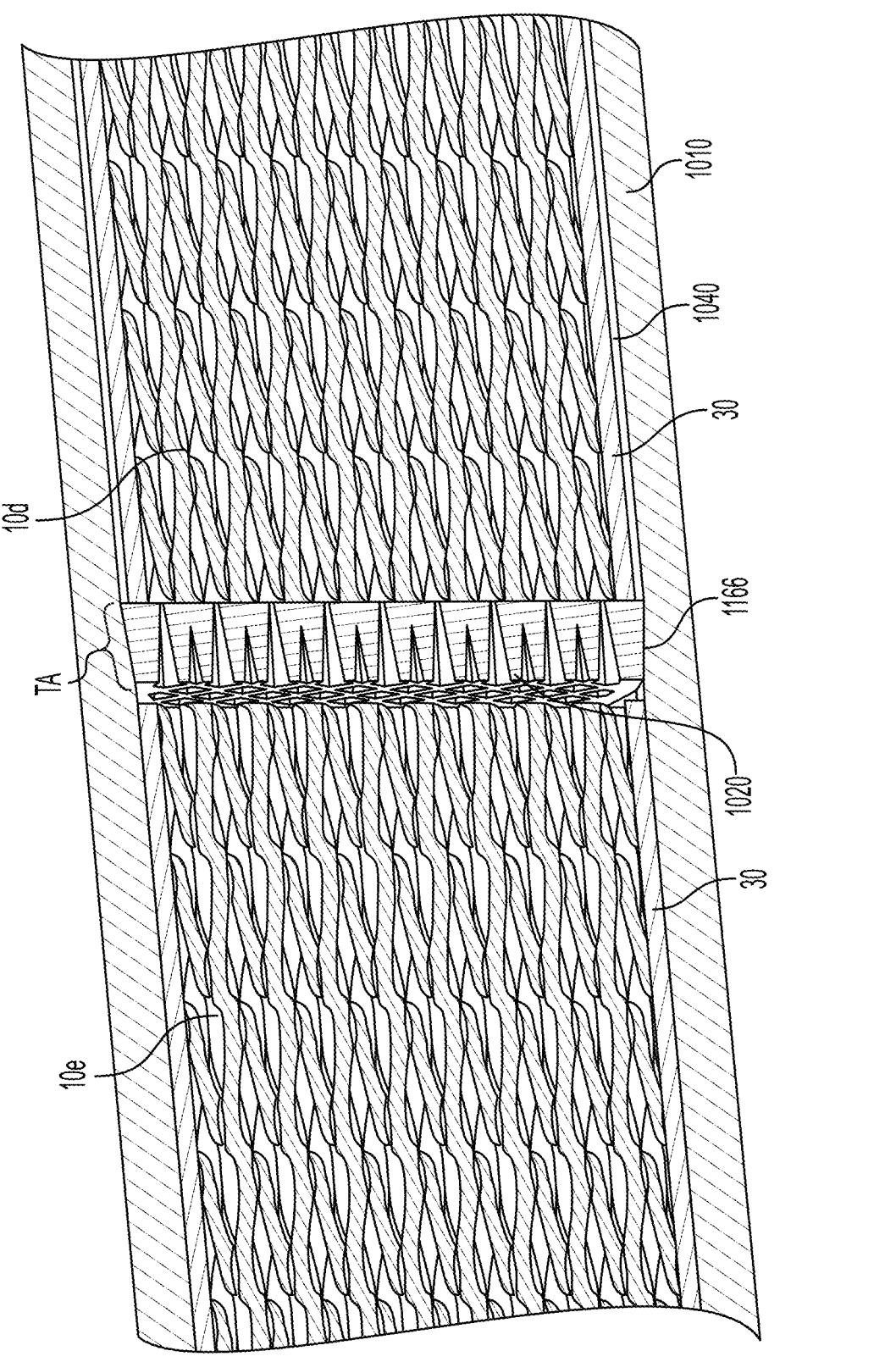

Also, as seen in FIG. 34C, the contoured inner surface 1160 has a region (TA) with both an angled surface 1166 (angled relative to the longitudinal axis of the fuel assembly outer structure 1002) and faceting, e.g., alternating planar sections 1162 and curved sections 1164 that corresponds to the alternating planar surfaces 1108 and curved surfaces 1110 of the circumferential side surface 1106 of the fuel bundle support 1020.

When the outer surface of the multilayer casing 30 of the assembled fuel bundle 10 is conformally mated, either directly or indirectly, with the contoured inner surface 1160 of the fuel assembly outer structure 1002, the non-circular shape of the outer surface prevents rotation of the assembled fuel bundle 10 relative to the fuel assembly outer structure 1002. The shape of the fuel bundle supports 1020 formed by the outer circumferential surfaces 1106 is similarly non-circular and functions to prevent rotation of fuel bundle supports 1020 relative to the fuel assembly outer structure 1002. Taken together, non-rotation relative to the fuel assembly outer structure 1002 of the assembled fuel bundles 10 and of the fuel bundle supports 1020 also prevents the assembled fuel bundles 10 and the fuel bundle supports 1020 from rotating relative to each other, which contributes to maintaining alignment of the coolant flow path between the assembled fuel bundles 10 in the fuel assembly 1000, as well as alignment of the coolant flow path between the assembled fuel bundles 10 and the openings 1120 (both first opening types 1120*a* and second opening types 1120*b*) in the fuel bundle supports 1020.

Other locking mechanisms to prevent movement of the fuel bundle supports 1020 relative to the assembled fuel bundles 10 can also be used, such as lock pins or keyways.

Figure 35A:
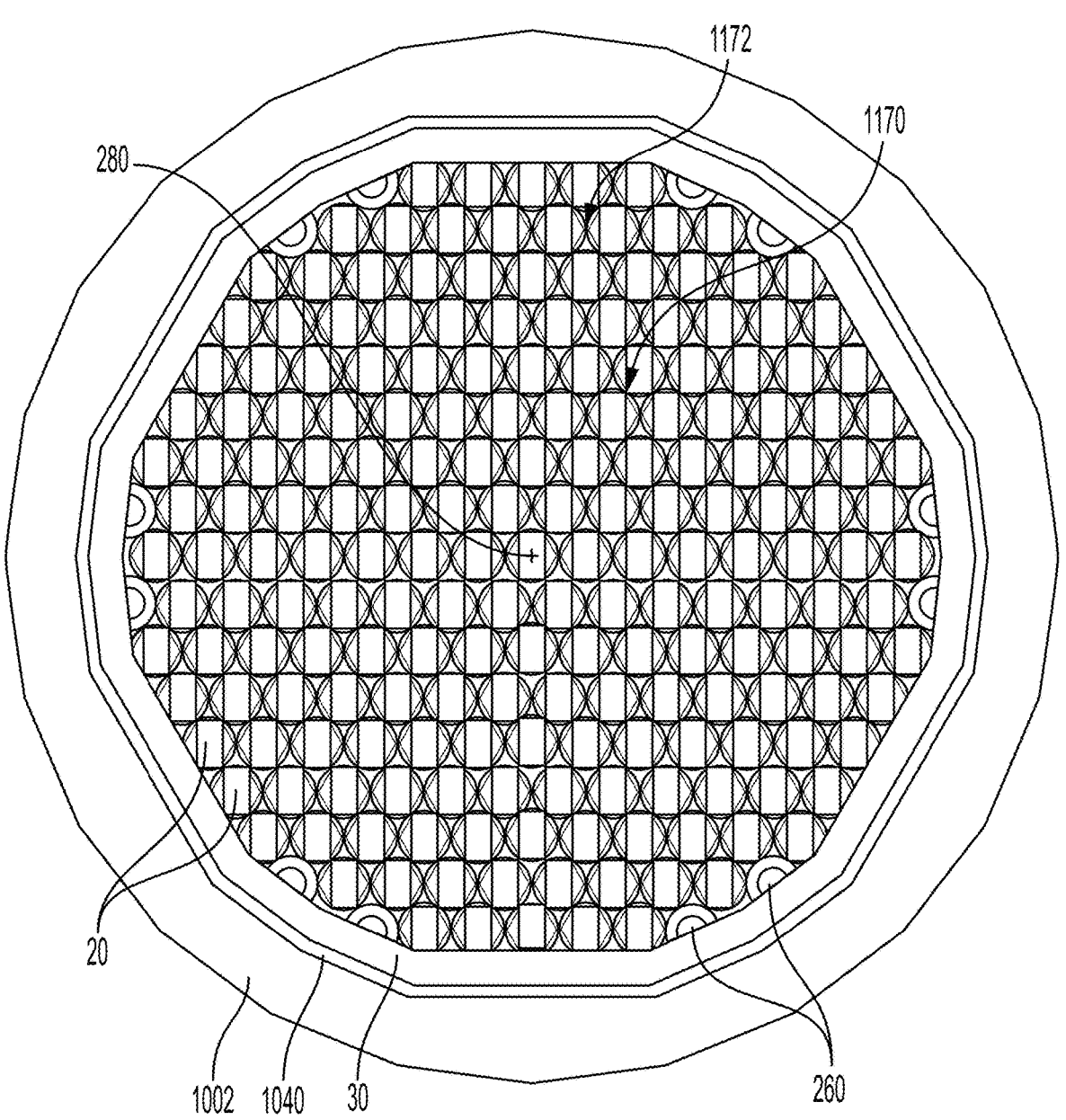
FIGS. 35A and B illustrate embodiments of the conformal interface between the outer surface of the multilayer casing of the fuel bundle and the inner surface of the fuel assembly outer structure in a view of the fuel assembly looking along the longitudinal axis of the fuel assembly toward the outlet region (FIG. 35A) and in a perspective view (FIG. 35B).
Figure 35B:
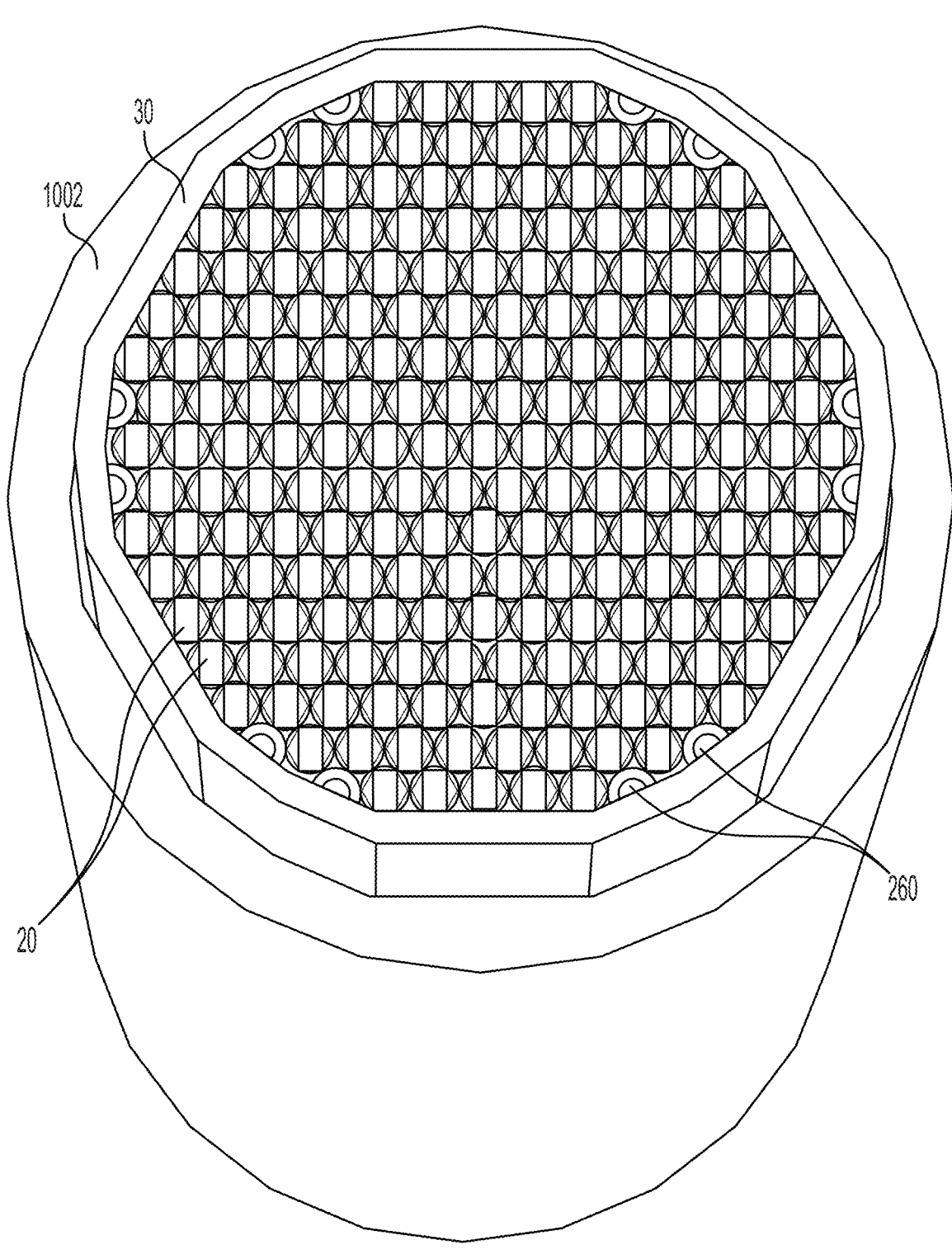

FIGS. 35A and B illustrate embodiments of the conformal interface between the outer surface of the multilayer casing 30 of the fuel bundle 10 and the contoured inner surface 1160 of the fuel assembly outer structure 1002 in a view of the fuel assembly looking along the longitudinal axis of the fuel assembly 1000 toward the outlet region (FIG. 35A) and in a perspective view (FIG. 35B). In FIG. 35A, the outer surface of the multilayer casing 30 of the assembled fuel bundle 10 is indirectly conformally mated with the contoured inner surface 1160 of the fuel assembly outer structure 1002 with spacer 1040 or other inner diameter feature positioned between the assembled fuel bundle 10 and the fuel assembly outer structure 1002. In FIG. 35A, the view is along the longitudinal axis 280 toward the outlet end of the fuel assembly 1000 and one is looking through the outlet fuel bundle 10*e* and the fuel bundle support 1020 and out the outlet connection assembly 1006. Thus, in a central region 1170, one sees along the void spaces 40 and out the outlet connection assembly 1006, while in an outer radial region 1172 one sees along the void spaces 40 and to the walls of the transition section 1174 of the outlet connection assembly 1006. In FIG. 35B, the outer surface of the multilayer casing 30 of the assembled fuel bundle 10 is directly conformally mated with the contoured inner surface 1160 of the fuel assembly outer structure 1002.

In alternative embodiments, one or both of the curved sections 1164 of the contoured inner surface 1160 of the fuel assembly outer structure 1002 and the curved areas 1148 of the fuel bundle support 1020 can be a discontinuous curve or can be formed by a plurality of short or narrow planar surfaces that, as whole, approach a curved shape. For example, a series of three, four, five or more short or narrow planar surfaces can, over a defined length, approach a curvature of a continuous curve. In such cases, any gap formed by the minor non-conformity between the inner surfaces 1160 of the fuel assembly outer structure 1002 and the circumferential side surface 1106 of the fuel bundle support 1020 and the outer surface of the multilayer casing 30 of the fuel bundle 10 can be optionally filled by, for example, a spacer 1040 or other inner diameter feature, as disclosed herein.

Figure 36:
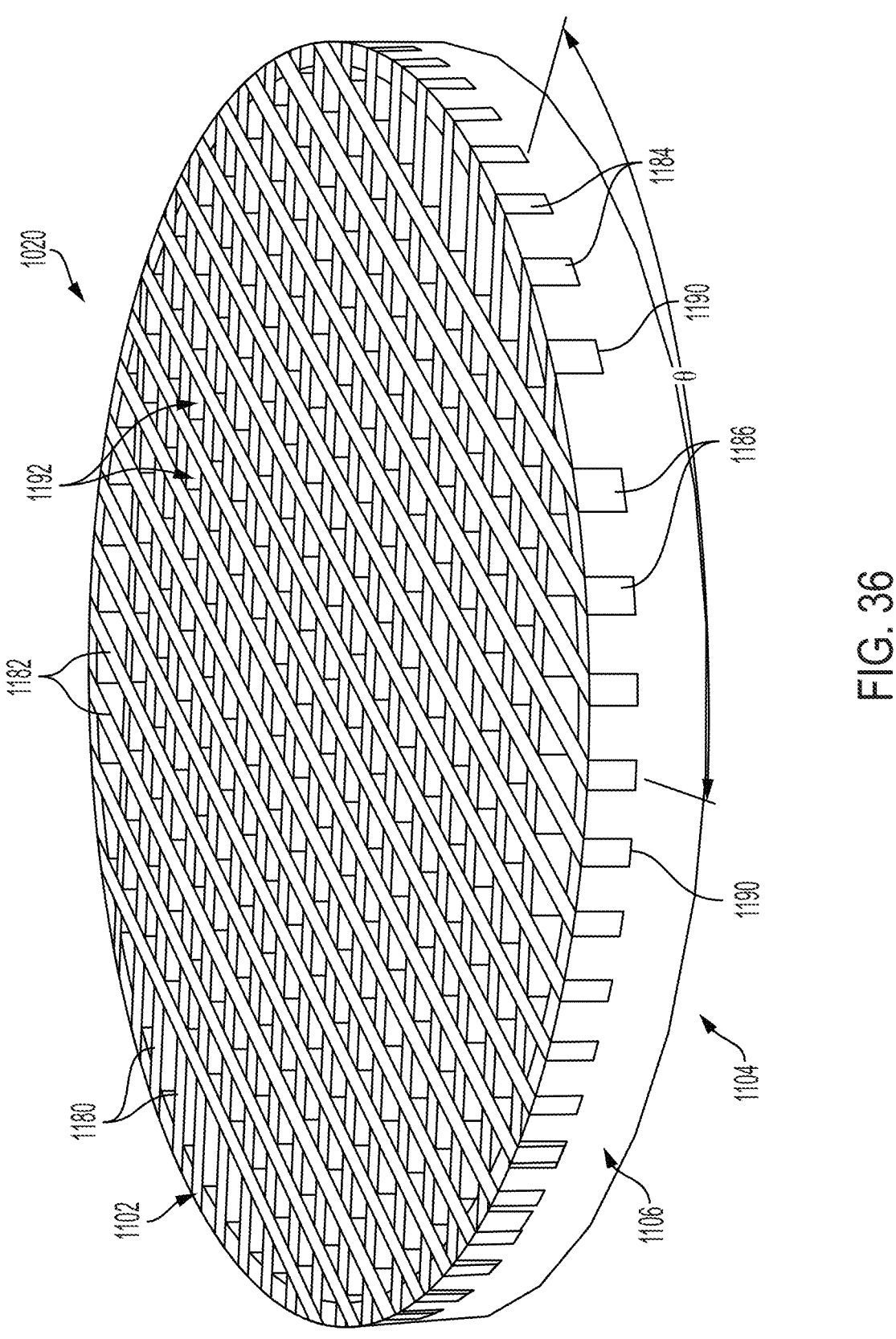
FIG. 36 is a perspective view of an alternate embodiment of a fuel bundle support.

The fuel bundle support 1020 can have alternative embodiments. FIG. 36 is a perspective view of an alternate embodiment of a fuel bundle support 1020. In the FIG. 36 embodiment, a plurality of first ribs 1180 are oriented non-parallel to a plurality of second ribs 1182. The first ribs 1180 have teeth located periodically along the length that are interdigitated with teeth located periodically along the length of second ribs 1182 so that, when assembled, the first ribs 1180 and second ribs 1182 form a common planar surface (in FIG. 36, this corresponds to the top surface 1102). Ends 1184 of the first ribs 1180 and ends 1186 of the second ribs 1182 sit in receiving slots 1190 in the circumferential side surface 1106 of the fuel bundle support. Some or all of the various contact points between first rib 1180 and second rib 1182, between first rib 1180 and circumferential side surface 1106, and between second rib 1182 and circumferential side surface 1106 can be secured together by, for example, an autogenous weld joint. In this alternative embodiment, the ribs 1180, 1182 can be shaped to have walls in the opening 1192 that are at a right angle relative to the top surface 1102 or that form an obtuse angle to the top surface 1102 (similar to angle beta (β) shown in FIG. 31B).

Figures 37A, 37B:
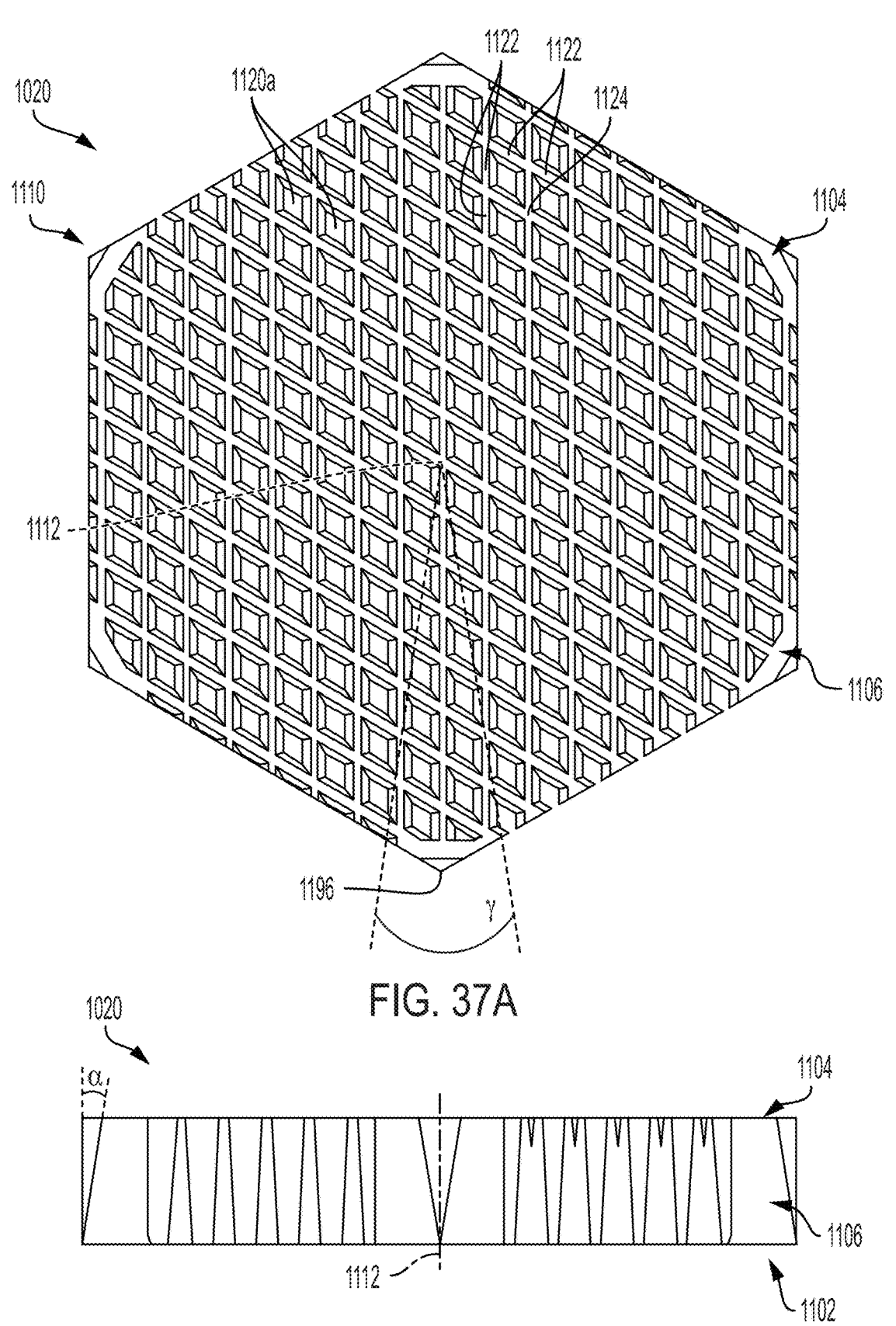
FIGS. 37A and B are schematic views of another embodiment of a fuel bundle support in plan bottom view (FIG. 37A) and plan side view (FIG. 37B).

FIGS. 37A and B are schematic views of another alternative embodiment of a fuel bundle support in plan bottom view (FIG. 37A) and plan side view (FIG. 37B). In FIGS. 37A and B, the fuel bundle support 1020 is similar to that shown and described in connection with FIGS. 29A-B, 30 and 31A-B, but in the alternative embodiment illustrated in FIGS. 37A-B, the circumferential side surface 1106 of the fuel bundle support 1020 forms a hexagon and the circumferential side surface 1106 does not have curved surfaces 1110 or the curved surfaces are limited to a portion of the circumferential side surface 1106 corresponding to an arc having an angle gamma (γ) of ±5 degrees to either side of the vertices 1196 of the hexagon. In other aspects, many of the structures, features and functions of the embodiment of the fuel bundle support 1020 in FIGS. 29A-B, 30 and 31A-B are also present in the alternative embodiment of the fuel bundle support 1020 in FIGS. 37A and B, including the first type openings 1120a, walls 1122 meeting at intersection 1124, angled circumferential side surface having angle alpha (α) that is from 3 to 20 degrees, walls defining the individual openings oriented relative to the plane of the top surface 1102 at an angle beta (β) greater than 90 degrees, such as 93 to 105 degrees, so that the area of the opening at the top surface 1102 is less than the area of the opening at the bottom surface 1104, and surfaces of the wall 1122 (in the openings) are oriented at an angle delta (Δ) relative to the direction of axis 1112 from a first end (corresponding to the top surface 1102) to a second end corresponding to the bottom surface 1104) that is from 3 to 15 degrees.

Figure 38:
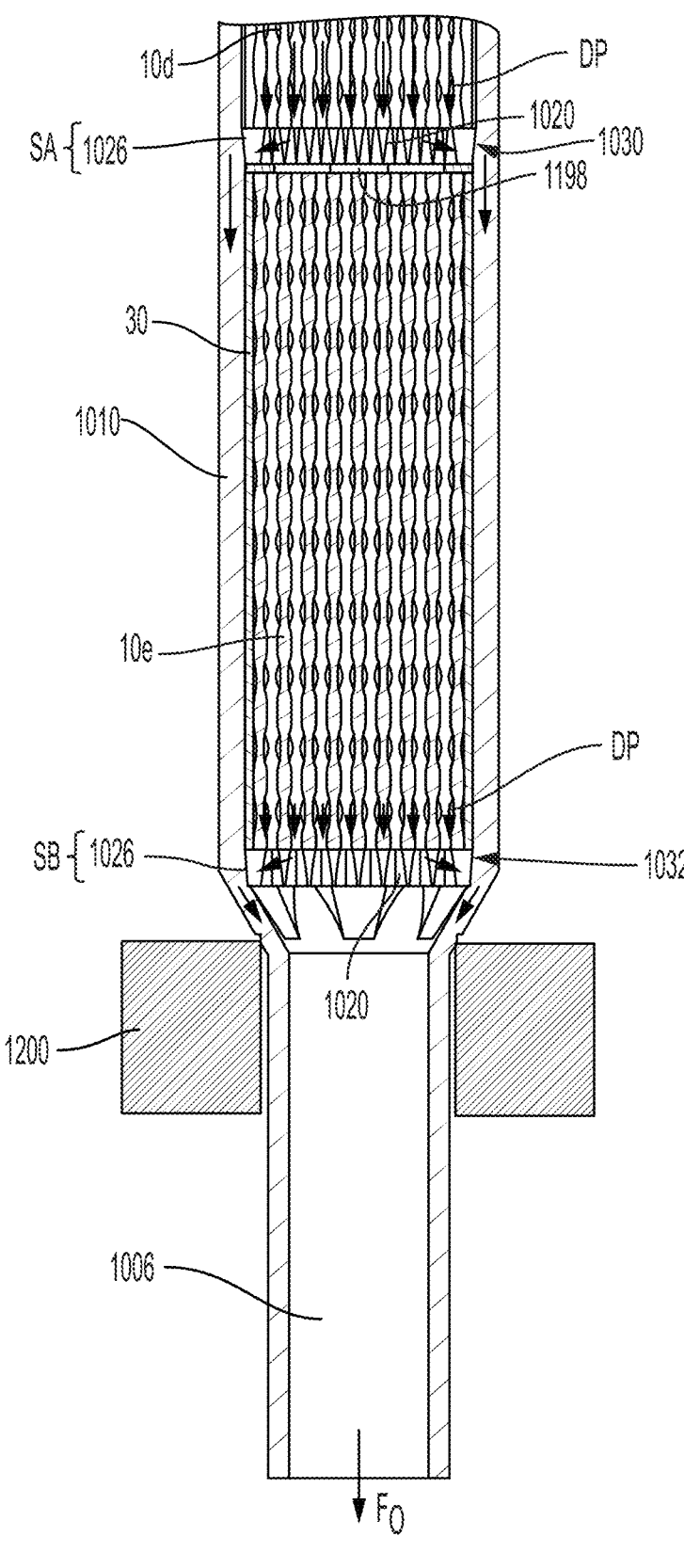
FIG. 38 is a magnified cross-sectional view of an outlet region of a fuel assembly seated in a lower reactor tube sheet and illustrating the axial load distribution associated with the fuel bundle supports.

FIG. 38 is a magnified cross-sectional view of an outlet region of a fuel assembly seated in a lower reactor tube sheet and illustrating the axial load distribution associated with the fuel bundle supports. Differential pressure associated with coolant flowing through the fuel assembly 1000, typically about 34 bar (about 500 PSI) to about 69 bar (about 1000 PSI) inlet pressure, creates an axial loading (indicated by block arrows DP in FIG. 38) on components internal to the fuel assembly 1000, including fuel bundles 10 with twisted ribbon fuel rodlets 20 and fuel bundle supports 1020. The axial loading resulting from the operational differential pressure is typically acceptable in the brittle region of the fuel assembly 1000, i.e., where operating temperatures are below the brittle to ductile transition temperature of the twisted ribbon fuel rodlets 20, typically about 1850 K. However, in the ductile region of the fuel assembly 1000, i.e., regions of higher operating temperature regions, such about 1850 K and higher, the twisted ribbon fuel rodlets 20 can undergo ductile failure at the axial loading resulting from the operational differential pressure. To reduce the axial loading resulting from the operational differential pressure on the twisted ribbon fuel rodlets 20, each fuel bundle support 1020 transfers at least some of the axial loading applied to the fuel bundle support 1020 to the fuel assembly outer structure 1002 (in FIG. 28, the outlet region of the fuel assembly 1000 is shown, so the lower fuel assembly outer structure 1010 is illustrated). For example and as shown in FIG. 28, axial loading applied to a top surface 1102 of the fuel bundle support 1020 between the fourth fuel bundle 10d and the outlet fuel bundle 10e is transferred to the lower fuel assembly outer structure 1010 through the direct or indirect contact between the tapered surface 1026 of the fuel bundle support 1020 and the tapered section 1030 of the lower fuel assembly outer structure 1010. Also for example and as shown in FIG. 28, axial loading applied to a top surface 1102 of the fuel bundle support 1020 below (in the coolant flow direction) the outlet fuel bundle 10e is transferred to the lower fuel assembly outer structure 1010 through the direct or indirect contact between the tapered surface 1026 of the fuel bundle support 1020 and the tapered section 1032 of outlet connection assembly 1006.

For any fuel bundle 10 downstream in the coolant flow direction from a fuel bundle support 1020, the respective fuel bundle 10 only bears the axial forces from the differential pressure associated with coolant flowing through that fuel bundle 10 (or multiple fuel bundles) and to the fuel bundle support 1020 next in the coolant flow direction. Referring to FIG. 38, axial forces from the differential pressure associated with coolant flowing through the fourth fuel bundle 10d (and any upstream fuel bundles not separated from the fourth fuel bundle 10d by a fuel bundle support 1020) are transferred radially to the fuel assembly outer structure 1002 by fuel bundle support 1020 (see section SA) and axial forces from the differential pressure associated with coolant flowing through outlet fuel bundle 10e are transferred radially to the fuel assembly outer structure 1002 by outlet fuel bundle support 1020 (see section SB). Axial forces in the fuel assembly outer structure 1002 are carried by the lower reactor tube sheet 1200 in which the fuel assembly 1000 is seated.

The fuel assembly 1000 includes a space 1198 between the bottom surface 1104 of the intermediate fuel bundle support 1020 and the fuel bundle downstream (in the coolant flow direction), such as outlet fuel bundle 10e, The space 1198 is formed by suitable means, such as by a periphery structure or by a protrusion on the bottom surface 1104 of the intermediate fuel bundle support 1020. The space 1198 provides a volume for coolant that has excited the openings 1120 in the intermediate fuel bundle support 1020 to mix and to restore turbulent flow. Mixing in the space can improve thermal characteristics of the coolant. In addition, the space 1198 provides an expansion volume for internal components of the fuel assembly 1000, such as the twisted ribbon fuel rodlets 20 that can undergo thermal expansion in the longitudinal direction.

The fuel assembly outer structure 1002 can formed of, for example, SiC fibers and can be manufactured, for example, by fiber processing techniques, such as mandrel winding methods. Various mandrel winding methods can be used. Example mandrel winding methods include wet winding and prepreg or dry winding with vacuum resin infusion. Polymer Infiltration and Pyrolysis (PIP) processes can also be used.

In example embodiments, the mandrel has an outer surface that is the negative geometry corresponding to the contoured inner surface 1160 of the fuel assembly outer structure 1002. For example, the mandrel outer surface can include the negative geometry corresponding the alternating planar sections 1162 and curved sections 1164 that extend in the longitudinal direction of the mandrel. The mandrel outer surface can also include changes in diameter to correspond to the differing diameters of the contoured inner surface 1160, including angled surface(s) that correspond to the region (TA).

Figure 39:
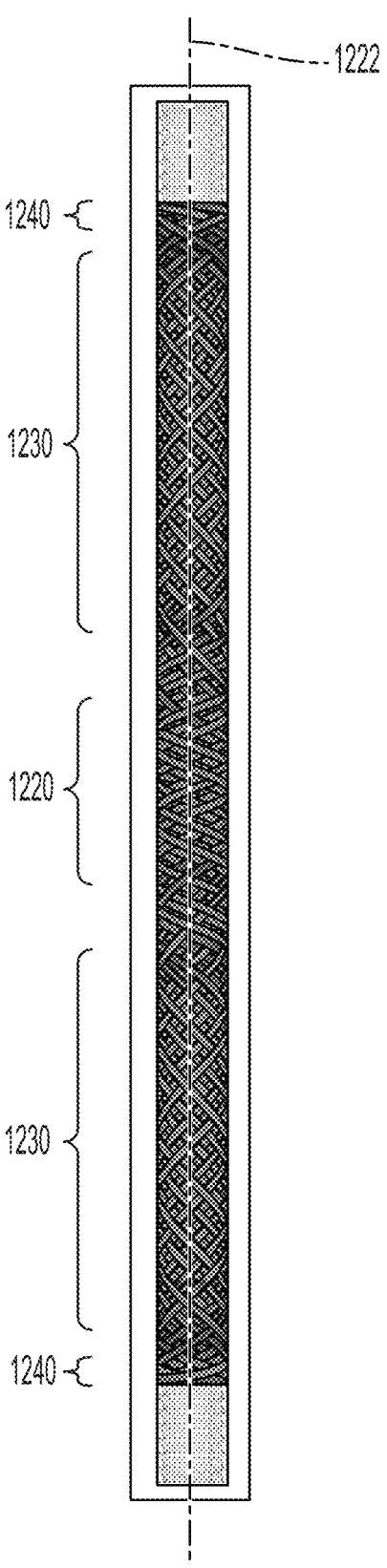
FIG. 39 illustrates the variation in helix angle used to fabricate the fuel assembly outer structure.

The fuel assembly outer structure 1002, particularly if made of SiC/SiC fibers, may be reinforced to bear the additional radial loading (see above discussion on axial loads transferred to the fuel assembly outer structure 1002) that occurs at locations where the fuel bundle supports 1020 are located. One example of reinforcement is to use high angle circumferential winding at the locations. FIG. 39 illustrates the variation in helix angle used to fabricate a fuel assembly outer structure 1002. In FIG. 39, location 1220 corresponds to the location of a fuel bundle support 1020 in the assembled fuel assembly 1000, locations 1230 correspond to the location of a fuel bundle 10, and locations 1240 are ends of the fuel assembly outer structure 1002. At locations 1230, the helix angle (relative to the longitudinal axis 1222) is 30 to 60 degrees, alternatively 50 to 55 degrees. However, at locations 1220, the helix angle (relative to the longitudinal axis 1222) is 70 to 85 degrees, alternatively 75 to 85 degrees. Regions between locations 1220 and 1230 and between 1230 and 1240 have helix angles that transition between those in the respective adjacent locations. The higher helix angle reinforces the fuel assembly outer structure 1002 allowing it to bear higher forces. While higher helix angles may result in additional windings and additional diameter features on the outer diameter of the fuel assembly outer structure, such additions can be compensated for in the moderator and reactor construction.

Additionally or alternatively, crimp reinforcements may be placed on the outside of the fuel assembly outer structure, particularly where cooler temperatures allow use of structural materials, like nickel superalloys, or ductile materials. If present, the crimp reinforcements would be located corresponding to the fuel bundle support 1020.

Although FIG. 39 is described in the context of a fuel assembly outer structure 1002, the description applies equally to a lower fuel assembly outer structure 1010 and to an upper fuel assembly outer structure 1012.

Figure 40:
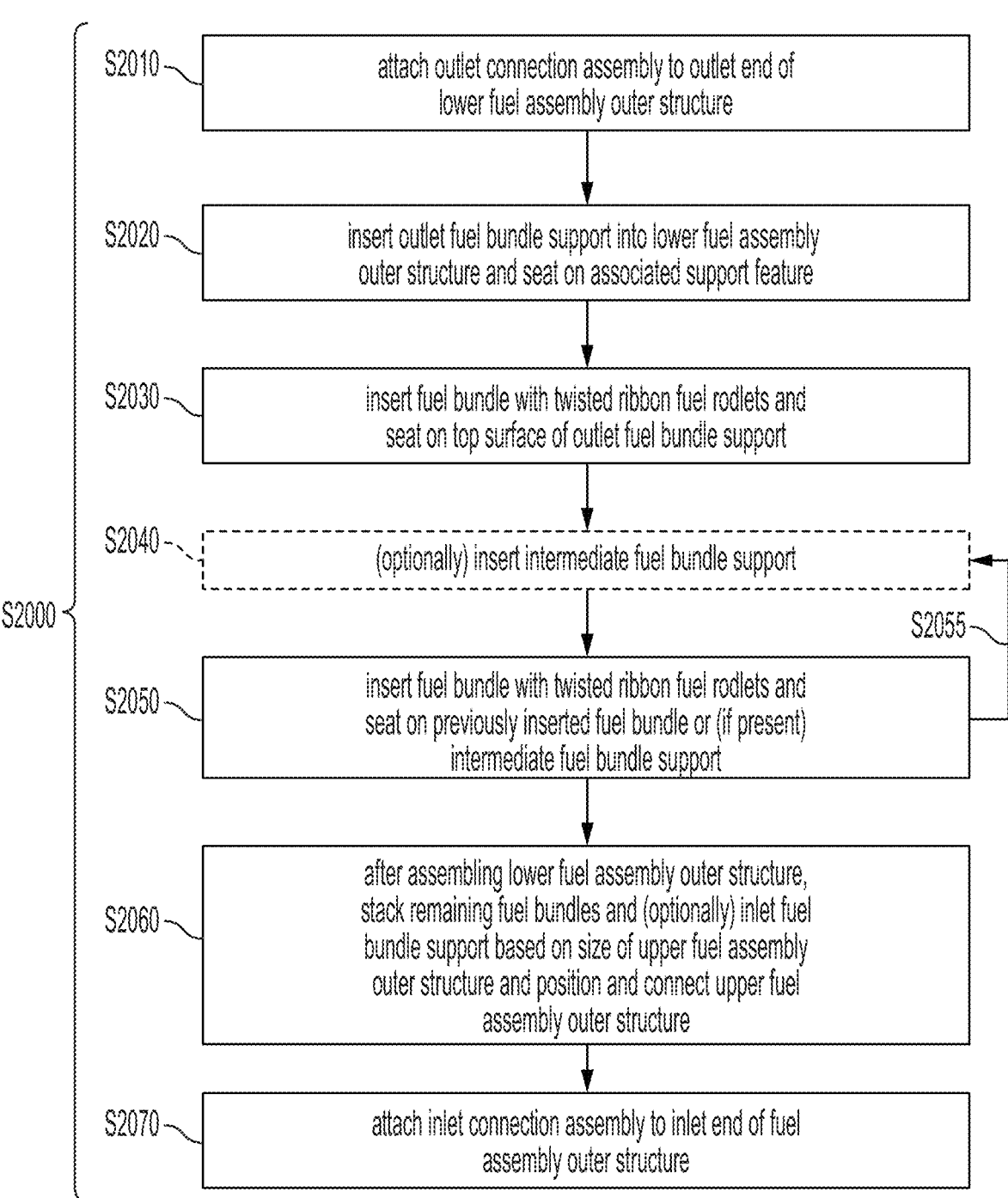
FIG. 40 is a flow diagram setting forth various steps in an embodiment of a method of manufacturing a fuel assembly comprising a plurality of fuel bundles with twisted ribbon fuel rodlets and multilayer casing.

Fuel assemblies incorporating a plurality of fuel bundles (with twisted ribbon fuel rodlets and multilayer casing and optionally one or more fuel bundle supports can be manufactured by suitable means. FIG. 40 is a flow diagram setting forth various steps in an embodiment of a method S2000 of manufacturing a fuel assembly comprising a plurality of fuel bundles with twisted ribbon fuel rodlets and multilayer casing and, optionally, one or more fuel bundle supports.

In step S2010, a fuel assembly outer structure is prepared by, for example, attaching to the outlet end of a lower fuel assembly outer structure a component for attaching an outlet flow adapter. This facilitates later attachment of the outlet connection assembly 1006 to the outlet end of the fuel assembly outer structure. An attachment component (such as a flange or short pipe section or a sleeve), typically formed of a metal alloy, is attached to the outlet end by, for example, vacuum brazing or other process that can produce an essentially leak-tight joint. The components internal to the fuel assembly outer structure, including one or more fuel bundles with twisted ribbon fuel rodlets and multilayer casing 10 and (optionally) fuel bundle supports 1020, are then inserted in a suitable order to achieve the desired location of each fuel assembly within the fuel assembly outer structure as well as positioning relative to each other, i.e., longitudinally stacked or not according to anticipated operating temperatures or neutronic conditions.

For example, a fuel bundle support is S2020 inserted into the lower fuel assembly outer structure and seated on an associated support feature toward the outlet end of the fuel assembly such that the first inserted fuel bundle support is an outlet fuel bundle support. A fuel bundle with twisted ribbon fuel rodlets and multilayer casing 10 is S2030 inserted into the lower fuel assembly outer structure 1010 and seated on a top surface 1102 of the outlet fuel bundle support. Additional fuel bundle supports 1020 and fuel bundles with twisted ribbon fuel rodlets and multilayer casing 10 are stacked, alternatingly (steps S2040, S2050 and S2055) until the lower fuel assembly outer structure 1010 is filled to complete assembly of the lower fuel assembly. Additional fuel bundles and, optionally, an inlet fuel bundle supports can be stacked on the assembled lower fuel assembly (the size and dimensions of which corresponds to the interior features and volume of the upper fuel assembly outer structure 1012) and the upper fuel assembly outer structure 1012 is positioned over the stack and connected to the lower fuel assembly outer structure 1010 S2060. Then, the inlet connection assembly 1004 is S2070 attached to the inlet end of the fuel assembly outer structure via an attachment component.

The fuel bundles with twisted ribbon fuel rodlets and multilayer casing 10 and (optionally) fuel bundle supports 1020 (and fuel assemblies 1000 formed therefrom) disclosed herein can be incorporated into a nuclear fission reactor structure. In general, the fuel assemblies are positioned within a block of moderator material used to thermalize fast neutrons. Nuclear control means such as rotating peripheral control drums can be used to control the reactivity of the core. The entire core is located within a pressure boundary connected to a converging-diverging nozzle.

Figure 41:
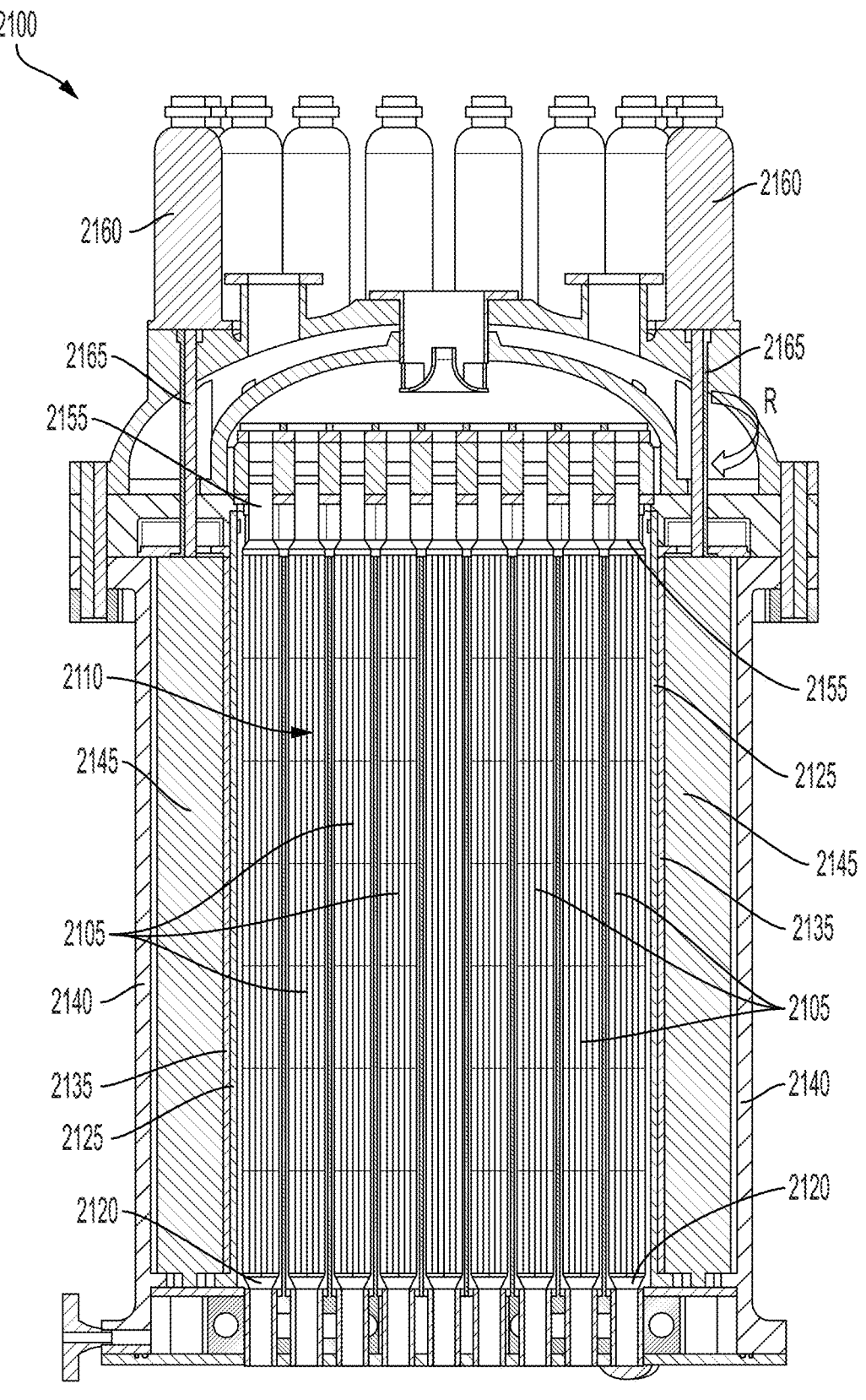
FIG. 41 is a schematic, cross-sectional, side view of an embodiment of a nuclear propulsion fission reactor structure within a vessel and with fuel assemblies comprising a plurality of fuel bundles with twisted ribbon fuel rodlets and multilayer casing.

FIG. 41 is a schematic, cross-sectional, side view of an embodiment of a nuclear propulsion fission reactor structure within a vessel and with fuel assemblies comprising a plurality of fuel bundles with twisted ribbon fuel rodlets and multilayer casing 10. Embodiments of the nuclear fission reactor structure 2100 includes a plurality of fuel assemblies 2105 (for example, a fuel assembly 1000 formed from fuel bundles with twisted ribbon fuel rodlets and multilayer casing 10 and (optionally) one or more fuel bundle supports 1020) located within an active core region 2110 of the nuclear fission reactor structure 2100 (the active core region 2110 being the internal region where the moderator block is located and the fuel assembly portions within the moderator block). At the inlet and the outlet of the fuel assemblies 2105, connection assemblies (such as inlet connection assembly 2115 and outlet connection assembly 2120) provide fluid communication for propellant supplied to and exhausted from each of the fuel assemblies 2105. Thus, the inlet connection assemblies 2115 connect to or interface with entrance openings of the plurality of fuel assemblies 2105 and the outlet connection assemblies 2120 connect to or interface with exit openings of the plurality of fuel assemblies 2105.

An interface structure 2125, which may or may not include supplemental radial restraint, is radially outward of the active core region 2130 and a reflector 2135 is radially outward of the interface structure 2125. A first surface of the interface structure 2125 is conformal to the outer surface of the active core region 2110 and a second surface of the interface structure 2125 is conformal to an inner surface of the reflector 2135. The inner surface of the reflector 2135 is oriented toward the active core region 2110, and the interface structure 2125 functions to mate the geometry of the outer surface of the active core region 2110 to the geometry of the inner surface of the reflector 2135, thus allowing various arrangements for the fuel assemblies 100 in the moderator block 2155, such as a hexagonal pattern leading to a hexagonal interface with the interface structure 2125 or a concentric ring pattern leading to a circular interface with the interface structure 2125.

Figure 42:
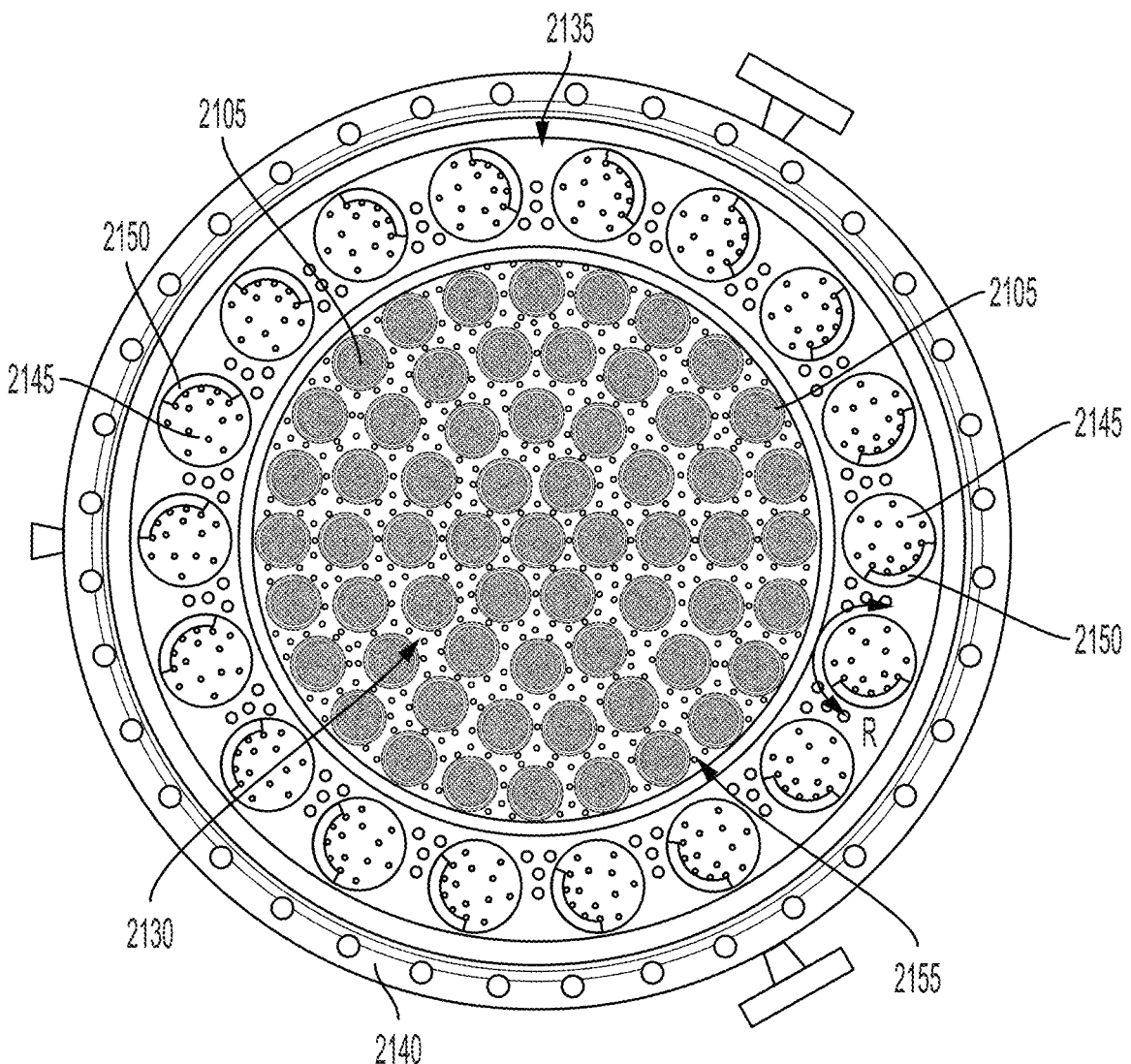
FIG. 42 is a schematic, cross-sectional, top view of an embodiment of an embodiment of a nuclear propulsion fission reactor structure within a vessel and with fuel assemblies comprising a plurality of fuel bundles with twisted ribbon fuel rodlets and multilayer casing.

FIG. 42 is a schematic, cross-sectional, top view of an embodiment of an embodiment of a nuclear propulsion fission reactor structure 2100 within a vessel 2140. A plurality of control drums 2145, each including a neutron absorber body 2150, is located within a volume of the reflector 2135, such as in an annular section on the outer portion of the cylindrically shaped control drum. The control drum 2145 itself is made of a neutron reflecting material, similar to the reflector 2135. The neutron absorber body 2150 is made of a neutron absorbing material and is movable, such as by rotation, between a first position and a second position, the first position being radially closer to the active core region than the second position. In exemplary embodiments, the first position is radially closest to the active core region and the second position is radially farthest from the active core region. The neutron absorber body 2150 is movable between the first position and the second position to control the reactivity of the active core region 2110. In the illustrated example, the neutron absorber body 2150 is rotatable from the first, radially closer position, to the second position by rotation (R4) around an axis of the control drums 2145. However, other radial positions and/or movement directions can be implemented as long as the various positions to which the neutron absorber body 2150 can be moved provides control of the reactivity of the active core region 2110. In some embodiments, when the plurality of neutron absorber bodies 2150 are each at the first, radially closer position, each of the plurality of neutron absorber bodies 2150 are radially equidistant from the axial centerline of the active core region 2110. Other control concepts can also be implemented, such as regulating neutron leakage by opening and closing portions of the reflector 2135.

The nuclear fission reactor structure can further comprise a vessel 2140. FIGS. 41 and 42 schematically illustrate an embodiment of a nuclear fission reactor structure 2100 with a vessel 2140. The nuclear fission reactor structure 2100, which includes the active core region 2110, the interface structure 2125, the inlet connection assembly 2115 and outlet connection assembly 2120, the reflector 2135, and the plurality of control drums 2145 with neutron absorber bodies 2150, is housed within an interior volume of the vessel 2140.

As shown in FIG. 41, motors 2160 are operatively attached for rotation to the control drums 2145 by a drum shaft 2165. Motors 2160 may be housed in pressure boundary extensions of the vessel 2140 or alternatively may not be, in which case seals are required around the drum shafts 2165. Motors internal to the vessel 2140 can also be implemented.

Embodiments of the vessel 2140 are formed from machined forgings and generally use high strength aluminum or titanium alloys due to weight considerations. The vessel 2140 can be multiple components that are then assembled together, for example, with fasteners. However, in other embodiments, the vessel 2140 can be one contiguous component or a welded together assemblage.

Additional disclosure related to the nuclear fission reactor structure and its components can be found in U.S. patent application Ser. No. 16/999,244, the entire contents of which are incorporated by reference.

The disclosure is also directed to a nuclear thermal propulsion engine that includes the nuclear fission reactor structure 2100 within a vessel 2140 within a reactor section

Figure 43:
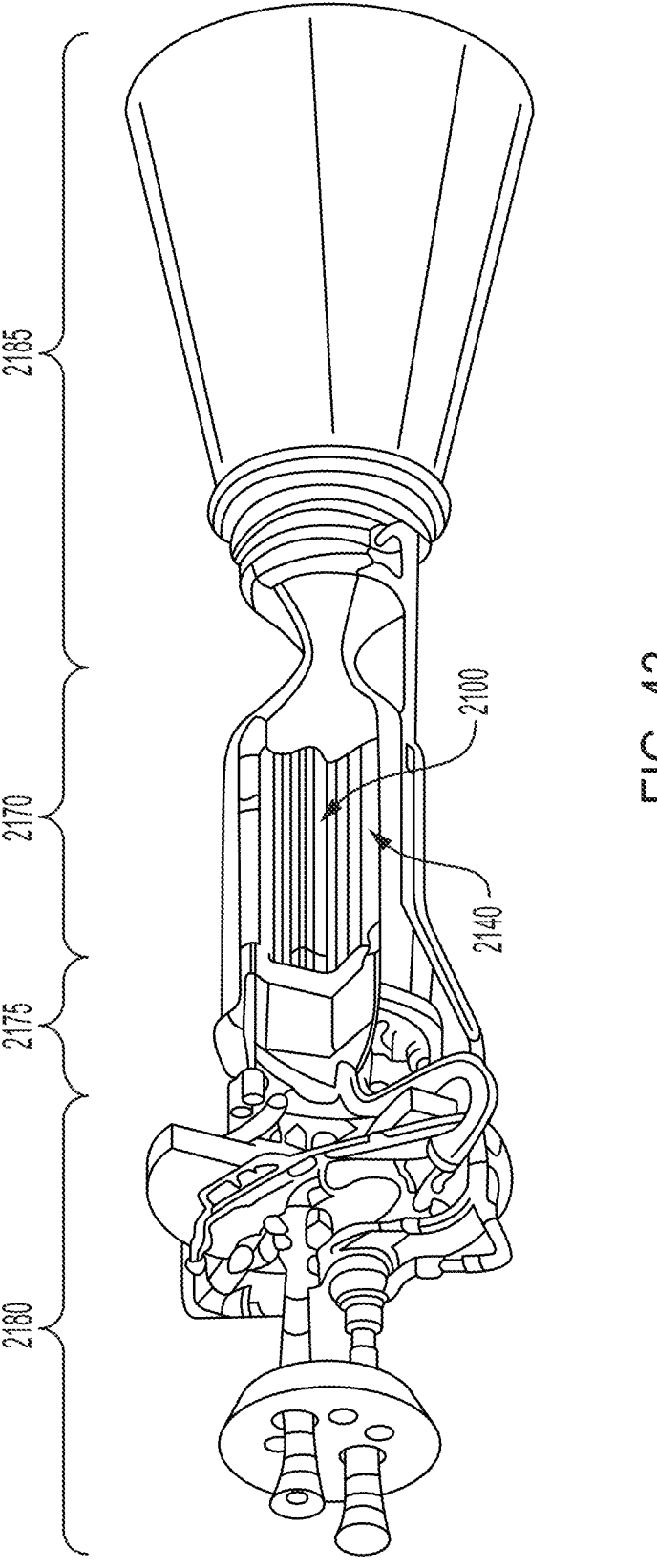
FIG. 43 is a schematic partial cross-section view of a nuclear thermal propulsion engine.

2170. The nuclear thermal propulsion engine further includes shielding 2175, turbo machinery 2180, and a nozzle section 2185 attached to or supported by the vessel 2125, for example, as consistent with that shown in FIG. 43.

It is contemplated that various supporting and ancillary equipment can be incorporated into the disclosed nuclear fission reactor structure and nuclear thermal propulsion engine. For example, at least one of a moderator (such as a zirconium hydride, beryllium, beryllium oxide, and graphite), a control rod for launch safety, a neutron source to assist with start-up, and a scientific instrument (such as a temperature sensor or radiation detector) can be incorporated into the nuclear propulsion fission reactor structure.

The disclosed arrangements pertain to any configuration in which a heat generating source including a fissionable nuclear fuel composition, is incorporated into a fuel bundle. Although generally described herein in connection with a gas-cooled nuclear thermal propulsion reactors (NTP reactors), the structures and methods disclosed herein can also be applicable to other fission reactor systems.

Nuclear propulsion fission reactor structure disclosed herein can be used in suitable applications including, but not limited to, non-terrestrial power applications, space power, space propulsion, and naval applications, including submersibles.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A fuel bundle, comprising:

a multilayer casing having an inner volume defining a reactor core; and a plurality of twisted ribbon fuel rodlets arranged in the reactor core, the plurality of twisted ribbon fuel rodlets forming a core region, wherein the plurality of twisted ribbon fuel rodlets have a composition including a fissionable fuel component, wherein the multilayer casing includes an inner layer, an inner intermediate layer an outer intermediate layer, and an outer layer, wherein the inner layer is a graphite compressive felt insulation layer, wherein the inner intermediate layer is a composite reinforcement and compressive layer, wherein the outer intermediate layer is a first compressive prepeg layer, and wherein the outer layer is a second compressive prepeg layer.

2. The fuel bundle according to claim 1, wherein, in a cross-section perpendicular to a longitudinal axis of the fuel bundle, cross-sections of the plurality of twisted ribbon fuel rodlets are arranged in a hexagonal packing arrangement, and wherein the hexagonal packing arrangement extends to outermost twisted ribbon fuel rodlets at a periphery of the core region.

3. The fuel bundle according to claim 2, further comprising a plurality of filler rods at a plurality of locations about the periphery of the core region.

4. The fuel bundle according to claim 1, wherein, in a cross-section perpendicular to a longitudinal axis of the fuel bundle, cross-sections of the plurality of twisted ribbon fuel rodlets are arranged in a circle packing arrangement, and wherein the circle packing arrangement extends to twisted ribbon fuel rodlets that are inward from a periphery of the core region.

5. The fuel bundle according to claim 4, wherein there are areas of non-symmetry at the periphery of the core region.

6. A method of manufacturing a fuel bundle, the method comprising:

forming a core region of the fuel bundle, wherein forming the core region includes seating first ends of each of a plurality of twisted ribbon fuel rodlets in a respective receiving space of a rodlet seating fixture, wherein the rodlet seating fixture includes a seating surface having a plurality of protrusions, the plurality of protrusions are distributed on the seating surface and have a height from a base surface of the seating surface, and side surfaces of a plurality of adjacent protrusions define the respective receiving space;

attaching an end cap to second ends of each of the plurality of twisted ribbon fuel rodlets to form a pre-bundle;

optionally introducing an infiltrant into the pre-bundle to occupy void spaces in the assembled twisted ribbon fuel rodlets;

encasing the pre-bundle in a multilayer casing including an inner layer, an inner intermediate layer, an outer intermediate layer, and an outer layer;

removing the rodlet seating fixture and end cap; and optionally removing the infiltrant, wherein the plurality of twisted ribbon fuel rodlets have a composition including a fissionable fuel component, wherein the inner layer is a graphite compressive felt insulation layer, wherein the inner intermediate layer is a composite reinforcement and compressive layer, wherein the outer intermediate layer is a first compressive prepeg layer, and wherein the outer layer is a second compressive prepeg layer.

7. The method according to claim 6, further comprising:

supporting an axial length of the seated twisted ribbon fuel rodlets by a support housing during forming of the core region of the fuel bundle, wherein the support housing is in contact with a periphery of the rodlet seating fixture, and removing the support housing prior to encasing the pre-bundle in the multilayer casing.

8. The method according to claim 7, further comprising completely enclosing the assembled twisted ribbon fuel rodlets, wherein optionally introducing the infiltrant into the pre-bundle includes vacuum assisted infiltration.

9. The method according to claim 8, wherein encasing the pre-bundle in the multilayer casing includes manual layup of one or more of the inner layer, the inner intermediate layer, the outer intermediate layer, and the outer layer.

10. The method according to claim 8, wherein encasing the pre-bundle in the multilayer casing includes mandrel winding of one or more of the inner layer, the inner intermediate layer, the outer intermediate layer, and the outer layer.

11. The method according to claim 8, wherein, in a cross-section perpendicular to a longitudinal axis of the core region, cross-sections of the plurality of twisted ribbon fuel rodlets are arranged in a hexagonal packing arrangement, and wherein the hexagonal packing arrangement extends to outermost twisted ribbon fuel rodlets at a periphery of the core region.

12. The method according to claim 11, further comprising locating a plurality of filler rods at a plurality of locations about the periphery of the core region, wherein ends of each of the plurality of filler rods are seated in the rodlet seating fixture.

13. The method according to claim 8, wherein, in a cross-section perpendicular to a longitudinal axis of the core region, cross-sections of the plurality of twisted ribbon fuel rodlets are arranged in a circle packing arrangement, and wherein the circle packing arrangement extends to twisted ribbon fuel rodlets that are inward from a periphery of the core region.

14. The method according to claim 6, wherein, in a cross-section perpendicular to a longitudinal axis of the core region, cross-sections of the plurality of twisted ribbon fuel rodlets are arranged in a hexagonal packing arrangement, and wherein the hexagonal packing arrangement extends to outermost twisted ribbon fuel rodlets at a periphery of the core region.

15. The method according to claim 14, further comprising locating a plurality of filler rods at a plurality of locations about the periphery of the core region, wherein ends of each of the plurality of filler rods are seated in the rodlet seating fixture.

16. The method according to claim 6, wherein, in a cross-section perpendicular to a longitudinal axis of the core region, cross-sections of the plurality of twisted ribbon fuel rodlets are arranged in a circle packing arrangement, and wherein the circle packing arrangement extends to twisted ribbon fuel rodlets that are inward from a periphery of the core region.

17. The method according to claim 6, wherein encasing the pre-bundle in the multilayer casing includes (i) manual layup of one or more of the inner layer, the inner intermediate layer, the outer intermediate layer, and the outer layer or (ii) mandrel winding of one or more of the inner layer, the inner intermediate layer, the outer intermediate layer, and the outer layer.

* * * * *